US009070261B2

(12) United States Patent
Hardy

(10) Patent No.: US 9,070,261 B2
(45) Date of Patent: Jun. 30, 2015

(54) PRODUCT SECUREMENT AND MANAGEMENT SYSTEM

(75) Inventor: Stephen N. Hardy, Wadsworth, OH (US)

(73) Assignee: RTC Industries, Incorporated, Rolling Meadows, IL (US)

(*) Notice: Subject to any disclaimer, the term of this patent is extended or adjusted under 35 U.S.C. 154(b) by 205 days.

(21) Appl. No.: 13/194,642

(22) Filed: Jul. 29, 2011

(65) Prior Publication Data

US 2012/0055892 A1 Mar. 8, 2012

Related U.S. Application Data

(63) Continuation-in-part of application No. 12/496,389, filed on Jul. 1, 2009, now Pat. No. 8,113,601, which is a continuation-in-part of application No. 11/858,545, filed on Sep. 20, 2007, now Pat. No. 7,621,409, which (Continued)

(51) Int. Cl.

| | |
|---|---|
| ***G07F 11/00*** | (2006.01) |
| ***B65H 3/44*** | (2006.01) |
| ***B65G 59/00*** | (2006.01) |
| ***G07F 11/38*** | (2006.01) |
| ***A47F 1/12*** | (2006.01) |
| ***A47F 3/00*** | (2006.01) |
| ***A47F 5/00*** | (2006.01) |

(52) U.S. Cl.

CPC . *G07F 11/38* (2013.01); *A47F 1/12* (2013.01); *A47F 1/126* (2013.01); *A47F 3/002* (2013.01); *A47F 5/0025* (2013.01)

(58) Field of Classification Search

CPC ........... G07F 11/00; B65H 3/44; B65G 59/00

USPC ............. 221/123, 263, 3, 192, 232, 254, 207, 221/230, 241; 312/71

See application file for complete search history.

(56) References Cited

U.S. PATENT DOCUMENTS

| | | | | |
|---|---|---|---|---|
| 1,813,713 A | | 7/1931 | Selby et al. | |
| 2,412,368 A | * | 12/1946 | Tascher | 211/59.2 |
| 2,784,872 A | * | 3/1957 | Lux | 221/207 |

(Continued)

FOREIGN PATENT DOCUMENTS

| | | | | | |
|---|---|---|---|---|---|
| DE | 10309589 A1 | * | 9/2003 | | A47F 1/10 |
| EP | 1462034 B1 | | 11/2004 | | |

(Continued)

OTHER PUBLICATIONS

International Search Report dated Nov. 22, 2011.

(Continued)

*Primary Examiner* — Rakesh Kumar

(74) *Attorney, Agent, or Firm* — Banner & Witcoff, Ltd.

(57) ABSTRACT

A merchandising system that improves the merchandising of product by limiting the number and the frequency with which product can be removed from, for example, a merchandising shelf. The merchandising system may include a base configured to support product and a housing configured to engage the base. The housing may comprise a top wall, a first side wall, a second side wall, and a front retaining wall. The system may further include a spring-urged pusher movably mounted on the base and a dampener assembly mounted to the spring-urged pusher configured to control the rate of speed at which the spring-urged pusher is urged forward.

20 Claims, 70 Drawing Sheets

Related U.S. Application Data is a continuation-in-part of application No. 11/685,530, filed on Mar. 13, 2007, now Pat. No. 7,451,881, which is a continuation-in-part of application No. 11/612,210, filed on Dec. 18, 2006, now Pat. No. 7,299,934, which is a continuation of application No. 11/140,023, filed on May 27, 2005, now Pat. No. 7,150,365, which is a continuation-in-part of application No. 11/047,915, filed on Feb. 1, 2005, now Pat. No. 7,661,545.

(60) Provisional application No. 61/369,433, filed on Jul. 30, 2010, provisional application No. 60/782,000, filed on Mar. 13, 2006, provisional application No. 60/541,804, filed on Feb. 3, 2004, provisional application No. 61/133,769, filed on Jul. 2, 2008, provisional application No. 61/087,407, filed on Aug. 8, 2008.

(56) References Cited

U.S. PATENT DOCUMENTS

| | | | | | |
|---|---|---|---|---|---|
| 2,824,666 | A | * | 2/1958 | Hausladen | 221/232 |
| 2,874,872 | A | * | 2/1959 | Thompson | 221/112 |
| 3,161,295 | A | * | 12/1964 | Chesley | 211/59.3 |
| 3,452,899 | A | * | 7/1969 | Libberton | 221/242 |
| 3,578,207 | A | * | 5/1971 | Danow | 221/232 |
| 3,744,865 | A | | 7/1973 | Syverson | |
| 3,862,704 | A | * | 1/1975 | Millies et al. | 221/242 |
| 4,130,326 | A | | 12/1978 | Hornblad | |
| 4,336,892 | A | * | 6/1982 | Cox et al. | 221/125 |
| 4,351,439 | A | * | 9/1982 | Taylor | 211/59.3 |
| 4,625,894 | A | * | 12/1986 | James et al. | 221/193 |
| 4,679,684 | A | | 7/1987 | Glaser | |
| 4,887,737 | A | * | 12/1989 | Adenau | 221/3 |
| 4,907,707 | A | * | 3/1990 | Crum | 211/59.3 |
| 5,067,634 | A | * | 11/1991 | Guindulain Vidondo | 221/298 |
| 5,111,942 | A | * | 5/1992 | Bernardin | 211/59.3 |
| 5,439,136 | A | * | 8/1995 | Chatani et al. | 221/258 |
| 6,068,135 | A | | 5/2000 | Holztrager | |
| 6,196,416 | B1 | | 3/2001 | Seagle | |
| 6,390,307 | B1 | | 5/2002 | Stelter | |
| 6,484,891 | B2 | * | 11/2002 | Burke | 211/59.3 |
| 6,527,127 | B2 | * | 3/2003 | Dumontet | 211/59.3 |
| 6,682,289 | B1 | * | 1/2004 | Credle, Jr. | 414/281 |
| 7,641,072 | B1 | * | 1/2010 | Vlastakis et al. | 221/123 |
| 7,980,417 | B2 | | 7/2011 | Riley | |
| 8,113,601 | B2 | * | 2/2012 | Hardy | 312/138.1 |
| 8,413,823 | B2 | * | 4/2013 | Hardy | 211/59.3 |
| 2004/0060944 | A1 | | 4/2004 | Gervasi | |
| 2005/0029283 | A1 | | 2/2005 | Pedigo | |
| 2005/0189369 | A1 | * | 9/2005 | Vlastakis et al. | 221/123 |
| 2005/0199565 | A1 | | 9/2005 | Richter et al. | |
| 2007/0029340 | A1 | * | 2/2007 | Nagelski et al. | 221/268 |
| 2009/0184130 | A1 | | 7/2009 | Miller et al. | |
| 2009/0321373 | A1 | | 12/2009 | Hardy | |
| 2011/0220597 | A1 | | 9/2011 | Sherretts et al. | |

FOREIGN PATENT DOCUMENTS

| | | | | | |
|---|---|---|---|---|---|
| EP | 1857021 | A2 | * | 11/2007 | A47F 1/12 |
| GB | 2386116 | A | * | 9/2003 | A47F 1/12 |
| WO | 2012016193 | | | 2/2012 | |

OTHER PUBLICATIONS

International Search Report dated Dec. 1, 2011.

Notification of Assertion of Invalidity (Section 27) dated May 31, 2012.

Great Britain Search Report for UK Application No. GB1213371.6 dated Apr. 9, 2014.

* cited by examiner

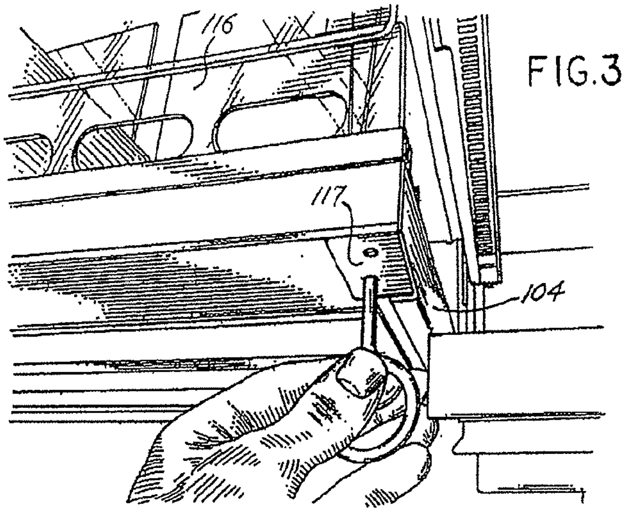
FIG.3
FIG.4
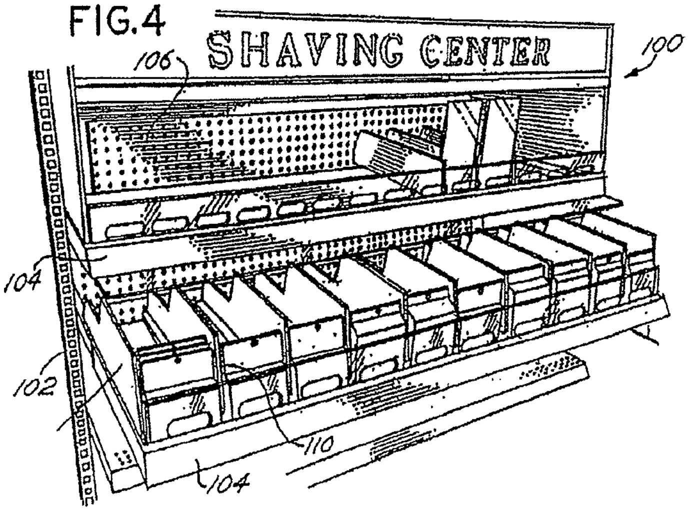

SECTION D-D

DETAIL W

PRODUCT SECUREMENT AND MANAGEMENT SYSTEM

CROSS REFERENCE TO RELATED APPLICATIONS

This Non-Provisional patent application claims priority to provisional patent application 61/369,433, filed Jul. 30, 2010, which is a continuation-in-part of U.S. application Ser. No. 12/496,389, filed Jul. 1, 2009, which is a continuation-in-part of U.S. application Ser. No. 11/858,545, filed Sep. 20, 2007, now U.S. Pat. No. 7,621,409, is a continuation-in-part of U.S. application Ser. No. 11/685,530, filed Mar. 13, 2007, now U.S. Pat. No. 7,451,881, which claims benefit to U.S. Provisional Application No. 60/782,000, filed Mar. 13, 2006, and which is a continuation-in-part of U.S. application Ser. No. 11/612,210, filed Dec. 18, 2006, now U.S. Pat. No. 7,299,934, which is a continuation of U.S. application Ser. No. 11,140,023, filed May 27, 2005, now U.S. Pat. No. 7,150,365, which is a continuation-in-part of U.S. application Ser. No. 11/047,915 filed Feb. 1, 2005, now U.S. Pat. No. 7,661,545, which claims benefit to U.S. Provisional Application No. 60/541,804 filed Feb. 3, 2004. This Application also claims benefit to U.S. Provisional Application 61/133,769, filed Jul. 2, 2008, and U.S. Provisional Application 61/087,407, filed Aug. 8, 2008. All of these applications are incorporated by reference in their entirety.

FIELD OF THE INVENTION

The present invention relates generally to shelf assemblies for use in merchandising product and more particularly to shelf assemblies that improve the securement and management of merchandised product.

BACKGROUND OF THE INVENTION

It is known that retail and wholesale stores, such as drug stores, grocery stores, discount stores, toy stores, and the like require and use a large amount of shelving both to store product and to display the product to consumers. In displaying product to consumers to promote and improve store sales, these stores situate or position the product toward the front of the shelf so that the product is visible and easily accessible to consumers. This desirable positioning has certain drawbacks. For instance, with this desirable "front-facing" of product, the stores are finding that relatively small products or packages of high value can be the target of thieves. Certain items can represent a high value to potential thieves who can either resell the items or use them for other illegitimate purposes, as in the case of certain pharmaceutical products. This theft is increasing and is now a significant cost to the retailer because thieves prefer to steal many products at once or in as short amount of time as possible. To do this, for example, thieves will "sweep" the shelf with their arm collecting the items into a purse, bag or coat very quickly and exit the store without drawing attention.

Theft can be the result of both customers and employees actions and has been difficult to eliminate. Attempts to deter and prevent theft have proven to be only partially effective. For instance, in-store cameras often do not observe the theft clearly enough to catch or prosecute the thief. In addition, in-store security personnel are rarely in the correct position to actually observe a thief in action. As a result, theft continues to be a significant problem and cost in the management of product inventory.

The present invention is directed at overcoming these and other known drawbacks and problems with existing shelving systems.

BRIEF SUMMARY OF THE INVENTION

The present invention overcomes the above-mentioned problems by addressing the securement and management of product in a retail setting.

In one embodiment of the present invention, a merchandising system comprises a base configured to support product, a housing configured to engage with the base, a spring-urged pusher movably mounted on the base, and a lever. The housing may further comprise a top wall, a front wall, a first side wall, and a second side wall. The front wall may include an opening located at the bottom of the front wall. The lever may be configured to lift product upward over a front retaining wall such that the product slides through the opening.

In another embodiment of the present invention, a product management and securement system may comprise a base configured to support product, a housing configured to engage with the base, at least one retaining wall positioned adjacent the front wall and extending toward the top wall, a spring-urged pusher movably mounted on the base, and a lever. The housing may comprise a top wall, a front wall, a first side wall, and a second side wall. The front wall may include an opening. The at least one retaining wall may have a height for limiting access to at least a first row of product and a second row of product placed within the housing. The lever may be configured to lift product upward over the at least one retaining wall wherein the product slides through the opening.

Other features and advantages of the invention will become apparent to those skilled in the art upon review of the following detailed description, claims and drawings in which like numerals are used to designate like features.

BRIEF DESCRIPTION OF THE DRAWINGS

FIG. 3 depicts a bottom view of an exemplary embodiment of a pullout shelf that may be used with the present invention.

FIG. 4 depicts front elevation view of an exemplary embodiment of the product securement and management system of the invention incorporating the pullout shelf.

FIG. 54A-53F illustrates a number of views of an embodiment of a hinge base configured to couple with the hinge plate of FIG. 53 in accordance with one or more aspects of the present invention.

Figure 1:
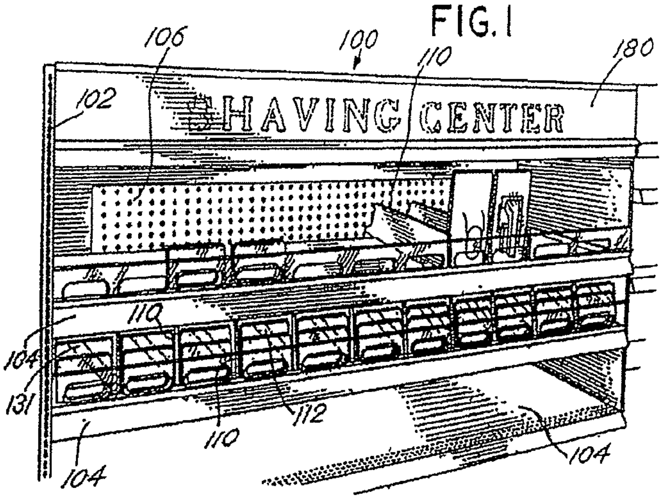
FIG. 1 depicts a front elevation view of an exemplary embodiment of a product securement and management system of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

DETAILED DESCRIPTION OF THE INVENTION

The present invention relates to the securement, management, and distribution of products in settings such as a retail setting and includes numerous embodiments. One embodiment involves a shelf management and display system that resides either on a standard or existing "dealer" shelf typically found in a retail store or on a shelf designed with certain advantages in securing products and deterring theft. The embodiment may include uprights of a pre-existing shelving system or may be a stand alone unit. The display system includes front-facing systems, which force product to the front of a shelf. Such systems may use various methods, such as gravity, friction, magnetism, or spring-urged pushers or paddles to bring product to the front of a shelf near the aisle. Many examples of spring-urged systems that orient products toward the front of a shelf exist and include the systems described in U.S. Pat. No. 6,041,720 to Hardy, U.S. Pat. No. 4,830,201 to Breslow, and International Application No. PCT/US02/15760 and corresponding International Publication No. WO 02/091885 A1 to Hardy, which are incorporated herein by reference.

Figure 2:
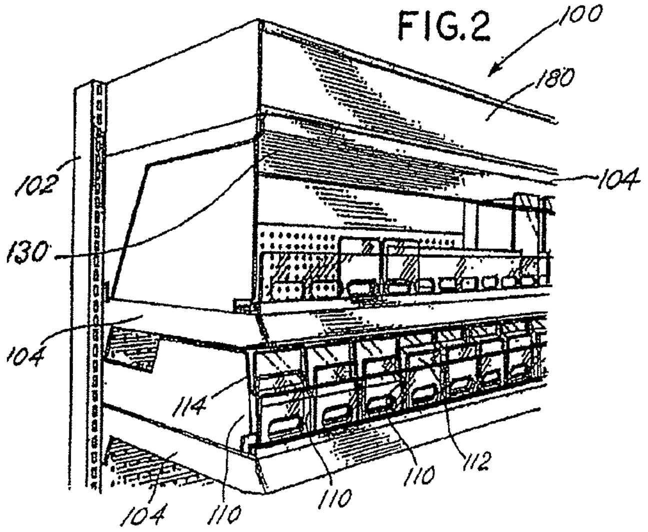
FIG. 2 depicts a partial side elevation view of the exemplary securement and management system of FIG. 1.
Figure 5:
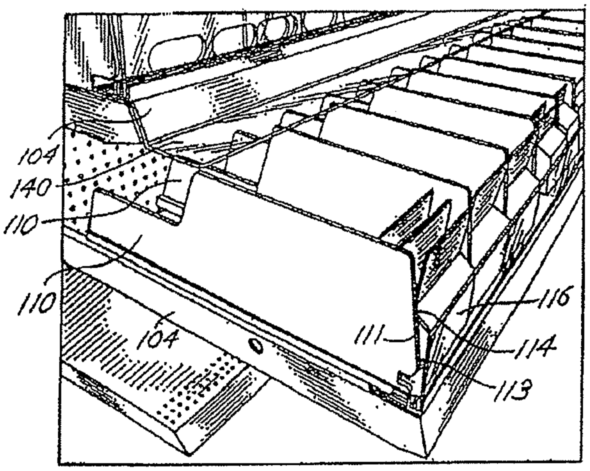
FIG. 5 depicts a side elevation view of an exemplary pullout shelf illustrating the product dividers and the restocking of product on the shelf.

Referring to FIGS. 1 and 2, in one embodiment of the present invention, a shelf management and display system 100 includes vertical uprights 102 and product shelves 104 removably mounted to the uprights. The shelves 104 may be mounted at various positions along the uprights 102 depending on the desired positioning and spacing of the shelves 104. Similarly, the shelves 104 may be moved or relocated to different positions along the uprights 102 as necessary. As shown in FIGS. 4 and 5, the shelves 104 may be pull-out shelves that pull away from the uprights 102 like drawers. As illustrated by FIG. 3, the shelf 104 may incorporate a locking device 117 which involves cooperating catches that contact each other in the locked position and substantially release this contact in the unlocked position and that when released will permit the shelf 104 to pull-out and away from the uprights. The shelves or uprights may involve other locking devices, such as magnets, latches, notches, binders, tension or the like. Once pulled away, the store personnel can restock the shelf with product and then slide the shelf 104 back to its original position and relock the shelf.

A back wall 106 may be mounted to the uprights 102 through known mounting techniques to aid in containing the products and to prevent access to the products from the back of the display system 100. A lock box 108 may be mounted to the uprights 102 also through known mounting techniques. The lock box 108 may be used for storing and locking additional product and shelving components for quick retrieval by the store personnel. The lock box 108 may be positioned at any position on the uprights 102, including the depicted positioning at or near the top of the display system 100. In an alternative embodiment, the lock box 108 may be secured to a shelf 104 as opposed to the uprights 102. With either mounting location, the additional product and shelving components are located at the display system 100 and can therefore be readily retrieved by store personnel.

An exemplary embodiment of the invention may include a series of walls or dividers 110 that are placed between product rows, lanes or facings, and at the ends of the facings, to deter product "sweeping" by a thief These walls 110 are sometimes referred to as "product dividers." As used herein, the terms "vertical walls," "product dividers" and "dividers" are meant to include any wall (including vertical and non-vertical), divider, barrier, or separator that may be used between product rows, lanes or facings. The product dividers 110, when positioned in a spaced-apart manner on the display system 100, form product lanes 112 for locating and separating product to be merchandised.

The product dividers 110 or side walls also are positioned at the sides of the product facing to prevent access to the product from the side of the display system 100. In one embodiment, these dividers or side walls may include telescoping features that permit them to extend vertically or horizontally to provide additional product securement. Significantly, these dividers or side walls may be used in numerous applications as the size and extent of these can be adjusted to fit most shelves, shelving or display systems, or applications.

Figure 6:
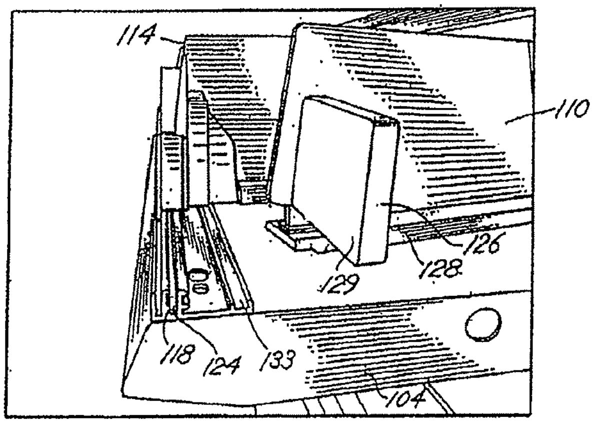
FIG. 6 depicts a side elevation view of an exemplary mounting of a front retaining wall and a secondary retaining wall to the shelf in addition to an exemplary pusher mechanism.

A pusher 126 can be used to urge product forward. This pusher can incorporate a coil spring to assist in urging product forward. The divider 110 in some embodiments can include a base or floor. In some embodiments this floor includes a pusher track 128. FIG. 6 shows the floor on one side of the divider wall. A second floor can be on the opposite side of the divider wall. With floors on both sides of the vertical divider wall, product can rest on these floors. In one such embodiment, a product can rest on one floor of one divider and a second floor of a second divider.

The product dividers 110 define a height, shape and configuration that deter the removal of product over the product dividers 110. The dividers 110 extend in a vertical or non-vertical manner between the shelves 104 and from the front of the shelf 104 to the back wall 106. The dividers 110 have a generally rectangular shape; however, other shapes and configurations of the dividers, such as non-rectangular, oval, repeating patterns or the like, may be used with the invention. Depending on the product to be merchandised and the desired degree of access to the products, the front edge 114 of the product dividers 110 may extend vertically between the shelves 104, or may extend non-vertically to make the products more accessible to the consumer and easier to remove from the shelf. In one embodiment, the divider 110 defines a front edge 111 that includes a front edge portion 113 protruding outward from the front edge 111, as shown in FIG. 5. The protruding portion of the front edge will assist in holding the retaining wall or tab 122 in position to prevent slidable movement of the retaining wall or tab 122, as described below.

The product dividers 110 may be mounted to the display system 100 using numerous techniques. As an example, the dividers 110 may be inserted into tracks formed in the shelf 104 or tracks formed in a base that attaches to the shelf 104. Similarly, the dividers 110 may be formed integral or as a unitary unit with a base that is mounted to the shelf. Also, the dividers 110 may be mounted to a rail, channel, or groove as understood by those skilled in the art. The dividers 110 should be sufficiently rigid to retain the product within the product lanes. Examples of dividers that may be used with invention are described in U.S. Pat. No. 6,041,720 to Hardy, U.S. Pat. No. 4,830,201 to Breslow, and International Application No. PCT/US02/15760 and corresponding International Publication No. WO 02/091885 A1 to Hardy, which are incorporated herein by reference. One skilled in the art will appreciate that other dividers and techniques for mounting the dividers to the shelves are known and may be used with the teachings of the invention.

In one embodiment, the dividers 110 may have a step down or decline near its rear edge, or a decrease in wall height, to allow the wall 110 to be lifted and disengaged from the rail on which it is mounted. With this configuration, the dividers 110 may be moved laterally without interfering with the shelf above it. In one embodiment, the vertical wall or divider 110 has a step down beginning approximately ⅔ of the wall length from its front edge.

In an embodiment, it may be desired to provide enhanced security for items on only a portion of a shelf. These items may be located in the center of the shelf or on a side of the shelf. Security features such as those referenced herein can be added to only a portion of the shelf, while the remainder of the shelf contains fewer or none of the security features. Where high security items are placed in the center of a shelf, these items can be segregated from the remainder of the shelf through the use of walls. These walls can provide the side barriers for the high security portion of the shelf. These walls can be made of strong construction, such as metal, and can extend from the floor of a shelf to a distance fairly near the top of the shelf. These walls also can be attached to the shelf as well as the other security features to limit the possibility of the walls being bent, removed or otherwise thwarted and to assist in limiting access to the items being merchandised on the shelf.

Figure 25:
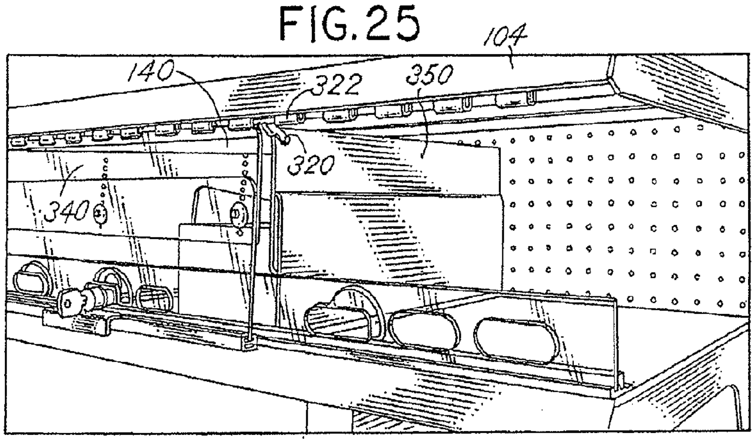
FIG. 25 depicts an exemplary embodiment that includes the use of a clip that may be used to further secure a side wall to the shelf.
Figure 26:
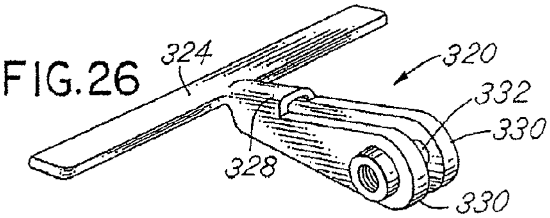
FIG. 26 depicts an isometric view of the clip of FIG. 25.
Figure 30:
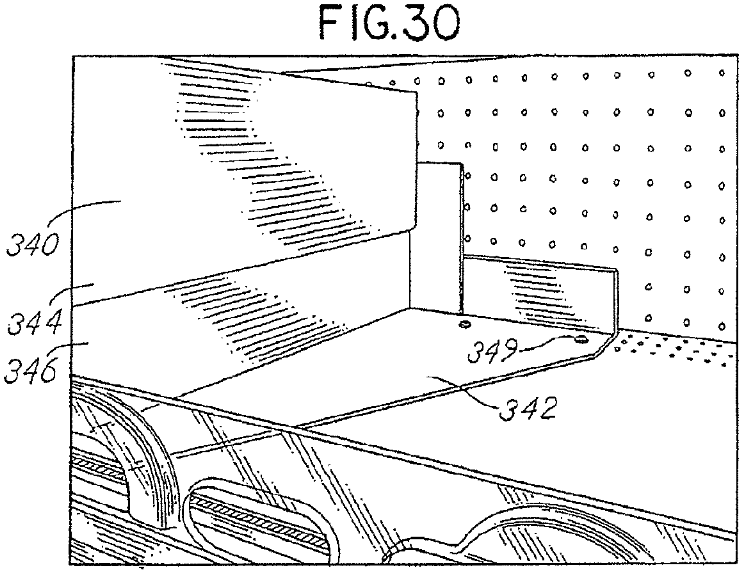
FIG. 30 depicts an exemplary embodiment that includes a side wall that may be used to provide further security for product on a shelf or a portion of a shelf.
Figure 31:
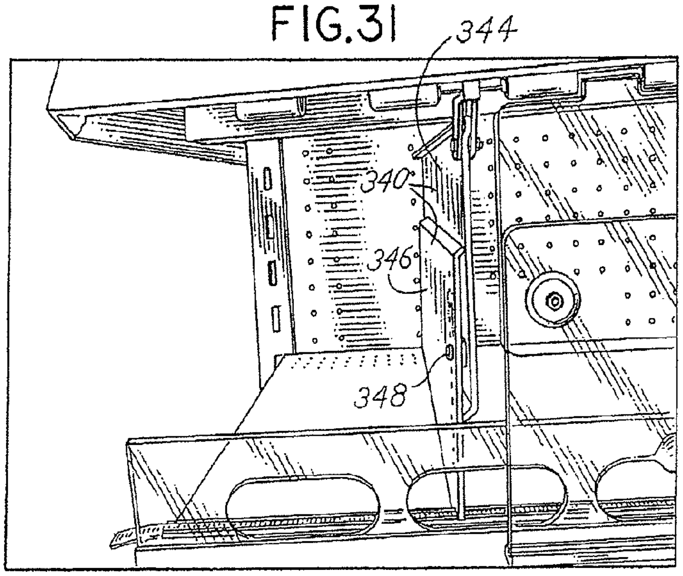
FIG. 31 depicts another view of the wall of FIG. 30.
Figure 32:
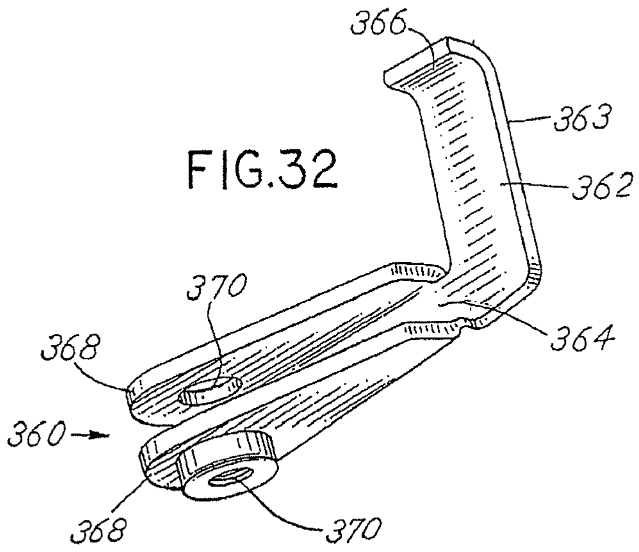
FIG. 32 depicts an isometric view of a clip that may be used to further secure a side wall to the shelf.
Figure 33:
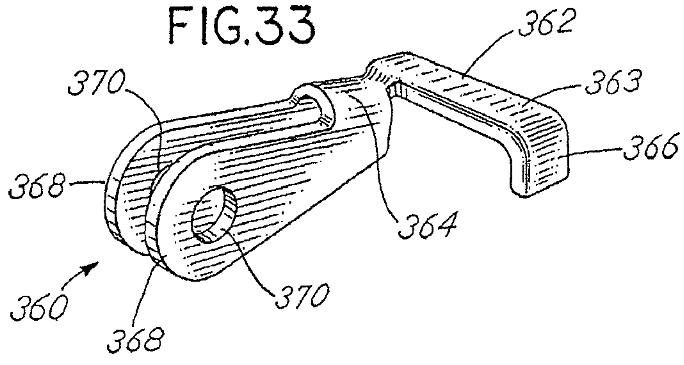
FIG. 33 depicts another view of the clip of FIG. 32.

Referring to FIGS. 25, 30 and 31, walls 340 and 350 are used to segregate a shelf into a higher security area and a lower security area. Walls 340 and 350 can be made from steel and can extend from at or near the floor of the shelf to an area at or near the ceiling of the shelf. The walls also can be adjustable. In an embodiment, the walls can be comprised of a top section 344 and a bottom section 346. As shown in FIG. 31, these two sections can overlap to provide a continuous barrier. The top section 344 of wall 340 and the bottom section 346 of wall 340 can include apertures that align the two walls. A fastener 348 such as a screw, bolt, pin, rod or other fastener can be used to join the two walls at a particular height. The walls also can comprise a floor 342 which includes apertures and can be connected to the floor of the shelf through a fastener 349 such as a screw, bolt, pin, rod or other fastener.

Referring to FIGS. 74-78, in an alternative embodiment, the walls 340 and 350 may be in the form of an adjustable wall 702 that is slidably movable and repositionable. The wall 702 defines one or more elongated channels or slots 704 that permit movement of the wall 702 and adjustment of the location of the wall 702 to a desired position. In an exemplary embodiment, the channels 704 may be vertically and horizontally oriented on the adjustable wall 702. The wall 702 may be moved and positioned, as desired, and secured to a lower wall portion 706 through the use of fasteners 708, such as screws, bolts, pins, rods or or the like. The lower wall portion 706 may include numerous holes 709 for receiving the fasteners 708 and may include a floor 710 which may include a plurality of holes 711 for mounting the floor 710 to the to the floor of the shelf as described above. For convenience in adjusting the wall 702 relative to the lower wall portion 706, a tool 714, such a hex key, wrench, screw driver, or the like, may be mounted to the lower wall portion 706 to be used by a user to make the desired adjustments of the location of the wall 702.

Figure 75:
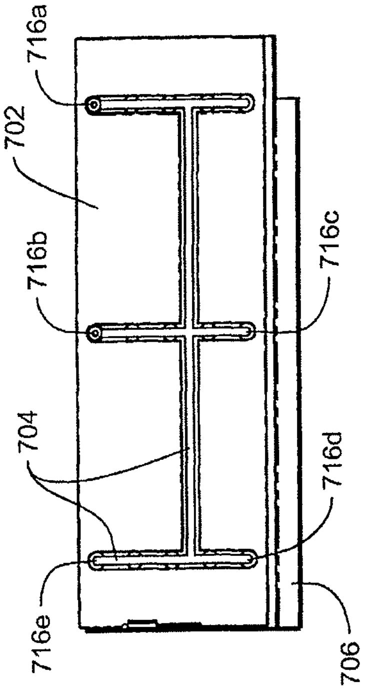
FIG. 75 is a side view of the adjustable wall of FIG. 74.
Figure 76:
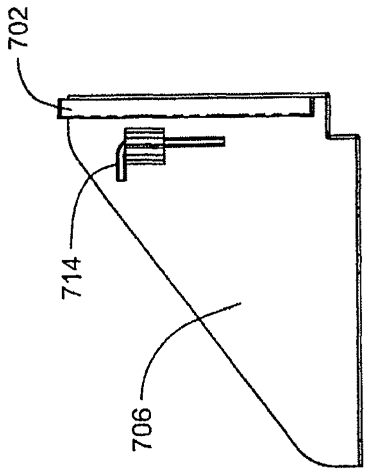
FIG. 76 is an end view of the adjustable wall of FIG. 74.
Figure 78:
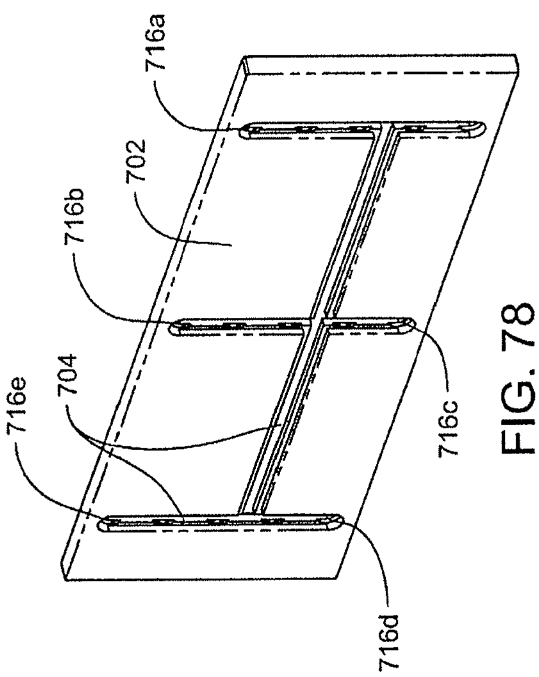
FIG. 78 is another isometric view of the adjustable wall of FIG. 74.
Figure 77:
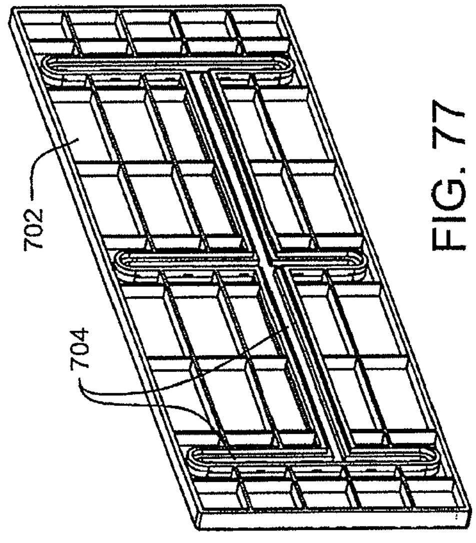
FIG. 77 is an isometric view of the adjustable wall of FIG. 74.
Figure 79:
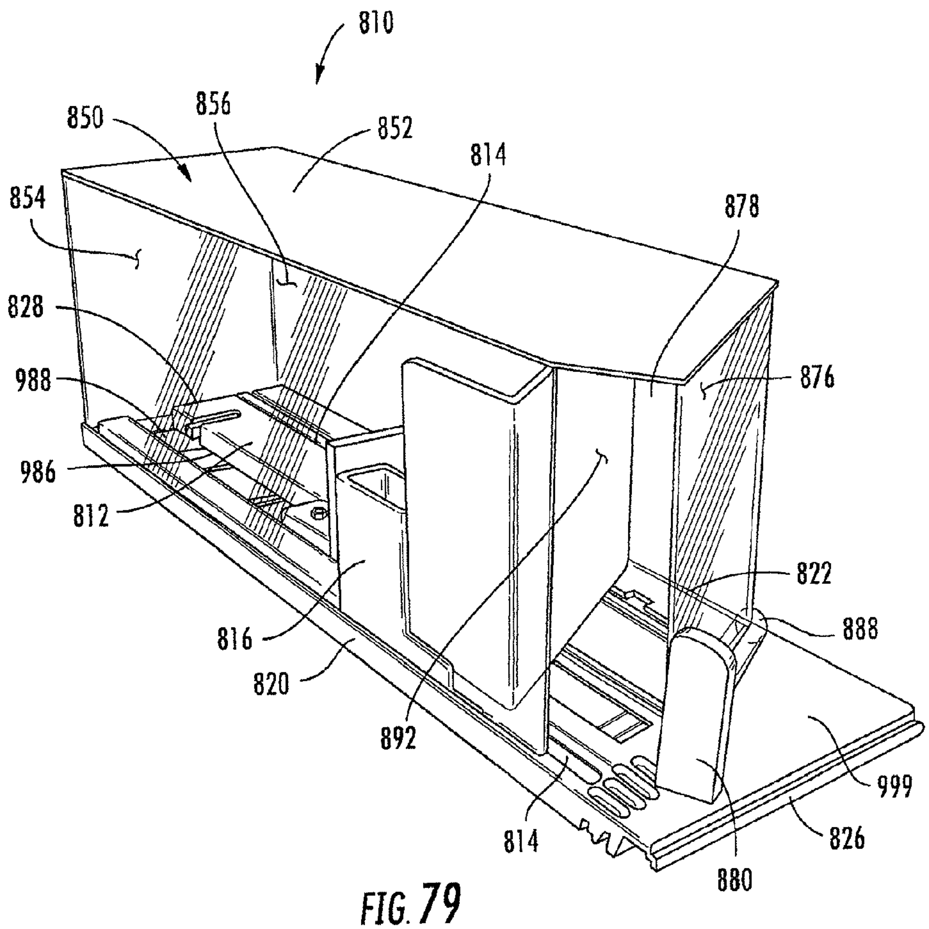
FIG. 79 is an isometric view of an exemplary merchandising system.
Figure 80:
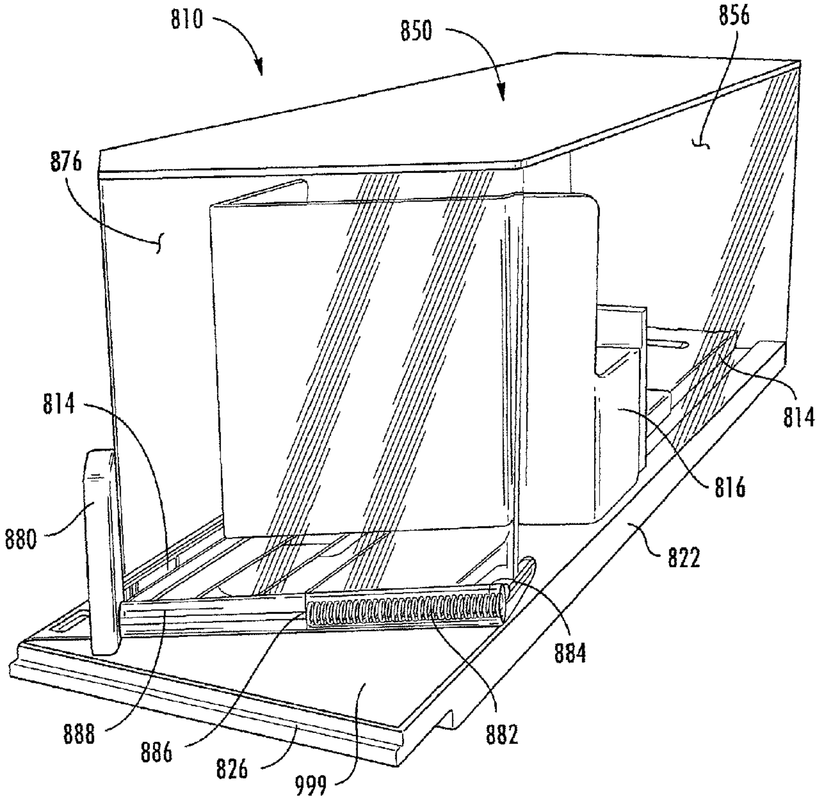
FIG. 80 is another isometric view of the merchandising system of FIG. 79.
Figure 81:
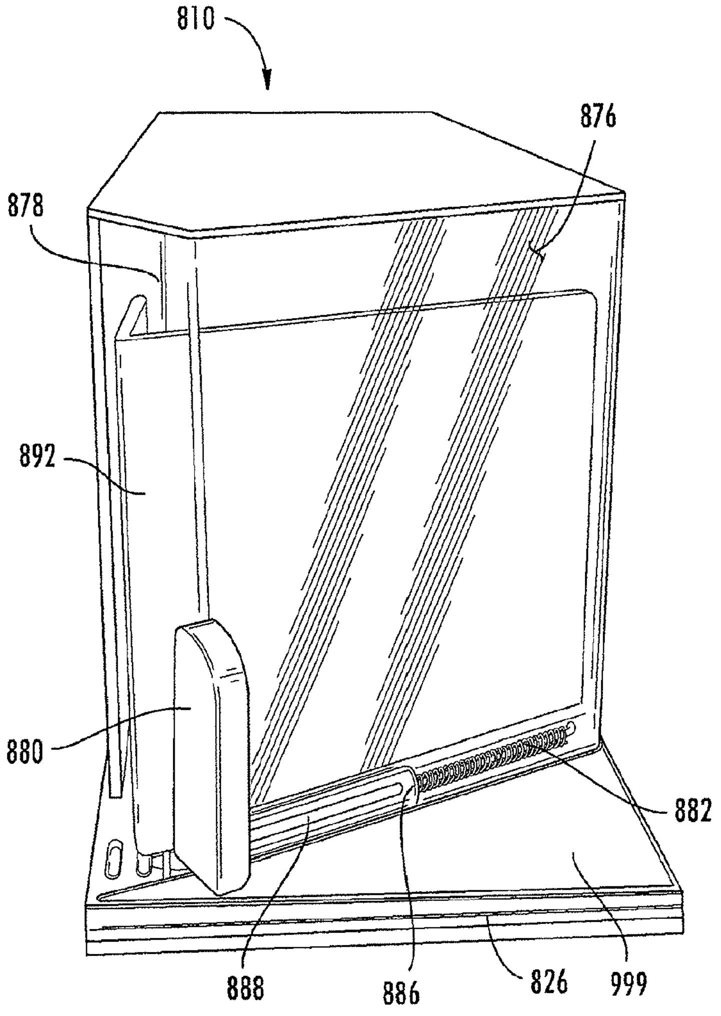
FIG. 81 front view of the merchandising system of FIG. 79.
Figure 82:
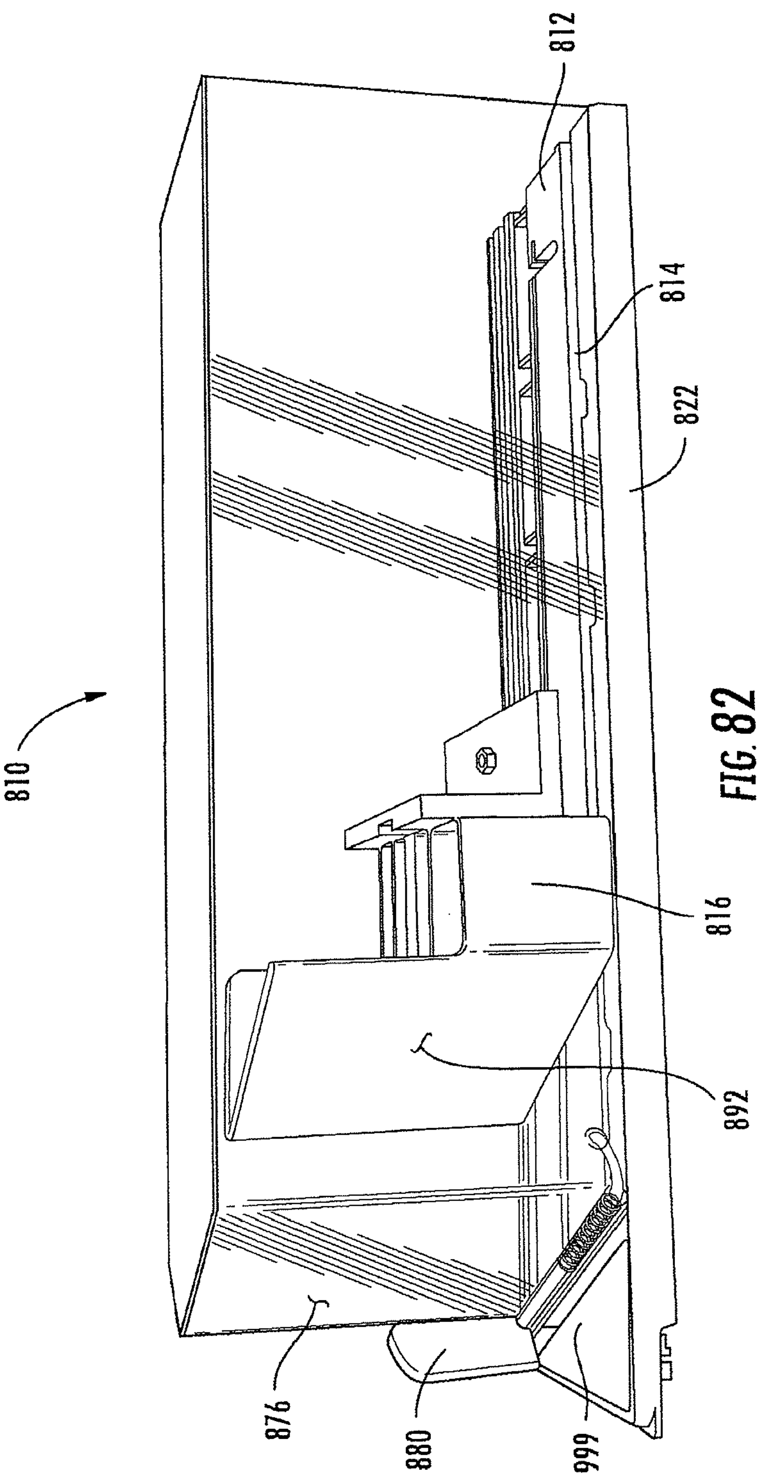
FIG. 82 is a side view of the merchandising system of FIG. 79.
Figure 83:
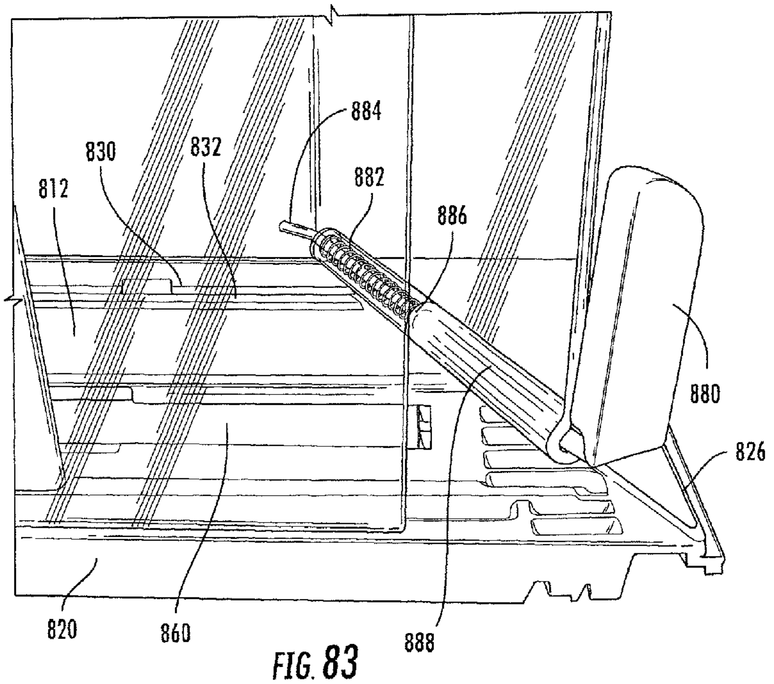
FIG. 83 is a partial side view of the merchandising system of FIG. 79.
Figure 84:
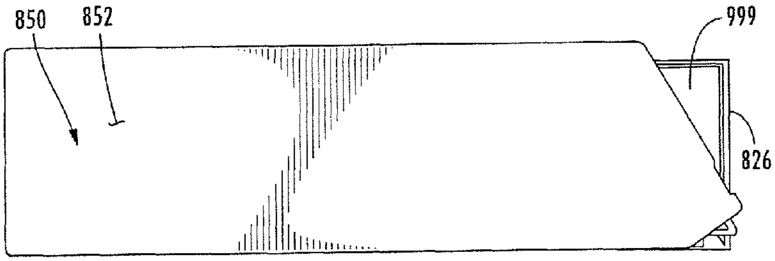
FIG. 84 is a top view of the merchandising system of FIG. 79.

As should be readily apparent, the elongated channels 704 provide for numerous mounting positions of the wall 702 relative to the lower wall portion 706. In an exemplary position, the wall 702 is fastened to the lower wall portion 706 such that the fasteners 708 are located at positions 716*a* and 716*b* in the elongated channel 704. In this position, as shown by FIG. 75, the wall 702 will be in an unextended position. In one of the numerous alternate positions, the wall 702 may be positioned and the fasteners 708 may be located at positions 716*c* and 716*d*. In this position, the wall 702 will be in an extended position such that the wall 702 extends upward relative to the lower wall portion 706 and away from the lower wall portion. In this position, the wall 702 may serve as an additional barrier to inhibit access to the shelf and thereby further secure the products on the shelf. As yet another example, the wall 702 may be positioned and the fasteners 708 may be located at positions 716*b* and 716*e*. In this position, the wall 702 will be in an extended position such that the wall 702 extends away from the lower wall portion and will be at the same height as the lower wall portion. It should be readily apparent that numerous other positions of the wall 702 relative to the shelf are possible depending on the desired level of security and the configuration of the shelf, and the tool 714 provides convenience and ease of adjustment of the wall 702. It should be understood that the elongated channel may define numerous other configurations that still permit movement and adjustment of the wall 702 relative to the lower portion. The system illustrated by FIGS. 74-78 may further be configured and mounted on either or both ends of the shelf, and if desired, to the front or rear of the shelf. Also, the wall may be made of any suitable material, such as metal or plastic.

Referring to FIGS. 25-27, 30-33 a clip or clip member 320 or 360 may be used to further secure the wall 340, 350 to the shelf 104 and in particular the walls that separate secure products from non-secure products. The clip 320, 360 also can be used to secure divider 110 to a shelf 104 (embodiment not shown). The clip 320, 360 may be used to strengthen the wall 340, 350 to prevent the bending or moving of the wall. With the use of the clip 320, 360, the wall 340, 350 may be made of a thinner, less costly material because the clip 320, 360 will prevent potential bending or twisting of the wall to access the product on the shelf. The walls 140, 150 also are known as side walls.

Figure 27:
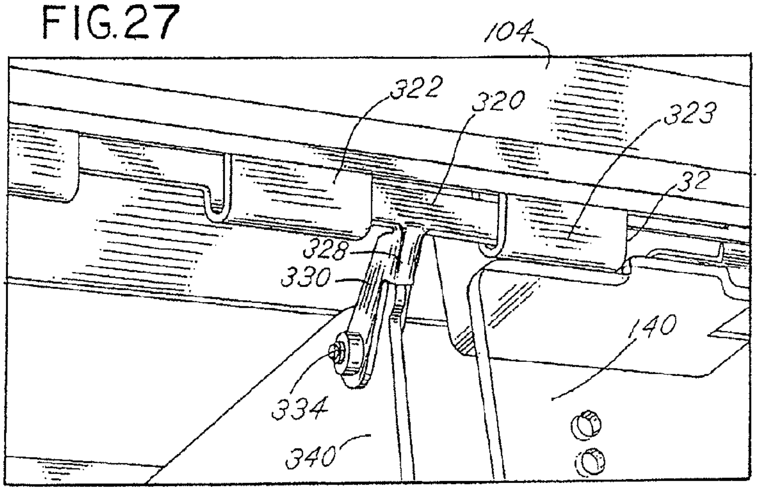
FIG. 27 depicts a close-up view of the mounted clip of FIG. 25.

In an exemplary embodiment, the clip 320, 360 is configured at one end to engage a hinge rail 322, which is used to hinge the barrier 140, discussed below, to the shelf 104. The hinge rail 322 is mounted to a shelf. The clip 320, 360 mounts to the shelf through its interaction with hinge rail 322. The clip 320, 360 is further configured at an opposite end to engage the wall 340, 350. More particularly, the clip 320 includes a blade portion 324 that is configured to engage with the hinge rail 322 and at any of the multiple positions along the hinge rail 322, thus providing flexibility in the placement of the clip 320. The blade portion 324 may take on numerous shapes and configuration and may be connected to or joined with a clip body 328. The clip body 328 is further connected to or joined with opposing wall mounting members 330. The wall mounting members 330 are configured to be positioned on opposing sides of a wall 340 with the wall passing between the mounting members 330. The wall mounting members 330 further define aligned holes 332 for receiving a mounting fastener 334 that may be used to secure the mounting members 330 to the wall 340, as depicted by FIG. 27. The aligned holes 332 may be thru holes or threaded holes. As can be appreciated, any type of fastener or securement technique may be used to secure the clip 320 to the wall 340.

Where a wall 340 or 350 is placed at the side end of a shelf, a clip 360 can be used to further secure the wall 340, 350 to the shelf 104. At the edge of the shelf, the hinge rail ceases (not shown). Clip 360 includes a blade portion 362 that extends in only one direction from the clip body 364. The blade portion 362 is configured to engage the hinge rail 322. In an embodiment, the blade portion engages only a single hinge piece or knuckle of the hinge rail. For example, in FIG. 27, a single hinge piece or knuckle is designated by 323. The blade portion 362 includes a first blade portion 363 and a second portion 366 that can be at an angle to first portion 363. The second portion 366 can be configured to interact with the side 324 of knuckle 323. The blade 362 may take on numerous shapes and configuration and may be connected to or joined with a clip body 364. The clip body 364 is further connected to or joined with opposing wall mounting members 368. The wall mounting members 368 are configured to be positioned on opposing sides of a wall 350 with the wall passing between the mounting members 368. The wall mounting members 368 further define aligned holes 370 for receiving a mounting fastener (not shown) that may be used to secure the mounting members 368 to the wall 350. The aligned holes 370 may be thru holes or threaded holes. As can be appreciated, any type of fastener or securement technique may be used to secure the clip 360 to the wall 340 or 350.

A front retaining wall 116 may be positioned along the front edge of the shelf 104. The front retaining wall 116 can serve as a “fence” to restrain the product in the product lanes 112 and assist in preventing the product from falling off the front of the shelf 104. The retaining wall 116 stops the forward movement of product that is caused by the urging of the pushers, described below. As exemplified by FIG. 6, the retaining wall 116 may be mounted to a channel or rail 118 that extends along the front edge 119 of the shelf 104. The channel or rail 118 may be mounted to existing holes in a standard dealer shelf, or secured by any other known manner to the shelf 104. The retaining wall 116 may be mounted to or on the channel or rail 118. The front retaining wall 116 may be made of a clear plastic to permit visualization of the product on the shelf and provide a more aesthetically pleasing organization to the merchandised product. The front retaining wall 116 can also be created from opaque or semi-transparent material, or from wire, and can be adaptable to display graphics. The front retaining wall 116 can have a variety of configurations, such as rectangular, oblong, repeating patterns or the like.

Figure 7:
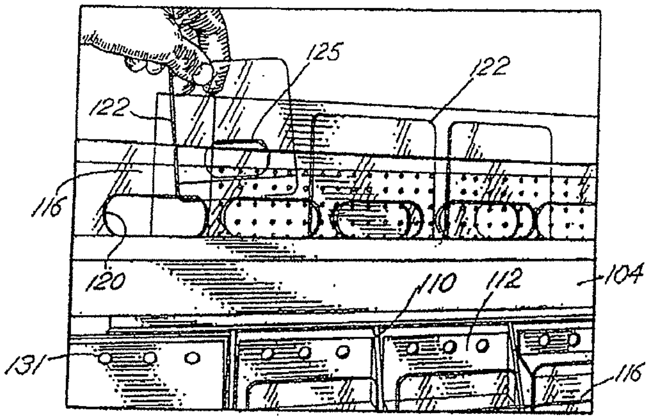
FIG. 7 depicts a front elevation view of an exemplary embodiment of a front retaining wall and a secondary retaining wall.

As more clearly shown in FIG. 7, the front retaining wall 116 may also include holes or openings 120 extending therethrough that are spaced along the wall 116. The holes 120 permit the consumer and store personnel to push the product back and away from the retaining wall 116 for ease of insertion and removal of the product.

As shown in FIGS. 1 and 2, the retaining wall 116 can have a height that permits the removal of a single product at a time or, depending on the desired level of security, a couple of products or a few products at a time. In other words, the height of the retaining wall 116 can permit limited access to and removal of product from the display system 100. Stated another way, the retaining wall 116 is not so tall as to prohibit any access to the product, but is sized to allow the consumer or store personnel to access and lift a limited number of product over the retaining wall 116 at one time. This limited removal of products is accomplished through the use of the retaining wall 116 and the close proximity of the shelf 104 positioned above the product. That is, in one embodiment, the shelf 104 located above the product will be positioned in close proximity to the top edge of the product, or the top edge of the product divider 110, whichever is taller. The shelf 104 located above the product, the product dividers 110, and the retaining wall 116 will form an opening or window 131 through which only a single, two, or possibly a few, product(s) can be removed at one time or in a single motion. This configuration also deters “sweeping” of product from the shelf 104. The size of the window 131 can be adjusted by adjusting the location of the shelf 104 above the product, the dividers 110, and/or the retaining wall 116, or through the use of a second retaining wall 122, barrier 130, and/or barrier 140, described below. This window 131 adjustment permits flexibility with the system and allows the store to set the window 131 size depending on the product size and how many products they want to permit consumers to remove at a time.

In an exemplary embodiment, if taller products are merchandised on the shelves 104, or if a smaller window 131 is desired, a second retaining wall 122 may be positioned behind or possibly in front of the retaining wall 116 to serve as a retainer for the product. As used herein, the second retaining wall 122 may be referred to as a “tab” and may include any retaining structure or “fence” that can be selectively configured or mounted to the shelves 104 to provide selective theft prevention of specific products, such as high theft items. Consequently, the second retaining wall or tab 122 may have many configurations, shapes and designs, and may be used in front of individual rows of product or groups of rows of product.

As shown in FIGS. 6 and 7, the second retaining wall or tab 122 may be mounted to or on a second channel or rail 124 that extends parallel with the channel or rail 118. The retaining wall or tab 122 may be slidable relative to the shelf 104 or rail 124, or may be fixed relative to the shelf 104 or rail 124. The tab 122 can be positioned between adjacent dividers 110 and held in position between the dividers 110. In other words, the tab 122 may not be permitted much slidable movement in or on the channel or rail 124 because the dividers 110 will hinder such slidable movement. In some embodiment, the dividers 110 contain a portion that serves as a stop to prevent the tab or first retaining wall from moving laterally. Such configuration further prevents theft of the product as potential thieves will not be permitted to simply slide the tab 122 to the side and remove numerous products at a time.

The second retaining wall or tab 122 will have a height that permits access to and removal of a limited number of product. If desired, the tab 122 may have a height that permits removal of only one product at a time. With the use of tabs 122, the display system 100 will have flexibility in that tabs 122 of varying height may be positioned in front of the product lanes 112 to accommodate various sized products. That is, if a row of product has a product height that is different than a product in an adjacent row, tabs 122 of varying height can be used to provide the proper level of security and access to the product.

In one embodiment, the tabs 122 may be sized to extend across one product lane 112 or in front of a single row of product. In an alternative embodiment, the tab 122 may be sized and shaped to extend across multiple product lanes 112. In this embodiment, the tabs 122 could include slots or channels to permit the tabs to “straddle” the dividers 110 and thereby extend across multiple product lanes. In addition, the dividers 110 could extend through the slots or channels and thereby inhibit slidable movement of the tabs 122.

The second retaining wall or tab 122 may also be used in place of the retaining wall 116. In other words, the front “fence” on a product facing may be the tabs 122 of varying height, length and width, or of the same dimensions. In this configuration, the channel or rail 118 may be used to mount dealer-shelf accessories, such as clip-in signage, price tag holders, and the like. The tab 122 also can be attached to the divider 110 or can be formed such that the tab 122 and divider 110 are an integral piece. A wall or partial wall structure such as tab 122 can exist at the front of the divider 110 and can extend to the left or right or to both the left and right of the divider. This wall or partial wall can be used with or without a front retaining wall 116.

In an exemplary embodiment, the tabs 122 may include holes or openings 125 through the tab 122, similar to the holes or openings 120 in the retaining wall 116, to permit the consumer and store personnel to push the product back and away from the retaining wall 116 and tab 122 for ease of insertion and removal of the product. In other words, the holes or openings 126 allow product to be replaced by a consumer who removes it and decides not to purchase the product. To this end, the holes or openings 120, 125 are constructed to allow finger access therethrough to push back the row of product. Once the products are pushed backward, the consumer or store personnel can replace the removed products back into the facing. It should be understood that tabs 122 also can be used that do not include the holes or openings 125.

In an exemplary embodiment, the tab 122 may provide securement for an individual row of a product facing. That is, it may be desirable to provide additional theft deterrence for an individual row of product. In this configuration, the tab 122 having the desired dimensions may be positioned in front of a desired product row to provide additional securement for just that row of product. This embodiment will provide the stores with additional flexibility with their planograms and product facings in that individual tabs 122 of different dimensions may be placed at various locations across the facing to enhance the securement of particular products.

In an embodiment, retainer tabs 122 can be used on an individual facing basis for specific products. If a shelf is merchandised with product packages of variable height, the retainer wall 116 must be of a height that allows the shortest product package to be lifted over it. If a shelf 104, barrier 130, or barrier 140 is employed above the product, then the shelf 104 or barriers 130, 140 must be located at a height above the product to allow the placement of the tallest product below it. This may allow a thief easy access to the taller product by being able to easily lift the taller product in quantity over the relatively short retainer wall 116. It can be desirable, then, to increase the height of a front barrier only in front of the taller product. The second retaining wall or tab 122 can be of a taller height than the retaining wall 116 and can be generally taller than required for the small product packages. The retainer wall or tab 122 can therefore be constructed and used to limit access to the taller product and removal of several taller products at a time or in one motion, further securing product and deterring theft. Similarly, the retainer wall or tab 122 can be constructed and used to limit access to smaller but deeper products and to limit the removal of several smaller but deeper products at a time or in one motion. The retainer tab 122 thus allows flexible placement of product on a shelf by the retailer and manufacturer, no matter the size, shape, and configuration of the product.

The retaining wall 116 and tab 122 may be mounted, directly or indirectly, to the shelf 104 using numerous techniques. The retaining wall 116 and tab 122 may be slidably mounted to or receivable in the channels or rails 118, 124, which are secured to the front edge of the shelf through fasteners, adhesives, friction, tension, magnetism, or other restraining techniques and methods. The retaining wall 116 and tab 122 may also be directly mounted or connected to the shelf 104 also through the use of fasteners, adhesives, friction, tension, magnetism, or other restraining techniques and methods. The retaining wall 116 and tab 122 may be fixed to the shelf 104 or removably mounted to the shelf 104 to permit additional flexibility in the design and level of security of the system.

Pushers 126 may be placed behind product between the back wall 106 and the front edge of the shelf 104 to push the product forward so that it may be removed from the front of the shelf. The retaining wall 116 and tabs 122, if used, in some embodiments can stop the forward movement of product that is caused by the urging of the pushers. Known pushers may be used with the invention, including the pushers and pusher systems described in U.S. Pat. No. 6,041,720 to Hardy, U.S. Pat. No. 4,830,201 to Breslow, and International Application No. PCT/US02/15760 and corresponding International Publication No. WO 02/091885 A1 to Hardy, all of which are incorporated herein by reference. The pushers 126 may be spring-urged pushers that move along a track 128 to push product toward the front edge of the shelf 104, as shown in FIG. 6. Track 128 can form a floor on one side of the divider. A second floor, with or without a track, can be located on the other side of the divider.

In an embodiment, the pushers 126 may have a pusher face or paddle 129 that may extend laterally to increase the pushing surface of the pusher to thereby pusher wider product more effectively. In other words, the pusher 126 may have an extendable pusher face to push either narrow product or wide product. The pusher face or paddle 129 may be extendable from a retracted position to one of several extended positions. The extended pusher face locates the product pushing surface behind the center or near the center of the wider product, thereby greatly enhancing the pushing leverage on the wider product. Numerous other types of pushers and pusher faces may be used with the invention, including the systems and pushers described in U.S. patent application Ser. No. 10/772,134 to Hardy, which is incorporated herein by reference.

The pushers 126 may be stand-alone units that are mountable to the shelf 104 using any known technique, including the channel mounting technique depicted in the figures. That is, in one embodiment, the pusher 126 may be mounted to a front rail or channel 133, as shown in FIG. 6, and may be slidably adjustable within or on that rail or channel. Alternatively, the pushers 126 may be used in conjunction with dividers 110 and may be operatively mounted to the dividers 110, as disclosed in the above referenced patents and application, or as known in the art.

In another embodiment, the pushers 126 may incorporate spring mechanisms, such as coil springs, that include an indicia strip. The indicia strip is provided on spring mechanism and contains data relating to the position of the pusher 126. A sensor assembly may scan the indicia strip and transmit data representative of the product and the position of the pusher on the display system to a store computer or some other suitable device, such as a portable computer or controller. The transmitted data can be used to determine inventory levels and can be done so in real time. With this embodiment, the amount of product removed from a particular location in the store can be determined This information can be used to determine the effectiveness of product placement and promotional displays, particularly when a product can be obtained from various places within the retail store. And with respect to deterring theft, a deviation in the typical purchasing habits of the consumer can trigger an alarm. That is, the alarm can be used to alert security personnel to the fact that too much product has been removed from the shelf at one time and thus a potential theft has occurred. The location of the incident can also be used to alert a security camera so as to focus the camera in the direction of the potential theft, as discussed below. With this embodiment, numerous types of sensors and detection techniques may be used to monitor the relative position and movement of the pusher 126. For example, in an embodiment, the indicia strip may contain numerous types of patterns that can be optically readable or can be read using several different types of detection methods, such as passive variable capacitance, inductance, resistance, magnetics, or active signal detection. Numerous other types of sensors and detection techniques are possible with the invention for detecting unusual movement of the pusher 126 that may be indicative of a potential theft situation, including the systems and techniques described in U.S. patent application Ser. No. 10/772,010 to Swafford et al., which is incorporated herein by reference.

In other exemplary embodiments, the merchandised product may be urged toward the front of the shelf 104 through other techniques, including friction, gravity and/or magnetism. Each of these techniques may be used with the display system 100 and the teachings of the present invention. These techniques may be used with or without dividers 110, depending on the desired application. In one embodiment, the shelf is not completely horizontal but has an incline or decline from back to front.

In another embodiment, the merchandised product may be urged toward the front of the shelf 104 through vibration or quick movements that orient products in a particular direction on the shelf 104. Vibration can cause products to move forward on the shelf 104 and prevent them from moving backward so that the product is front facing. This vibration may be applied through mechanical, electrical or other structures or designs.

In one embodiment, directed vibration moves product toward the front of the shelf. The directed vibration causes product to move in particular directions or in one direction and not to move in other directions. Through this vibration, which is instituted through the shelf 104, upright 102, floor, wall, ceiling or other structure, or through a vibrative pulse or signal traveling through the air, the product moves in a particular direction, such as frontward.

In another embodiment of the vibration technique for urging product forward on the shelf 104, general undirected vibration is applied to the system. This vibration may be applied through the shelf 104, upright 102, floor, wall, ceiling, other structure or through vibration or a signal traveling through the air. Directors, such as small toggles, ridges, flanges, fingers, or the like, cause product to move in a particular direction depending on their configuration, shape, and orientation. These directors can channel the energy from unspecific vibration and force product in a particular direction, such as frontward. The directors can be placed on the shelf 104, divider 110, floors, walls or ceilings of the system and can be incorporated into the product itself.

In an embodiment of the vibration technique, product sits on a floor and friction moves product toward the front of the shelf. In one embodiment, the floor may be a flat surface panel operatively coupled to a motion providing device. In use, product is placed on the flat surface panel and a combination of gravity and friction hold the product in place on the flat surface panel. The motion providing device then slowly moves the flat surface panel toward the retaining wall 116 located at the front of the shelf 104. After a preset amount of time, or through product position sensing techniques, the motion providing device quickly, in a jerking motion, pulls the flat surface panel in the opposite direction or, in other words, toward the back of the shelf. By doing so, the quick motion of the flat surface panel breaks the bond of friction between the product and the flat surface panel causing the flat surface panel to slide relative to the product and the product to remain at its location. The motion providing device will then repeat the previously described process and begin to slowly move the flat surface panel toward the retaining wall 116.

Examples of such vibration techniques for urging product forward on a shelf are disclosed in U.S. Patent Application Ser. No. 60/541,859 to Hardy, which is incorporated herein by reference.

As indicated above, the dividers 110, retaining wall 116 and tabs 122 assist in preventing a thief from sweeping a number of products into his or her coat or bag or from taking several products in the same facing. To even further limit the access to the product, in another exemplary embodiment, a horizontal barrier 130 (FIG. 2) may be included above the product packages and secured to the front edge of the shelf 104 positioned above the product. The barrier 130 may be fixed to the front edge of the shelf 104 or may be fixed to uprights 102. The barrier 130 further deters unobstructed access to the product in the product facing by reducing the area, window or opening through which product could be removed from the shelf. The barrier 130 may be constructed separate from the shelf or may be integral with the shelf. The barrier 130 may span one row of product on a facing, or may span multiple rows of product, depending on the desired level of security. Alternatively, the barrier 130 may comprise another shelf 104 positioned just above the product. In this embodiment, the shelf 104 above the product is positioned in close proximity to the product. The barrier 130 restricts access from the front of the shelf 104 to only one or a few products positioned behind the front product in a facing row to permit the removal of only a few products from a shelf, or a product pusher, at one time or in one motion. The retaining walls 116 and tabs 122 may be used conjunctively with the barrier 130 to prevent product from being easily removed from the shelf 104. In other words, the present invention contemplates the use of one, two or multiple barriers or walls to prevent several products from being removed from the shelf at a time or in one motion. The barrier 130 may be made of various materials and may be secured to the front of the shelf 104 through any known technique.

Figure 13:
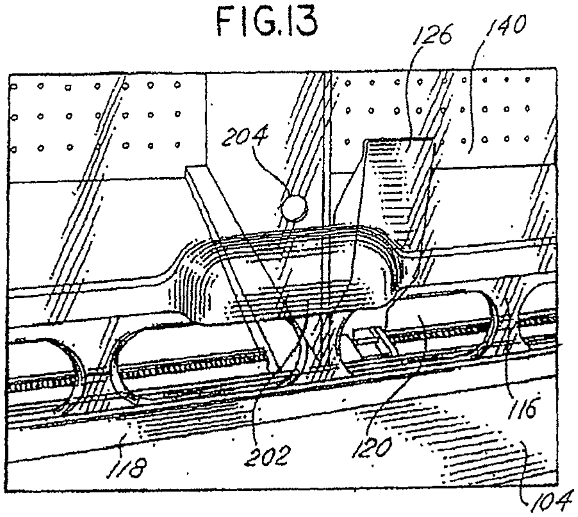
FIG. 13 depicts a close up view of an exemplary handle that may be used with the movable barrier or barrier extension of FIG. 11.

A further embodiment of the invention incorporates a barrier 140 that spans across one or two, some, all or the majority of the top of the product on a shelf 104. The barrier 140 functions similar to a door in that it may be hinged or movably mounted to the edge of the shelf 104, or the barrier 130, just above the product to be protected. As used herein, the term "barrier" is meant to include any structure that will prevent, inhibit or obstruct access to the product on the shelf 104. The barrier can embody numerous shapes and configurations. The barrier 140 may be mounted to the shelf 104 using existing mounting holes on the shelf. The barrier 140 also may be mounted on the front edge of a front rail from the shelf above it. The front edge of the shelf can have hooks or "j" shapes on its underside. The barrier 140 can have apertures which fit within the hooks or "j" shapes. The barrier 140 defines a bottom lip or edge that may meet or overlap the top edge of the retaining wall 116 or tab 122. Such meeting or overlap further closes off access to the product except with deliberate action. In an exemplary embodiment, as shown in FIG. 13, the barrier 140 may include a handle 202 to assist in moving the barrier 140 from a closed position to an open position, and vice versa. The handle may be molded with the barrier 140 along the edge of the barrier as exemplified by FIG. 13, or the handle may be a separate component attached, mounted, secured, or adhered to the barrier 140 using any known technique. One skilled in the art will appreciate that the invention is not limited by a particular shape or configuration of the handle and that the handle may define numerous shapes or configurations. Moreover, the barrier 140 may be configured with a reinforcing rim that extends along the edge of the barrier 140. The reinforcing rim provides additional structural integrity and rigidity to the barrier 140. The reinforcing rim may also be equipped or configured with a handle. If the barrier 140 is configured with a locking mechanism as described herein the reinforcing rim will assist in preventing a potential thief from bending or breaking the barrier 140 and thus giving the thief access to the product that is intended to be locked and secured on the shelf.

A hole or opening 204 may be located in the barrier 140 through which may be mounted a cable lock or similar locking mechanism, as discussed below.

In an alternative embodiment, the product display system includes inverted features.

The aspects of the invention that are placed on a floor or a shelf and extend upward can be placed on a ceiling or extend downward, and vice versa. For example, the barrier 140 and retaining wall 116, the dividers 110, and tabs 122 may be inverted. It is contemplated that in some embodiments the retaining wall 116, the dividers 110, and/or tabs 122 may be configured above the barrier 140 which would extend upwardly from the shelf 104. The retaining wall 116, the dividers 110 and/or tabs 122 may be placed on the underside of the shelf above the product and extend downward. Pushers 126 and/or tracks 128 can be secured to the underside of a shelf such that the pushers extend downward and the pusher springs are located near or behind the portion of the pusher that is near the underside of the shelf.

In some embodiments, to access product behind the barrier 140, the barrier 140 must be moved or lifted, which requires a deliberate movement and the use of one hand to hold the barrier 140 in place. While the barrier 140 is lifted or moved, the product can be removed. A consumer or store personnel who uses one hand to hold the barrier 140 in place, will need to use the other hand to remove product from the display system 100. This embodiment is constructed to inhibit the ability of a consumer to access product with two hands at the same time. While product is accessible to the consumer or store personnel, the removal of large amounts of product in a short period of time is deterred. The barrier 140 can be created from a clear, opaque or semi-transparent material and may be hinged or slidable in a variety of common ways.

Figure 11:
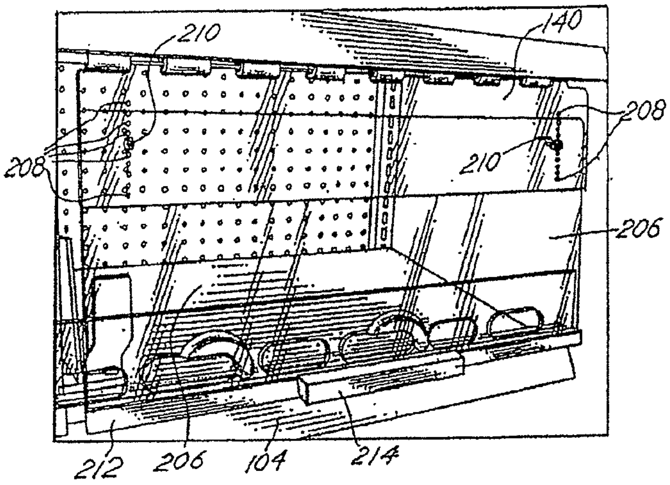
FIG. 11 depicts an exemplary embodiment of a movable barrier and barrier extension that may be used with the present invention.
Figure 12:
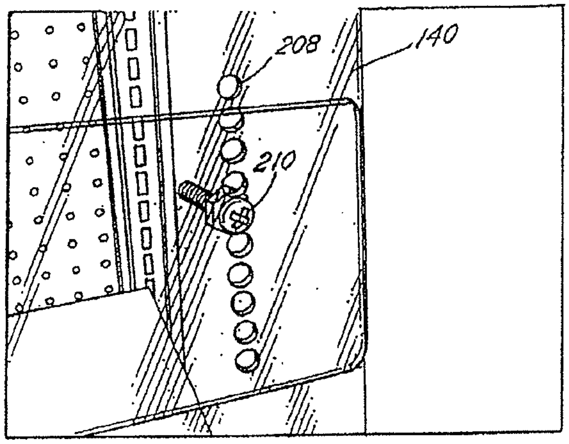
FIG. 12 depicts a close up view of the movable barrier and barrier extension of FIG. 11.

Referring to FIGS. 11 and 12, an adjustable and removable barrier extension 206 may be configured with the barrier 140. The barrier extension 206 may be used to provide additional product security by creating a larger barrier to prevent or limit access to the product on the shelf. The barrier extension 206 may be selectively mounted to the barrier 140 through the use of mounting holes 208 and fasteners 210. As shown in the figures, several mounting holes 208 can be located on either the barrier 140 or the barrier extension 206 or both. These mounting holes can be aligned vertically or non-vertically. The several mounting holes 208 permit the barrier extension 206 to be adjusted relative to the barrier 140 to permit the barrier extension 206 to extend a desired distance, depending on the application, the desired level of security, or the placement of the shelves. Other techniques for mounting or attaching the barrier extension 206 to the barrier 140 are possible with the invention, including techniques using other types of fasteners or adhesives.

The barrier extension 206 can define numerous shapes and configurations depending on the desired application and level of product securement. For example, the barrier extension 206 can be configured to extend across one row of product, one facing, or more than one row or facing. The barrier extension 206 may also be made of a clear, transparent, or semi-transparent material to permit or prevent the product on the shelf to be visible to a consumer or stock person. The barrier extension 206 may also include a handle similar to the handle 202 described above.

The barrier extension 206 may include a reinforcing rim 212 that provides additional structural integrity and rigidity to the barrier extension 206 to further provide additional product security. The reinforcing rim 212 may also be equipped or configured with a handle 214. If the barrier extension 206 is configured with a locking mechanism as described herein, or configured to be in a locked position, the reinforcing rim 212 will assist in preventing a potential thief from bending or breaking the barrier extension 206 and thus giving the thief access to the product that is intended to be locked and secured on the shelf.

Figure 10:
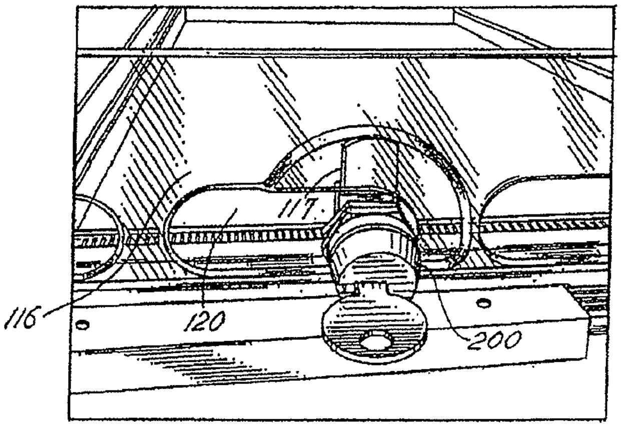
FIG. 10 depicts an exemplary lock mechanism that may be used with the present invention.
Figure 14:
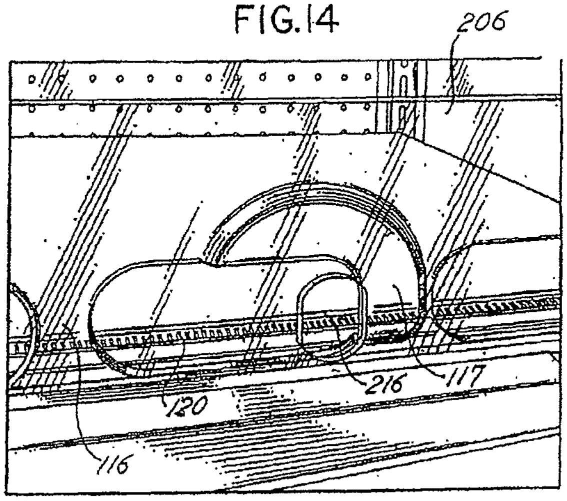
FIG. 14 depicts a close up view of the movable barrier and barrier extension of FIG. 11 defining an opening and mounting structure for receiving the lock mechanism of FIG. 10.

A locking mechanism may be further added to the barrier 140 to further hinder or prevent access to the product on the shelf. In an exemplary embodiment, as shown in FIG. 10, a cylinder lock 200 may be used to secure and lock the barrier 140 or barrier extension 206 in a closed position to prevent access to the product. The lock 200 may be mounted to the barrier 140 or barrier extension 206, through a opening or hole 216 (FIG. 14), and may be configured to mount through the openings 120 in the retaining wall 116.

In one embodiment, the lock 200 may engage an arcuate-shaped wall portion 117 configured in or formed with the retaining wall 116. The arcuate-shaped wall portion 117 will further secure the lock 200 to the retaining wall 116 by permitting the locking tab of the cylindrical lock 200 to more securely seat on, or be held in place relative to, the retaining wall 116. With the use of a lock, such as lock 200, a consumer or store personnel will need to use a key, special tool, or access card to open the lock prior to moving or lifting the barrier 140.

In one embodiment, the lock 200 may engage an arcuate-shaped wall portion 117 configured in or formed with the retaining wall 116. The arcuate-shaped wall portion 117 will further secure the lock 200 to the retaining wall 116 by permitting the locking tab of the cylindrical lock 200 to more securely seat on, or be held in place relative to, the retaining wall 116. With the use of a lock, such as lock 200, a consumer or store personnel will need to use a key, special tool, or access card to open the lock prior to moving or lifting the barrier 140.

Figure 18:
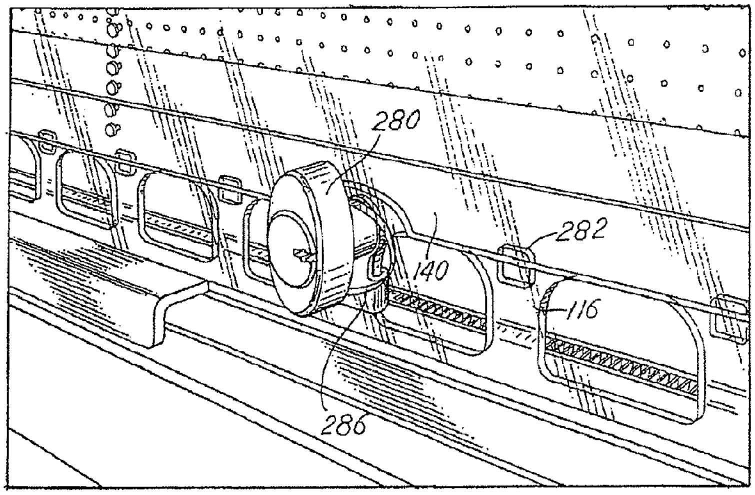
FIG. 18 depicts another exemplary lock mechanism that may be used with the present invention.
Figure 19:
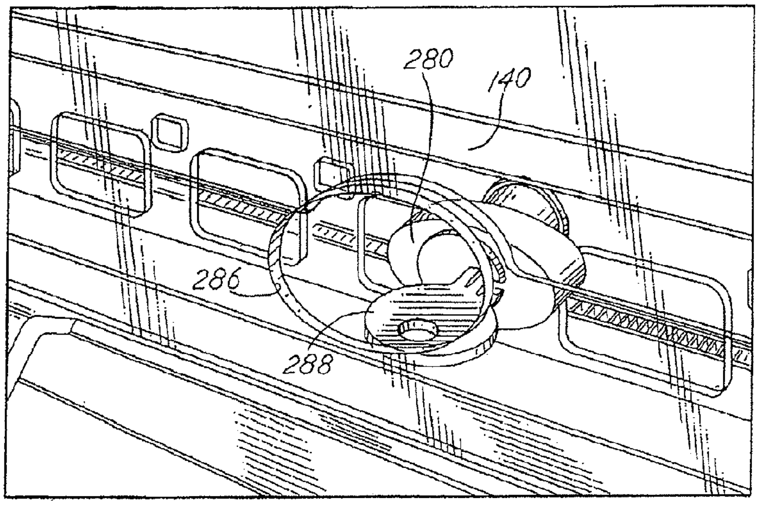
FIG. 19 depicts another view of the exemplary lock mechanism of FIG. 18.
Figure 20:
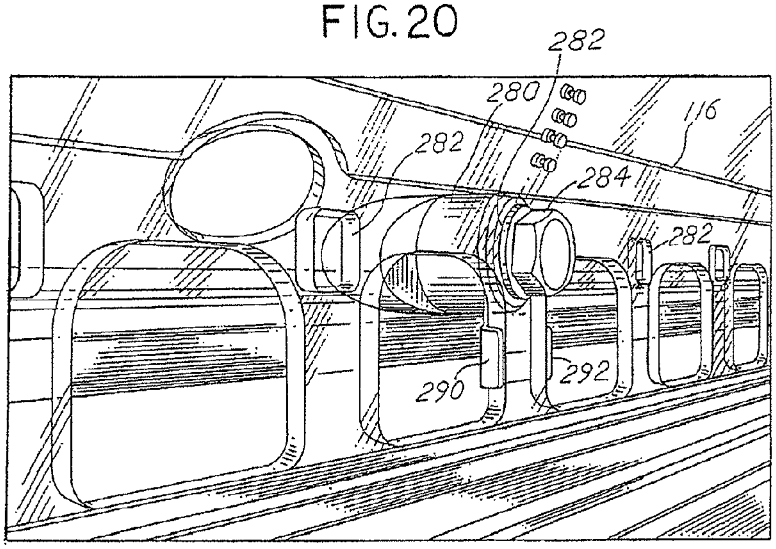
FIG. 20 depicts a back view of the exemplary lock mechanism of FIG. 18.

Referring to FIGS. 18-20, another exemplary lock mechanism is depicted. A lock 280 may be a key-locked rotating oval-shaped lock. The lock 280 is secured to the retaining wall 116 through a hole 282 formed in the retaining wall 116. More specifically, and referring to FIG. 20, the lock 280 includes an anchoring bolt that defines a bolt head 284. The bolt head 284 and washer, if used, will secure the lock 280 to the retaining wall 116. As can be seen in FIG. 20, numerous holes 282 may be positioned along the retaining wall 116 to provide flexibility in the location and placement of the lock 280, as well as providing for the use of numerous locks 280. The lock 280 also can include flanges 290, 292 that interact with retaining wall 116.

Referring to FIGS. 18 and 19, the barrier 140, or barrier extension 206 if used, defines an oval-shaped opening 286. Similar to the flexibility provided by the numerous holes 282, numerous openings 286 may be placed along the barrier 140 or barrier extension 206 to provide the same flexibility. As shown in FIG. 18, when the lock 280 is in a locked position, the opening 286 prevents the lock 280 from passing through the opening 286. As illustrated by FIG. 19, when the lock 280 is moved to an unlocked position through the use of a key 288, the oval-shaped lock 280 will to pass through the oval-shaped opening 286 thus permitting the opening of the barrier 140 or barrier extension 206. With the use of the lock 280 and its mounting to the retaining wall 116, as opposed to a lock mounted on the barrier 140 or barrier extension 206 and extending into the shelf, there will be no interference with product on the shelf, as may sometimes occur with the barrier-mounted locks. In addition, the lock 280 can, but need not, interact with the channels or rails 118, 124 and can leave these channels or rails substantially free to receive other objects such as a retaining wall or tab 122. As can be appreciated, the invention is not limited to the depicted oval-shape lock 280 and opening 286 as well as the illustrated placement of the lock and opening; rather, many various shaped keyed or keyless locks may be used with similarly shaped openings formed in the barrier or barrier extension and placed in numerous locations and still achieve the benefits of the invention.

Alternatively, FIGS. 21-24 depict an additional locking mechanism. A lock plate 302 can extend through an opening or slot 304 formed in the retaining wall 116 and through an opening 306 formed in the barrier 140 or barrier extension 206. The lock plate 302 is configured to receive the padlock 300. One or more of the openings or slots 304 may be formed in the retaining wall 116 at various positions along the retaining wall including the depicted positions between the holes or openings 120 in the retaining wall 116. The openings or slots 304 are configured to receive the lock plate 302 and to secure the lock plate 302 onto the retaining wall 116, as described below. While the openings or slots 304 are depicted as vertical slots, other shapes and configurations of the openings or slots 304 are possible with the invention. Padlock 300 may be used to secure and lock the barrier 140 or barrier extension 206 in a closed position to prevent access to the product. The padlock 300 may be any known keyed or keyless padlock and may be mounted to the barrier 140 or barrier extension 206 through the use of a movable lock plate 302.

As can be appreciated, depending on the desired level of security, one or more lock plates 302 may be used to secure and lock the barrier 140 or barrier extension 206 in a closed position to prevent access to the product. The lock plates 302 are movable in that they can be positioned within any of the openings or slots 304 along the retaining wall 116. Being movable also permits the barrier 140 or barrier extension 206 to be made in various widths to protect only those products on the shelf that must be protected. In addition, the lock plate 302 need not interact with the channels or rails 118, 124 and can leave these channels or rails substantially free to receive other objects such as a retaining wall or tab 122.

Figure 21:
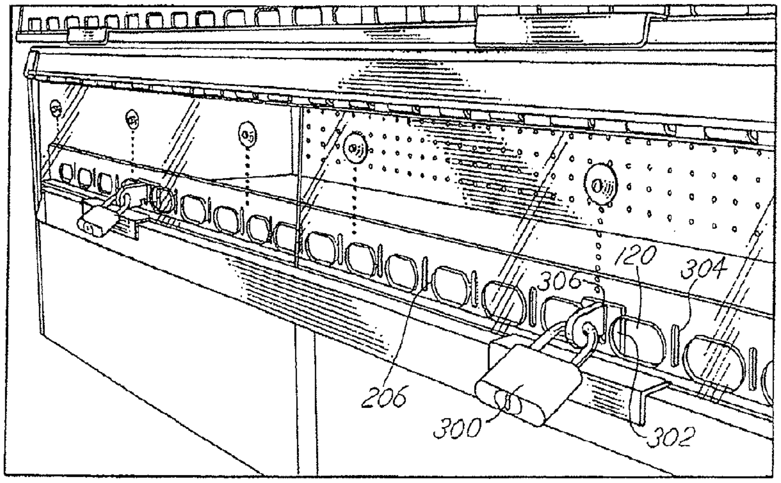
FIG. 21 depicts yet another exemplary lock mechanism that may be used with the present invention.
Figure 22:
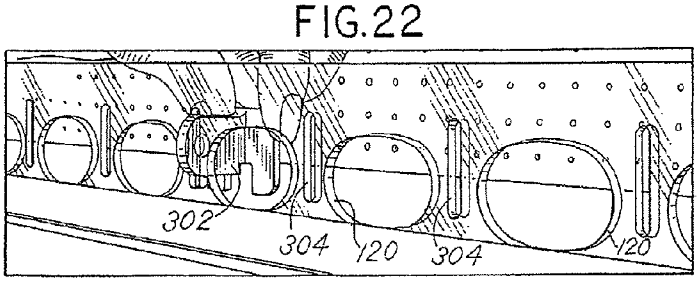
FIG. 22 depicts another view of the exemplary lock mechanism of FIG. 21.
Figure 23:
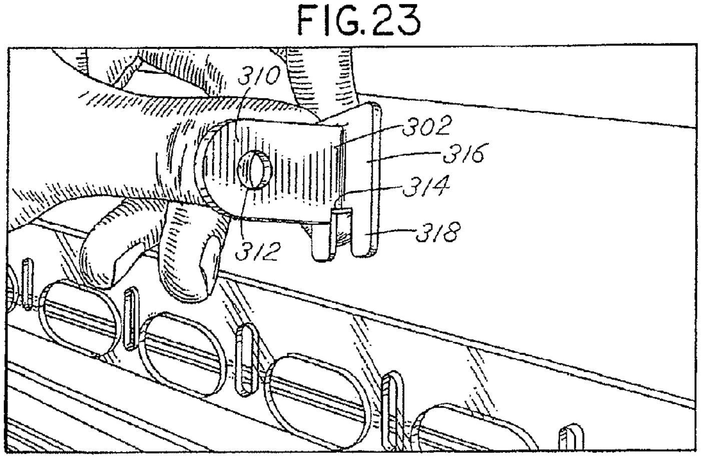
FIG. 23 depicts a close-up view of the lock plate of the exemplary lock mechanism of FIG. 21.
Figure 24:
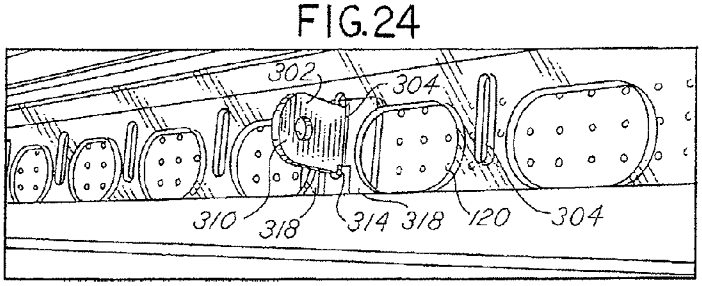
FIG. 24 depicts another view of the lock plate of FIG. 23.

In an exemplary embodiment, the lock plate 302 may be made of any suitable metal or plastic material and may define a nose 310 that will extend through the retaining wall 116 and barrier 140 or barrier extension 206, if used. The nose 310 further defines an opening or hole 312 for receiving the padlock 300, as illustrated by FIG. 21. The nose 310 also defines a notch or cut-away 314 that, when assembled, will seat on the bottom edge of the opening or slot 304, as shown in FIG. 24. Once in this position, the notch or cut-away 314 will prevent the lock plate 302 from being slid or pushed back out of the slot 304 and behind the retaining wall 116.

The nose 310 is connected to or formed with a back plate 316. The back plate 316 includes legs or retaining members 318 that, when assembled, will be positioned behind the retaining wall 116 and assist in holding the lock plate 302 on the retaining wall 116. The back plate 316 and retaining members 318 may take on numerous configurations that aid in holding the lock plate 302 to the retaining wall 116. The lock plate 302 may be configured to not only extend through the retaining wall 116 and barrier 140 or barrier extension 206, it may also extend through and be used with the tab 122.

One skilled in the art will appreciate that any known locking mechanism can be used with the invention, including a cable lock that may be mounted with the hole 204 (FIG. 13), and any known key, special tool, access card, electronic, magnetic or wireless means (for keyless locking mechanisms) can be used to open the locking mechanism.

Figure 8:
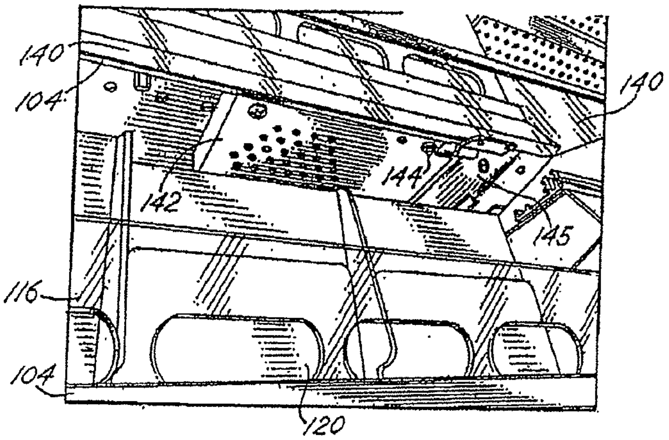
FIG. 8 depicts a front elevation view of an exemplary embodiment of a front retaining wall and a secondary retaining wall with product displayed on the shelf.

As depicted in FIG. 8, an exemplary embodiment of the invention incorporates a system that causes an alert to store or security personnel that a potential theft situation exists. In one embodiment, lifting or moving the barrier 140 activates a mechanical or electronic alert device 142, generally depicted in the figures, that provides a signal, such as an audible, inaudible, infrared, radio-frequency, cellular, ultrasonic or electronic signal (including digital and analog signals), or a combination of these signals. This alert signal may be a sound, tone or voice annunciation that alerts store or security personnel that the barrier 140 has been opened or has been opened for an unusually long period of time and potentially represents a theft situation. The alert device 142 also may send an electronic or other signal to play a voice message via the store paging system, to activate a local or remote strobe or annunciator light, or to send a signal to a receiver, such as a store computer, a pager, cellular device, or other portable device carried by store or security personnel. The alert device 142 may also activate a security video camera to monitor the particular area or vicinity, or activate a monitor that is placed in the area or vicinity which would show the camera image to the consumers and potential thief, or transmit the camera image to security or store management via a web connection, cellular telephone, personal data assistant, or any other signal receiving device. The alert device 142 also may activate an advertisement, informational announcement or other statement or display that is provided through voice, video or video and voice. This advertisement, announcement or statement can be directed to the particular product or product type associated with product behind the barrier that activates the alert device. The alert device can be located such that barriers of a width of no more than one product facing will activate the alert device when lifted.

As used herein, the term "alert device" is meant to include any device or component that may provide an alert, warning and/or signal concerning a condition, situation, and/or circumstance. The alert device 142 may be hard-wired to the store's security system or may be a wireless system. Wireless systems, if used, provide increased flexibility in installation and can be readily installed in existing shelves without the need to install wires for either power or communication. In addition, the use of a wireless system allows for the gradual installation of a system. For example, items of high value (and therefore suffering from an increased likelihood of being stolen) or items that tend to have significant variations in customer demand can be monitored first. With a wireless system, the alert signal may be sent to not only the store's security system or computer, but also any portable device or receiver, such as a controller, personal data assistant, pager or cellular telephone that may be carried by store personnel or security. Also with the wireless or wired system, the store's computer can process further the alert signal to determine whether a theft situation exists and can generate reports which can be analyzed to fine tune product placement, placement of cameras, alert devices, sensors, and so forth, as well as fine tune the delays and actions initiated by potential theft situations. As understood by those skilled in the art the store's computer can be configured with the network server and can be accessible remotely through the world-wide web or other network, and can be controlled remotely through the world-wide web or other network.

In an exemplary embodiment, the alert device 142 is positioned on the shelf 104, either underneath, as depicted in FIG. 8, or on top of the shelf. Existing mounting holes on the standard dealer shelf may be used to secure the alert device to the shelf. The alert device 142 may be positioned near to or adjacent to the barrier 140. The alert device 142 may be operatively connected to the barrier 140 through numerous techniques. In one embodiment, the alert device 142 includes a switch 144, such as a push-button switch, that will activate when the barrier 140 is moved or opened. That is, as the barrier 140 moves and comes in contact with the switch 144, either directly or through the use of an activator plate 145, the switch 144 is activated. Alternatively, in a closed-barrier position, the switch 144 is pressed, as the barrier 140 moves to an open position the barrier 140 moves away from the switch 144, thereby releasing the switch 144 and thus activating the alert device 142.

The alert device 142 may be operatively connected or coupled to the barrier to detect movement of the barrier through other methods or techniques. For instance, a motion sensor or similar sensory devices, such as a light-emitting diode sensor assembly, may be used to detect movement of the barrier and communicate that information to the alert device 142. The sensor may be mounted in a variety of locations including on the barrier itself or next to the barrier to detect barrier movement. Alternatively, a magnetic switch may be incorporated to detect movement of the barrier.

The alert device 142 may include sensory components and time-delay features that will calculate how long the barrier 140 has been moved or opened. Upon reaching a predetermined time period, in other words, as the barrier 140 has been moved or opened for a certain duration, the alert device 142 will send a signal, such as the above-mentioned signals, to alert the store personnel, security and/or the consumer that the barrier 140 has been opened or moved for a long period of time, thereby indicating a potential theft situation. In an exemplary embodiment, upon the passing of the predetermined time period, the alert device 142 may send an audio alert signal, including a signal different from a previous audio alert signal, that would draw attention to the vicinity. The alert device 142 can therefore be designed to provide its alert for a fixed period of time before becoming silent.

In another embodiment of the alert device 142, the audio alert signal is adjustable to provide a variety of alert tones of varying frequencies, or to announce that the barrier 140 has been opened or moved for too long and that the consumer needs to close the barrier 140, or to send a silent alarm to the store and/or security personnel. Different signals or frequencies can be used as the length of time in which the barrier has been opened or moved increases. Numerous combinations of alert signals are possible with the alert device 142 depending on the desired level of security. The alert signal is adjustable and numerous combinations of signals may be used to provide the desired signal level and thus security level, yet avoid turning away legitimate consumers from selecting and purchasing the product. That is, for example, the alert device 142 can be programmed to provide an alert signal that will draw the attention of surrounding shoppers or store/security personnel, yet short enough to limit aggravation of the legitimate consumers or stock person.

Also, in another embodiment, a two-tiered response could be implemented. For example, if the barrier 140 is moved, a signal could be transmitted directly to the security camera, or via the store computer or both. In addition, an inaudible notification could be provided directly to security personnel. If the barrier 140 remains open or moved for a set period of time, more clearly indicating a potential theft, an additional audible alarm and flashing lights could also be activated, or any other alarm. Thus, the response could be configured to more carefully match the situation.

Figure 15:
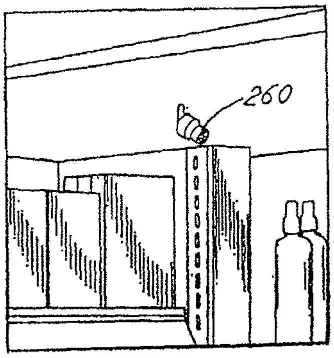
FIG. 15 depicts a partial front elevation view of the exemplary securement and management system of FIG. 1 including the use of a security camera.
Figure 16:
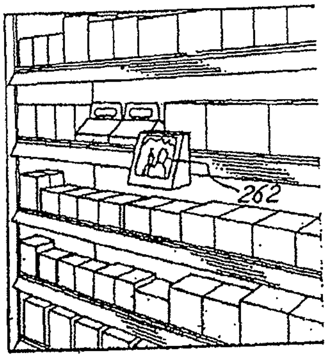
FIG. 16 depicts a partial front elevation view of the exemplary securement and management system of FIG. 1 including the use of a video monitor.

Referring to FIG. 15, in an exemplary embodiment, a security video camera 260 may be placed in the vicinity of product that are high risk theft items, or other product of concern. As shown in FIG. 16, a monitor 262 also may be placed in the vicinity of the high risk product. The monitor 262 may be used to show the security camera image to consumers and any potential thief. Thus, a consumer or potential thief that removes product from the shelf 104 of the display system 100 may realize that their actions are being watched by a camera and potentially recorded.

As can be appreciated, the position of the potential theft relative to the security camera 260 would be beneficial to provide an instruction to the security camera to focus on a particular position. This positional information could be generated by a number of methods, including providing a store computer with the security camera coordinate system for the security camera. The location of the alert device 142 relative to the security camera could be determined during setup and during a potential theft situation; the location of the alert device 142 could be used to direct the focus of the security camera. Alternatively, the security camera could be configured to focus in several positions, such as three points along an aisle, and the store computer could indicate which position was the most appropriate for the particular situation. One skilled in the art will appreciate that the described methods are illustrative because of the numerous methods of controlling the security camera that exist.

Figure 17:
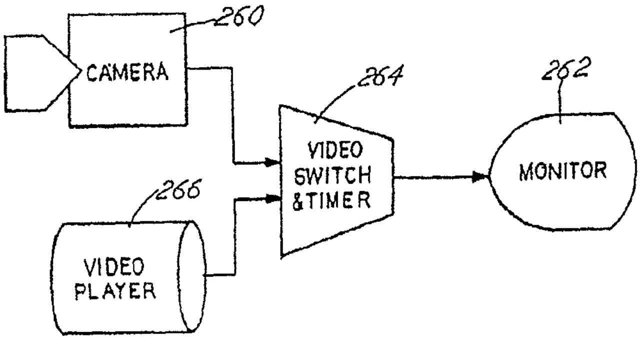
FIG. 17 depicts a diagram of an exemplary switching operation between a camera image and an image from a video player on the monitor of FIG. 16.

In addition to the value of such system in loss prevention, the monitor can show video in the form of advertising or consumer information. As illustrated by FIG. 17, the monitor 262 can switch between the advertising or consumer information and the camera image through the use of a video switch 264. This switching activity can occur on a periodic basis, such as every 30 seconds, or can occur when predetermined conditions are met, such as the lifting of the barrier 140, the removal of product, the movement of a pusher, or input from a proximity sensor that a consumer has entered or approaches the area. By playing the video segment, the device not only reduces loss, but becomes a source of revenue when advertisers are charged to place their message on the system.

A secondary video source for the monitor on which advertising, consumer information or other content is shown can be a video player 266 such as a video cassette recorder, compact disk-video player, solid state digital video player, direct video, audio feed or other video sources. With respect to the switch 264, the switching action between the camera image and advertising or other content can be effected by a hardware timer or a small microcontroller. In one embodiment, the secondary video source can contain a multitude of short video segments which are randomly or non-randomly selected by the timer or microcontroller. The camera 260 may be a small, stand-alone type, not connected to any part of an existing security system, or it may be any typical store security camera existing in the store's security network. The monitor 262 may be a small flat, color, LCD type monitor and can be placed at numerous locations on or near the shelf 104. For instance, the monitor may be placed in overhead signage above the merchandised product or it can be attached to the shelf 104 edge. In some applications, a larger monitor, such as a CRT-type, plasma, LCD or projection monitor can be used. A preferred solid-state digital video player may comprise the secondary video source. The source may be housed in the same enclosure as the monitor or may be located remotely from the monitor.

Referring back to FIGS. 4 and 5, in another exemplary embodiment, the shelf 104 on which the product rests may be a "pull-out" shelf. The "pull-out" shelf allows store associates or personnel access to the product to restock the shelf but prevents a thief from obtaining such access. The pull-out shelf allows easy access to all products on the shelf. This function, however, requires that the shelf not be movable by the consumer or thief and therefore the pull-out function must be protected by a key-lock, special tool, or other locking mechanism. In this embodiment, the product dividers 110 may be designed to be at least equal to the height of the tallest product package on the shelf. As the shelf 104 is pulled out, the product lane or dividers may cause the barrier 140 to rise. If the height of the dividers 110 is lower than the tallest product package, pushing the shelf back in may cause the barrier 140 to catch on the product packages and make it more difficult to return to its closed position. Additionally, pulling out the shelf 104 will raise the barrier 140 which may activate an annunciator or signal generator, as explained above.

Figure 9:
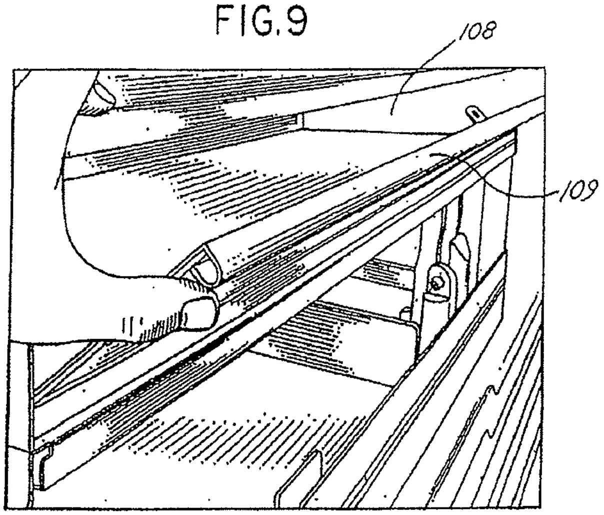
FIG. 9 depicts a bottom view of an exemplary alert device mounted to the exemplary securement and management system of FIG. 1.

Referring to FIG. 9, in an exemplary embodiment, a barrier placed on a top-most shelf 104 may include a lock-box 108 that may be used for storage of overstock product or additional display system 100 components. In an embodiment in which the top-most shelf 104 is a pull-out type, the shelf 104 will pull out while the horizontal barrier above it remains in place, allowing product to be easily accessed. As indicated above, the lock-box 108 may also be mounted to the vertical uprights 102, through known mounting techniques, and may be mounted at any location on the display system 100. The lock-box 108 may use any known locking mechanism that permits key or key-less entry to the lock-box 108. One skilled in the art will appreciate that other security components may be mounted to the lock-box 108 including the security camera, monitor, and alert device 142, to name a few.

In an embodiment, a stationary shroud 180 may placed toward the top of the product display system 100. The shroud 180 provides security and graphic placement, and product may be stored within it. The shroud 180 provides security in that it functions as a top wall or barrier preventing access to the product from a point above the product. The shroud 180 may mount on or to an existing shelf. The shroud 180 may be fixed or adjustable. With an adjustable shroud, the shroud can be positioned at numerous locations on the product display system. In addition, the shroud 180 can be a pull-out shroud functioning in manner similar to the exemplary pull-out shelf 104 described above. Moreover, the shroud 180 can also serve as a shelf to hold product. In other words, the product display system 100 could include multiple shrouds 180 that function as shelves to hold or display product. Also, the shroud can be configured to mount the barriers 130, 140, through numerous known mounting techniques. In an exemplary embodiment, the lock box 108 having a lockable door 109, as shown in FIG. 9, may be placed on the shroud 180 for additional product storage and graphic placement.

The product display system 100 of the invention offers various levels of securement and theft protection. Each level described herein can be used separately and various or all levels can be used in conjunction with each other. Each level can also be added to or adapted with existing shelf systems or be provided as a stand alone system. The divider or retaining walls 110 provide securement. The front retaining wall 116 or "fence" provides securement, with or without the retaining tabs 120. The barriers and access doors 130, 140 over the top of the retaining wall 116 provides securement. The close positioning of the shelf 104 over the product located on the shelf below provides securement. The audible or other signal that is generated by the alert device 142 when the barrier 140 has been open for a set period of time provides securement. The security camera and video and display devices provide securement. Each of these separable aspects of an embodiment of the invention can be used on its own in a retail setting, or can be used in conjunction with other aspects of the embodiment. Each separable aspect can be added to existing shelving or display systems to effectively retrofit and add one or more levels of security to such existing systems.

One embodiment of the invention features various levels of theft deterrent. One level assists in preventing sweeping of products. Pushers 126, dividers 110, and retaining walls 116 are coupled with a shelf 104 or barrier 130, or both, above the product to provide securement to the product. The pushers, dividers, retaining walls, shelf, and barrier allow approximately one, two or three packages to be removed through an opening at one time from a facing of the display system. Second retaining walls or tabs 122 may be used to provide individual securement for specific rows of product. The front wall 116 and tabs 122 may also include holes or openings that extend therethrough that would require the consumer to push on the product through the holes or openings in order to remove the product from the shelf.

A second level of securement incorporates all of the features of first level with the addition of a barrier 140 or access door. To access the product, the consumer must utilize two hands, one to lift or slide the barrier 140 and the other to remove the product, thus adding a second layer of deterrent to the system.

A third level of securement builds upon the features of the first and second levels with the addition of a theft-warning notification device, such as an alert device 142, or other signal transmission device. The alert notification or signal transmission is activated if the barrier 140 or access door is open a predetermined amount of time. This delay can be adjusted to any duration or eliminated. The notification provides an audible, inaudible, infrared, radio-frequency, electronic, or cellular signal that notifies consumers and/or store and security personnel that the barrier 140 has been open for a particular period of time. The signal transmission can send a signal to a store computer, store personnel or a security camera or monitor. The signal can alert the store computer or personnel that the barrier 140 or access door has been opened for a particular period of time and can activate the security camera and monitor to show the thief an image of himself or herself in front of the product. This image can be recorded. Additional alert notifications or signal transmissions can be activated as the amount of time the barrier or access door is open increases.

An additional level of deterrence of theft by consumers or store personnel is the use of a locking mechanism on the shelf 104 to limit unauthorized personnel from pulling out the shelf. The system can require the use of a key or an uncommonly or commonly shaped instrument to be inserted into a concealed access slot in the front or underside of the shelf. This method is designed to require someone with specific knowledge of the shelf operation to disengage the lock. In an embodiment, the barrier 140 or access door on the shelf 104 can be automatically raised for restocking purposes when the shelf is pulled out, then re-engaged once the shelf has been returned to the closed position. In this application, an audio alert may be incorporated that indicates that the shelf is being restocked with product.

In addition, in an embodiment, a stationary shroud 180 may be placed toward the top of the product display and management system. The shroud provides security by inhibiting access to the product from above the product. Also, a lock box can be placed anywhere on the system to store additional product that will be secured by a key lock or some other locking mechanism.

In one embodiment of the present invention, various aspects of the invention are added to portions of existing shelves. In some environments, there are only one, two or a few potential high-theft products among a display of many products. Aspects of the present invention can be added solely to the portion of a shelf management and display system with respect to those high-theft products. For example, a barrier 140 could be placed solely over those products. In addition, side walls could be placed to cover one or more of the sides of the products to further deter sweeping or other theft. A front barrier, a locking mechanism or other aspects of the invention described herein could be used solely with the high-theft products or other highly relevant products in a display and not used with other products in the same display. In one embodiment, a particular set of relevant products can be effectively segregated from the other products within the same display. This particular set of relevant products can be subject to additional security aspects described herein that are not used with the remaining products in the display.

Figure 28:
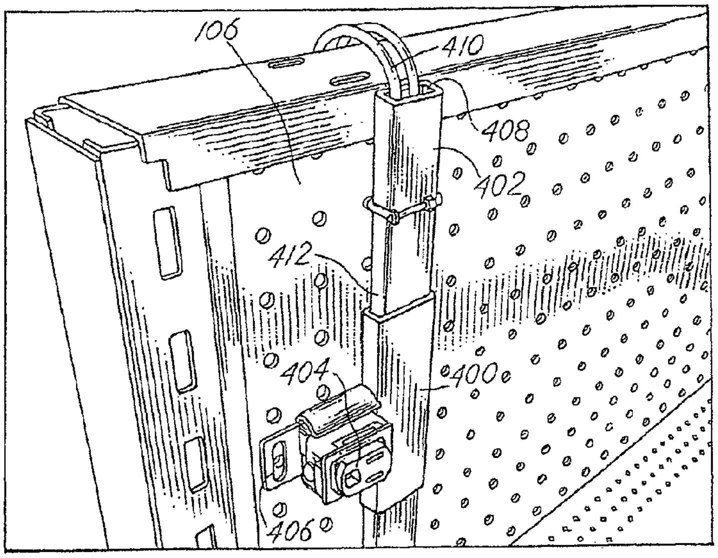
FIG. 28 depicts an exemplary electrical power bar that may be used with the invention.
Figure 29:
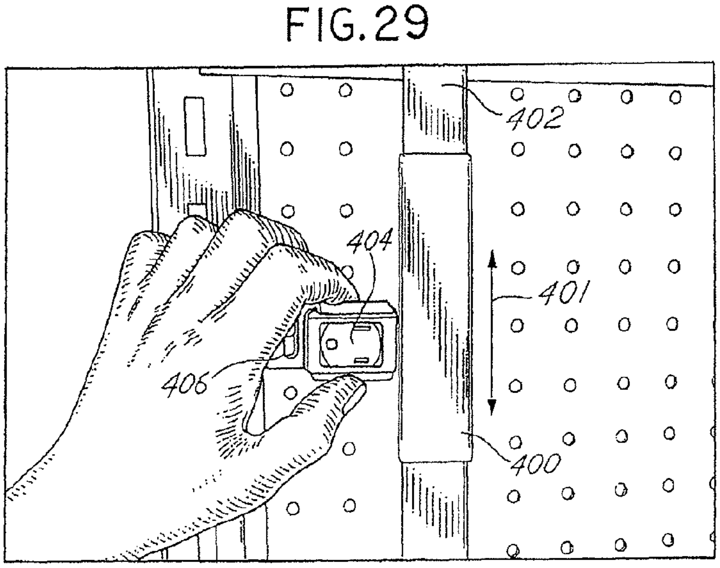
FIG. 29 depicts another view of the power bar of FIG. 28.

Referring to FIGS. 28-29, there is depicted an adjustable power bar 400 that may be selectively mounted to the back wall 106. The power bar 400 will provide electrical power to various components mounted to the shelves, including any video monitors, security cameras, lighting, illuminated signage, overhead header lights, radios, stereos, or any other components that may be mounted to a shelf or the product display and require electrical power. As illustrated by the Figures, the power bar 400 is selectively adjustable between several positions to accommodate shelf height changes or adjustments without causing obstruction with the mounting or adjustment of the shelf.

Conventionally, power outlets were mounted to the shelf and were not easily movable. In fact, significant force was required to unlock the power outlets from the track on which they were mounted to then move the power outlets. In other known applications, the power outlets were mounted to conductive tracks, similar to track-lighting tracks which included embedded power tracks. With those track-type systems, the power outlets needed to be placed at correct locations and snap-fit into position. Once installed, the power outlets were not slidable.

The power bar 400 of the invention solves these problems and other known problems by providing a power source for a product display that is easily mountable to the display, such as the back wall 106, and is easily adjustable to accommodate changes made to the positions of the shelves. The power bar 400 includes an elongated body 402 that may be attached to the back wall 106 of the display. As illustrated, the power bar 400 may be mounted in a vertical manner and the elongated body 402 may extend the entire height of the product display or alternatively less than the entire height of the product display. The power bar 400 may be slidably moved (as indicated by direction arrow 401) a sufficient distance to avoid interference with the product shelf that may be placed at approximately the same vertical height, or with the repositioning of the mounted product shelf. The power bar 400 includes one or more power outlets 404 that may be configured at numerous positions on the power bar 400. Once in the desired position, a fastener, not shown, may be positioned through an adjustment slot 406 to secure the power bar 400 to the back wall 106 at the desired height. The adjustment slot 406 is elongated to permit further adjustment of the power bar 400.

The elongated body 402 defines an elongated hollow cavity 408 through which may pass conducting wires 410 that are used to supply the power to the power bar outlets 404. The elongated body 402 may also include a recessed channel 412 formed in the body 402 and along each side of the body 402. The channel 412 may be used as a receptor for receiving and aligning the power bar 400 onto the body 402. The power bar 400 may fit on or within the channel 412 in a tongue-and-groove manner, or any other suitable mounting connection that permits slidable movement of one component relative to another. Once installed, the power bar 400 will slide relative to the body 402 in or on the channel 412.

FIGS. 34-59 illustrate an embodiment of a box-shelf that may be secured directly to an upright. Thus, as depicted, the box-shelf may be provided as a complete unit that provides theft-prevention benefits as discussed above while allowing for more straightforward installation in a retail location. As can be appreciated, in an embodiment the box-shelf may be configured to be self-contained so as to eliminate the need for a support shelf.

Figure 34:
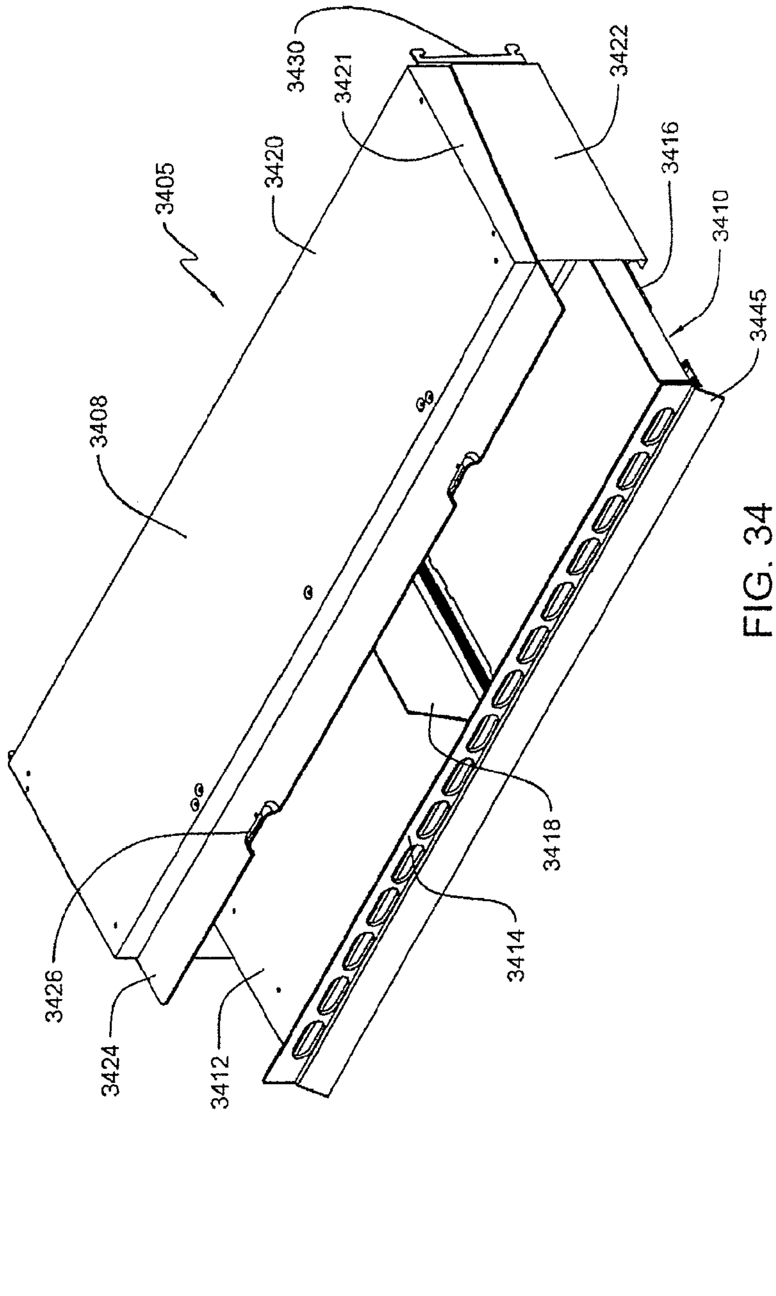
FIG. 34 illustrates an isometric view of an embodiment of a box shelf in accordance with one or more aspects of the present invention.
Figure 35:
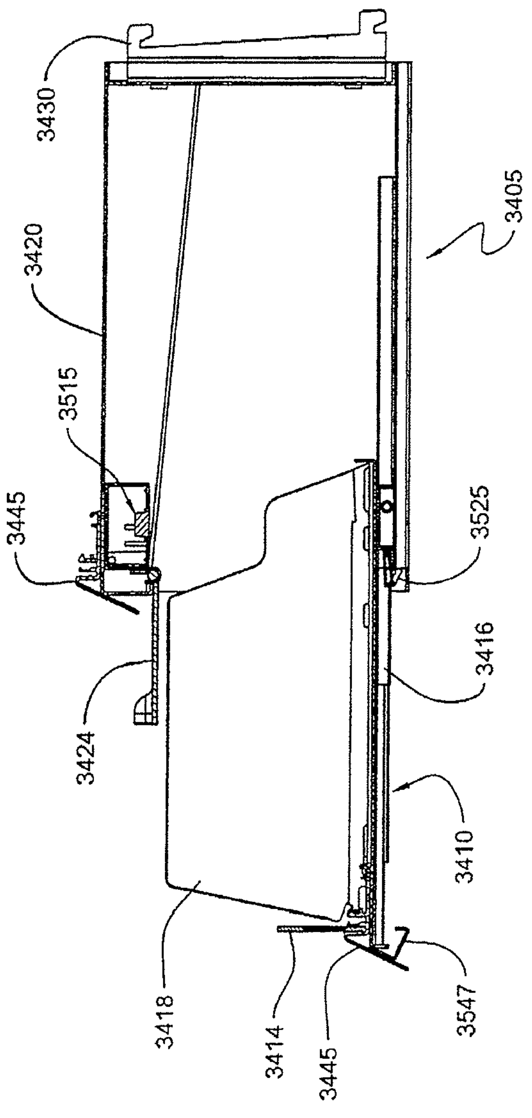
FIG. 35 illustrates a cross-sectional view of an embodiment a box shelf with a slideable shelf in a second position in accordance with one or more aspects of the present invention.
Figure 36:
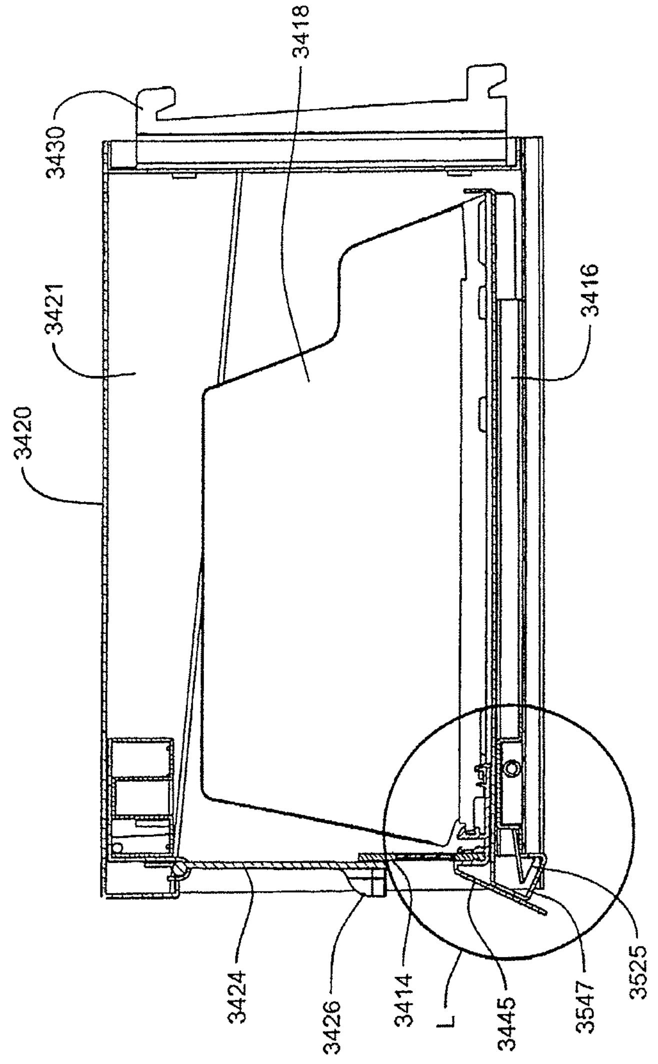
FIG. 36 illustrates a cross-sectional view of an embodiment a box shelf with a slideable shelf in a first position in accordance with one or more aspects of the present invention.

Looking first at FIGS. 34-36, a box-shelf 3405 includes a top 3420 and two sides 3422 that can be connected together to form part of a housing 3408. A recessed portion 3421 is provided so that in the event that the box-shelf 3405 is mounted under a shelf, the recessed portion 3421 will aid in ensuring there is no interference with the brackets that support the shelf or other structure that may extend downward (not shown). One or more shelf supports 3430 are mounted to the box shelf 3405 so as to enable the box shelf 3405 to be mounted to a vertical support (not shown) in a traditional manner.

A slidable shelf 3410 is mounted to one or more tracks 3416, which can be supported at least in part by the sides 3422. As depicted, the slidable shelf 3410 can include a support surface 3412 that supports a divider 3418 (which may be a pusher or a simple divider) and includes a rail 3445 mounted to the front of the shelf 3410. The rail in turn supports a retainer 3414.

As depicted, a door 3424 with one or more handles 3426 can be mounted to the top 3420 via hinge system 4010 and is coupled to a control unit 3515 that may be configured to produce an audible tone (immediately or after some predetermined delay) when the door is opened and may further be configured to provide a signal to a remote device so as to trigger video capture or security personal.

Slidable shelf 3410 translates via a track 3416 when locking feature 3525 is actuated. As can be appreciated, to translate the slidable shelf 3410, the door 3424 needs to be opened and in an embodiment, as depicted, the door may open up to 90 degrees. As can be appreciated, the rail 3445 can also be mounted on the top 3420 of the box shelf 3405.

It should be noted that details such as discussed above with respect to FIGS. 1-33 may also be incorporated into the embodiment depicted in FIGS. 34-59, where appropriate. Thus, where desirable and/or convenient, the above details may be incorporated.

Figure 37B:
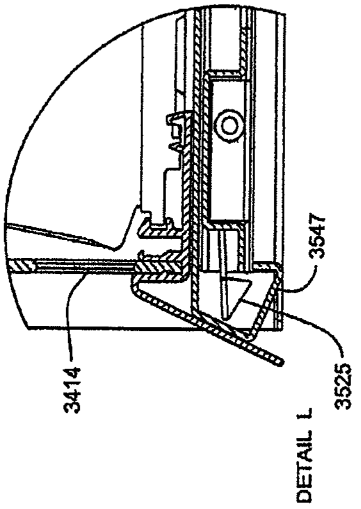
FIGS. 37A-37B depict cross-sections of an embodiment of a hinge plate engaging a blocking lip in accordance with one or more aspects of the present invention.
Figure 37A:
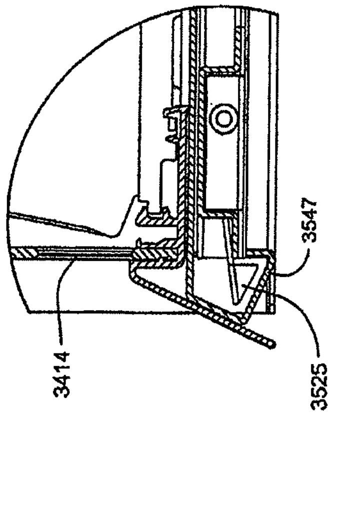

FIGS. 37A-37B show the locking feature 3525 in a locked or blocking position and an opening and non-blocking position. In an embodiment, an opening in the lip 3547 allows a key to be inserted so as to translate the locking feature 3525 from the locked to the open position. Thus, as can now be appreciated, the locking feature 3525 is shown in both the blocked and open position in a number of the Figures.

Figure 38:
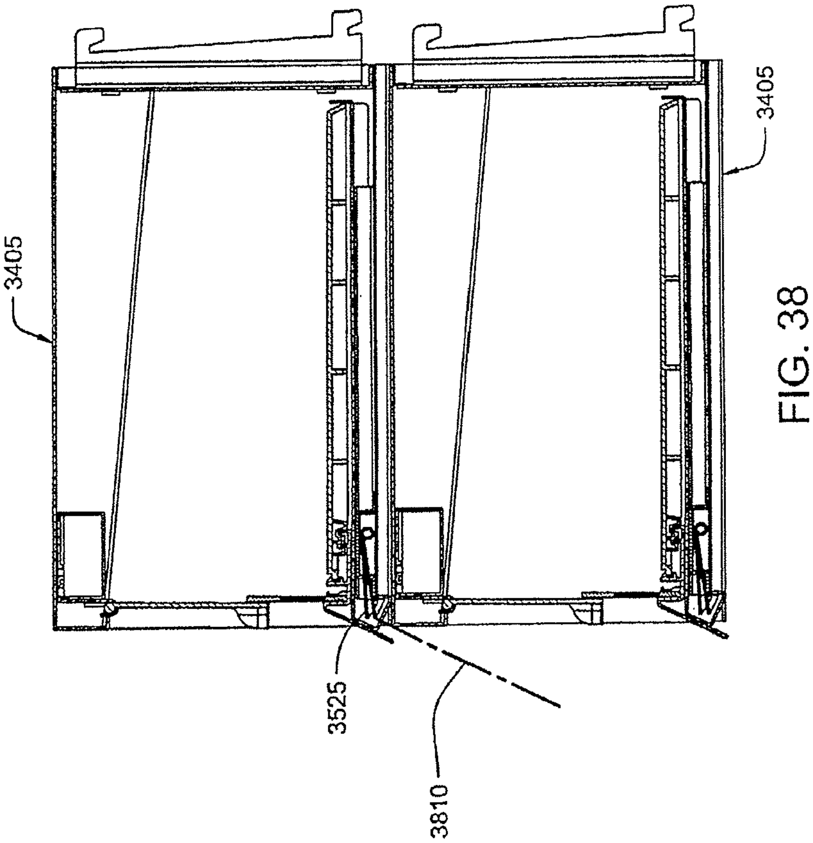
FIG. 38 depicts an embodiment of two box shelves stacked on top of each other in accordance with one or more aspects of the present invention.

As depicted in FIG. 38, one or more box shelves 34-5 may be mounted on top of each other. In such a configuration, a path 3810 can allow the insertion of a key (not shown) to actuate the locking feature 3525.

Figure 39:
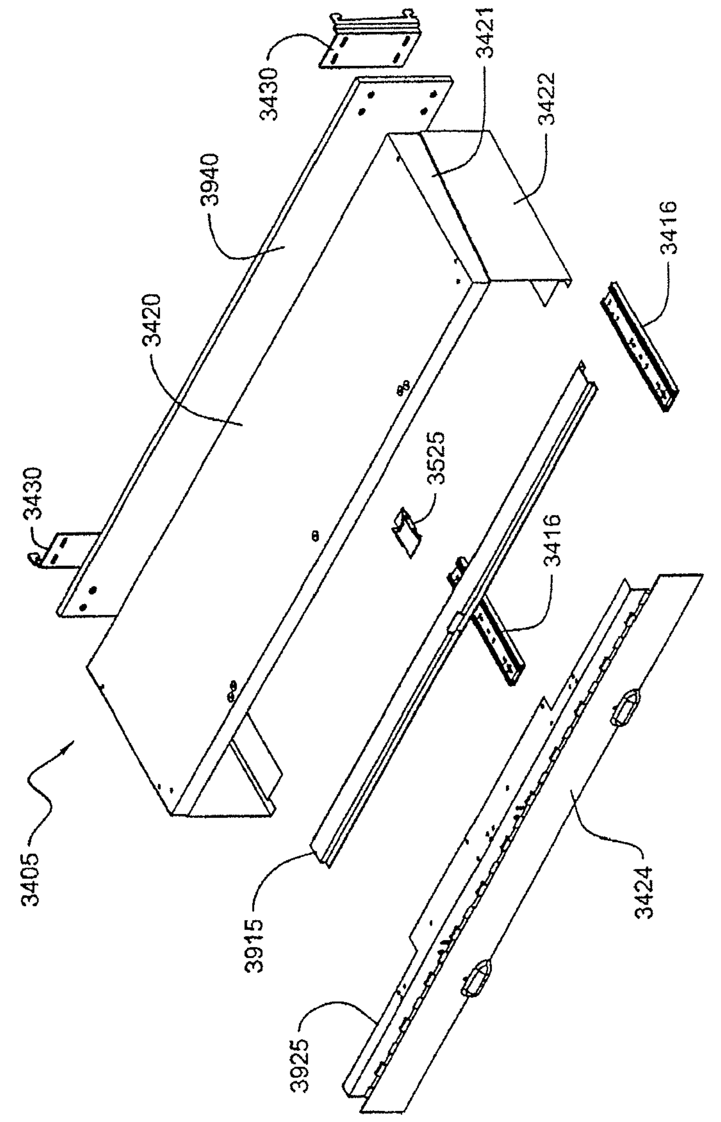
FIG. 39 illustrates a partial exploded view of an embodiment of a box shelf in accordance with one or more aspects of the present invention.
Figures 40A, 40B, 40C, 40D:
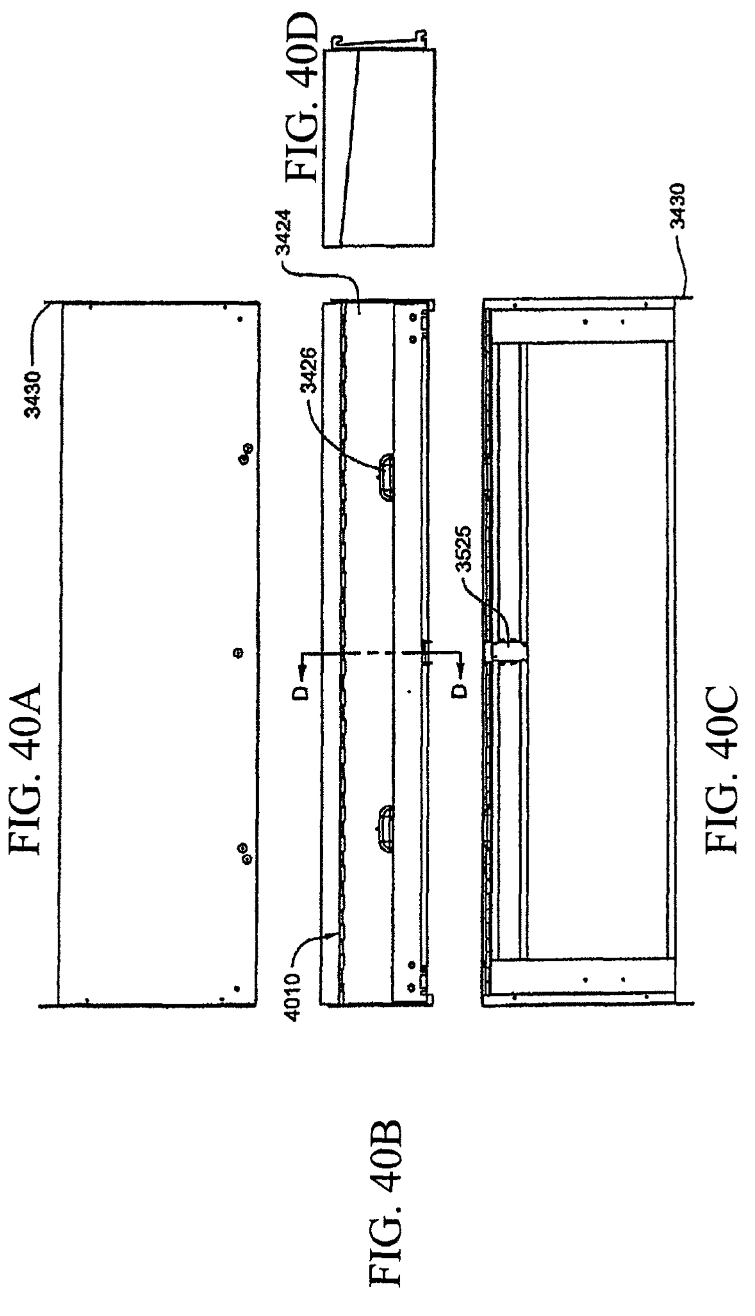
FIG. 40A-40D illustrates various views of an embodiment a housing in accordance with one or more aspects of the present invention.
Figure 41:
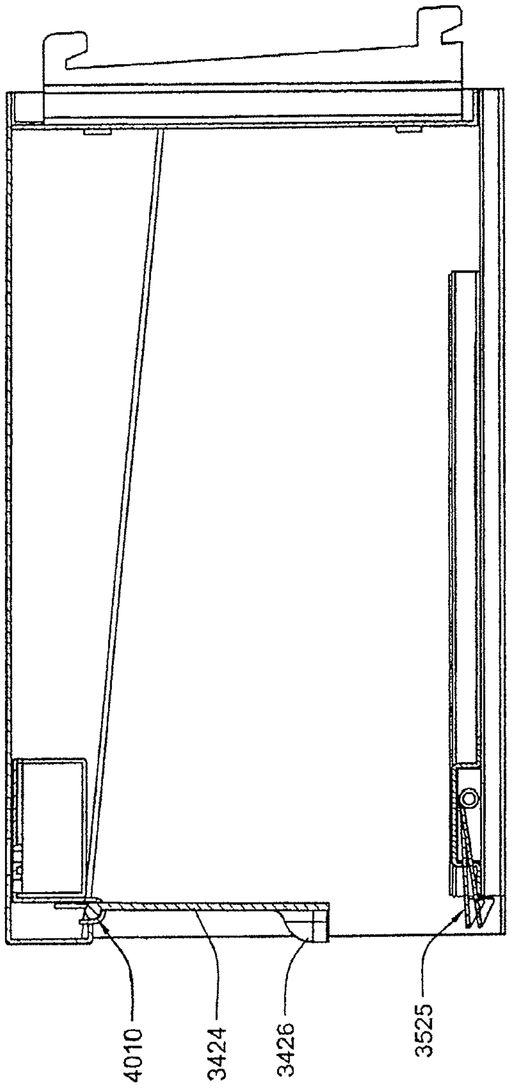
FIG. 41 illustrates a cross-sectional view of an embodiment of a housing and a door in accordance with one or more aspects of the present invention.
Figure 42:
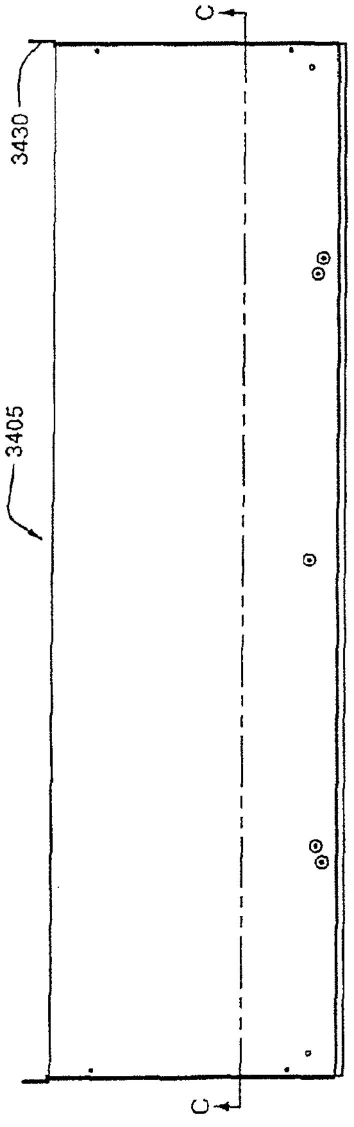
FIGS. 42-45 illustrate views of an embodiment of a box shelf with various features omitted to provide additional details in accordance with one or more aspects of the present invention.
Figure 43:
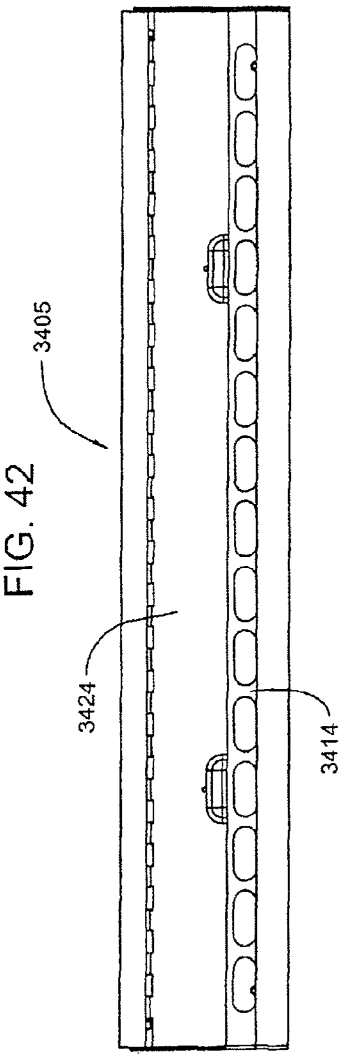
Figure 44:
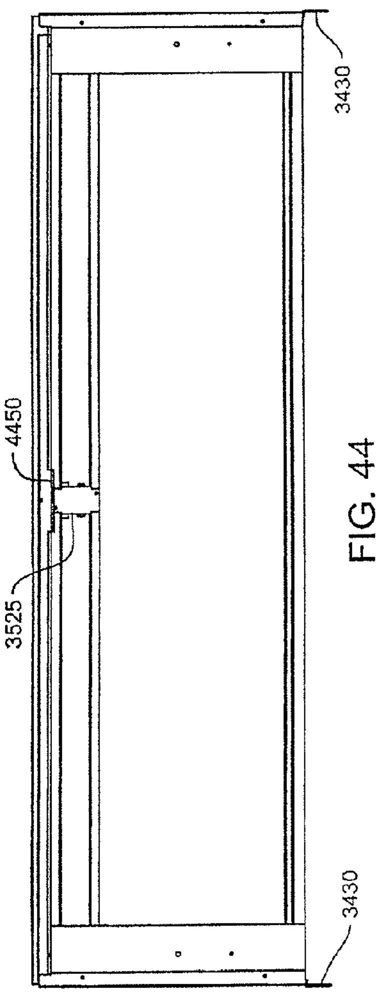
Figure 45:
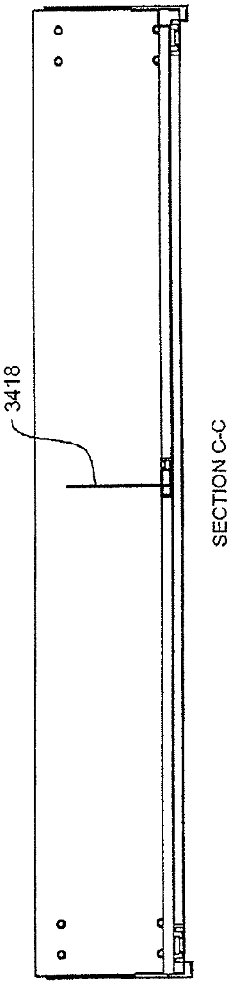

As can be appreciated from FIG. 39, the door 3424 can be pivotally mounted to support 3925. Furthermore, a hat channel 3915 can be provided for additional strength and rigidity of the box shelf 3405. The hat channel 3915 may also be used to support the locking feature 3525 and/or one or more tracks 3416. As depicted, two shelf supports 3430 (sometimes referred to as brackets) are mounted to a rear panel 3940 and include slots so as to allow the box shelf to be mounted to vertical supports in an adjustable manner even if the position of the vertical supports include some degree of tolerance stack-up. The shelf supports 3430 can be connected to one or more vertical rails (not shown) of a shelving structure.

Figure 48A:
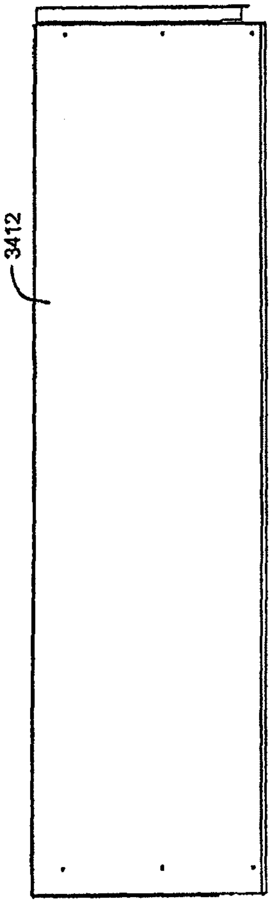
FIG. 48A-48C illustrates various view of an embodiment of a support surface of a slideable shelf in accordance with one or more aspects of the present invention.
Figure 48B:
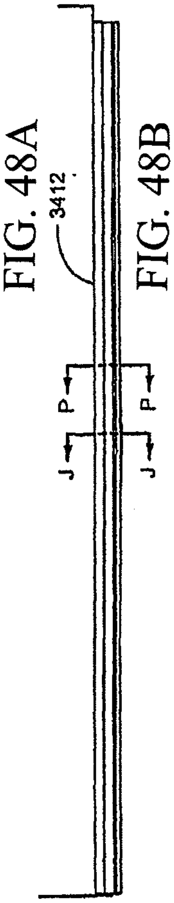
Figure 48C:
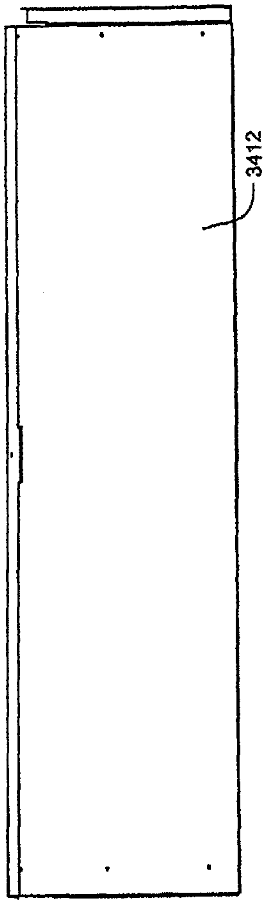
Figure 49:
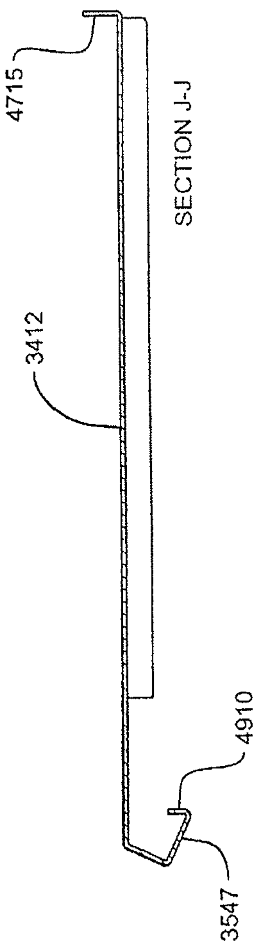
FIGS. 49 and 50 depict cross-sections of a portion of an embodiment of support surface of a slideable shelf in accordance with one or more aspects of the present invention.
Figure 50:
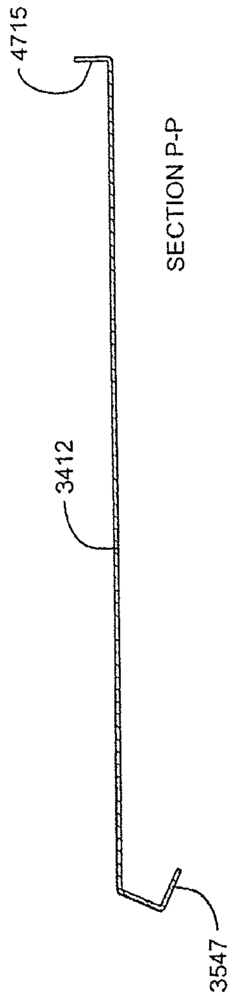
Figure 51:
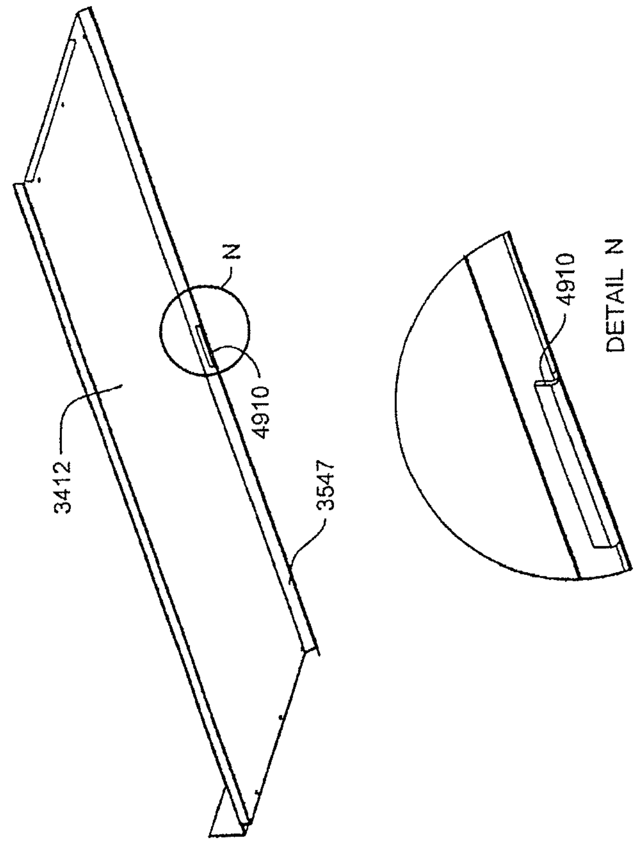
FIG. 51 illustrates an embodiment of a portion of a slideable shelf in accordance with one or more aspects of the present invention.

FIGS. 40-47 illustrate additional details of the depicted embodiment of the box shelf. It should be noted that the box-shelf may be constructed out of known materials, such as powder coated 18 gauge steel or some other appropriate material. FIG. 48 illustrates an embodiment of the support surface 3412 and includes reference to cross-sections J-J and P-P. As can be appreciated from FIGS. 49-51, the lip 3547 can include a blocking lip 4910 in the center of the shelf (or in some other location aligned with the locking feature 3525) but the blocking lip may not be required in other locations, thus allowing (but not requiring) a reduction in the amount of material used to make the support surface 3412.

Figure 52A:
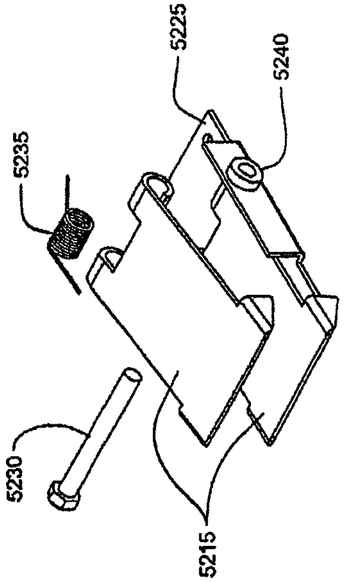
FIG. 52A-52C illustrates an isometric, partially exploded view of an embodiment of a hinge plate and construction in accordance with one or more aspects of the present invention.
Figure 52B:
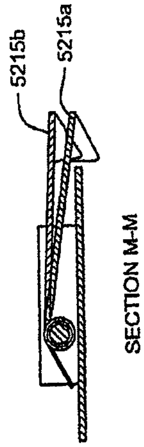
Figure 52C:
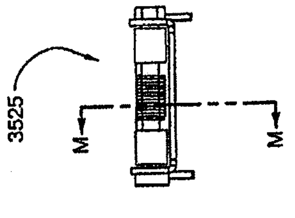
Figures 53A, 53B, 53C, 53D, 53E:
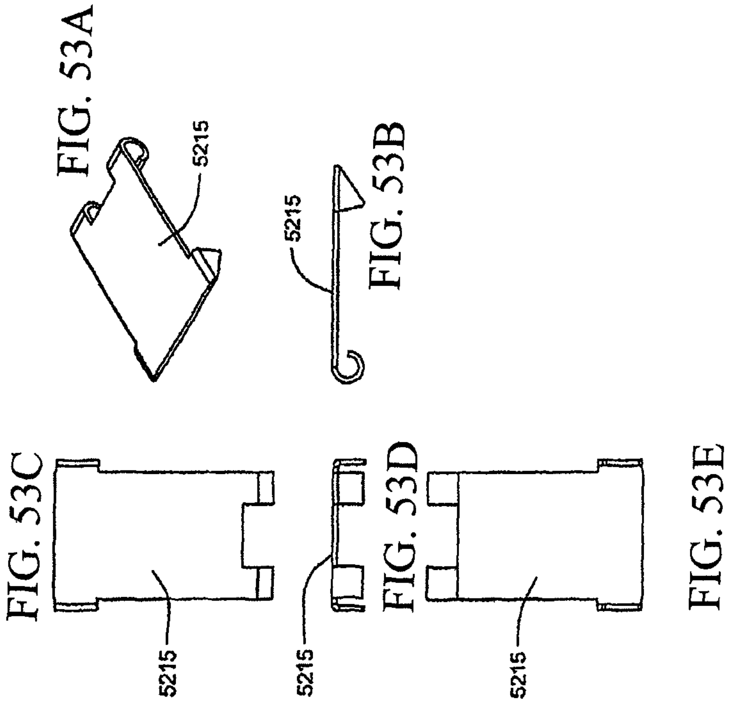
FIG. 53A-53E illustrates a number of views of an embodiment of a hinge plate in accordance with one or more aspects of the present invention.
Figures 54A, 54B, 54C, 54D, 54E, 54F:
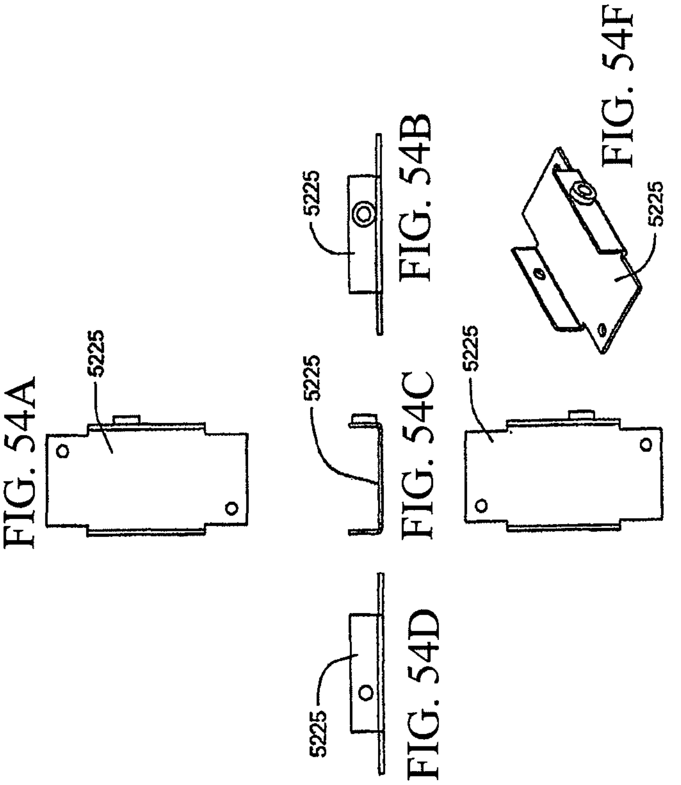
Figure 55A:
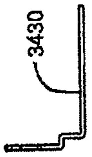
FIG. 55A-55E illustrates a number of views of an embodiment of a shelf support in accordance with one or more aspects of the present invention.
Figure 55B:
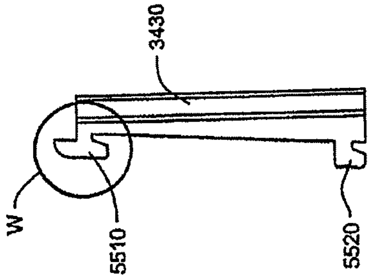
Figure 55C:
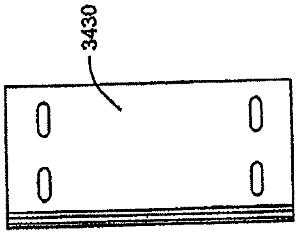
Figure 55D:
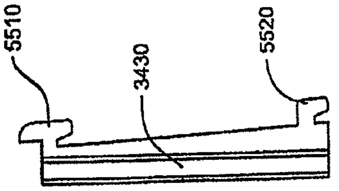
Figure 55E:
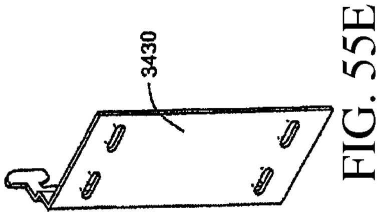
Figure 56A:
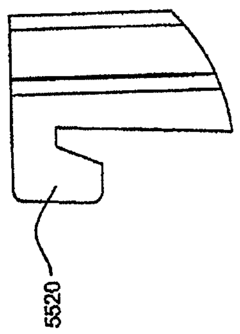
FIGS. 56A and 56B illustrate cross-sections of portions of a shelf support configured to engage vertical rails in accordance with one or more aspects of the present invention.
Figure 56B:
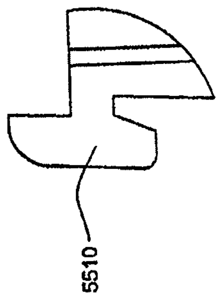
Figure 57:
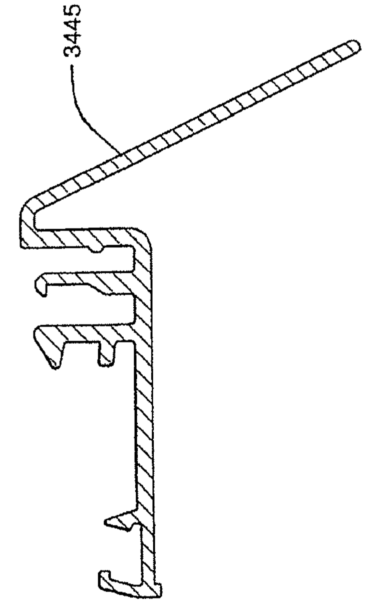
FIG. 57 illustrates a cross-section of an embodiment of a rail in accordance with one or more aspects of the present invention.
Figures 58A, 58B, 58C, 58D, 58E, 58F:
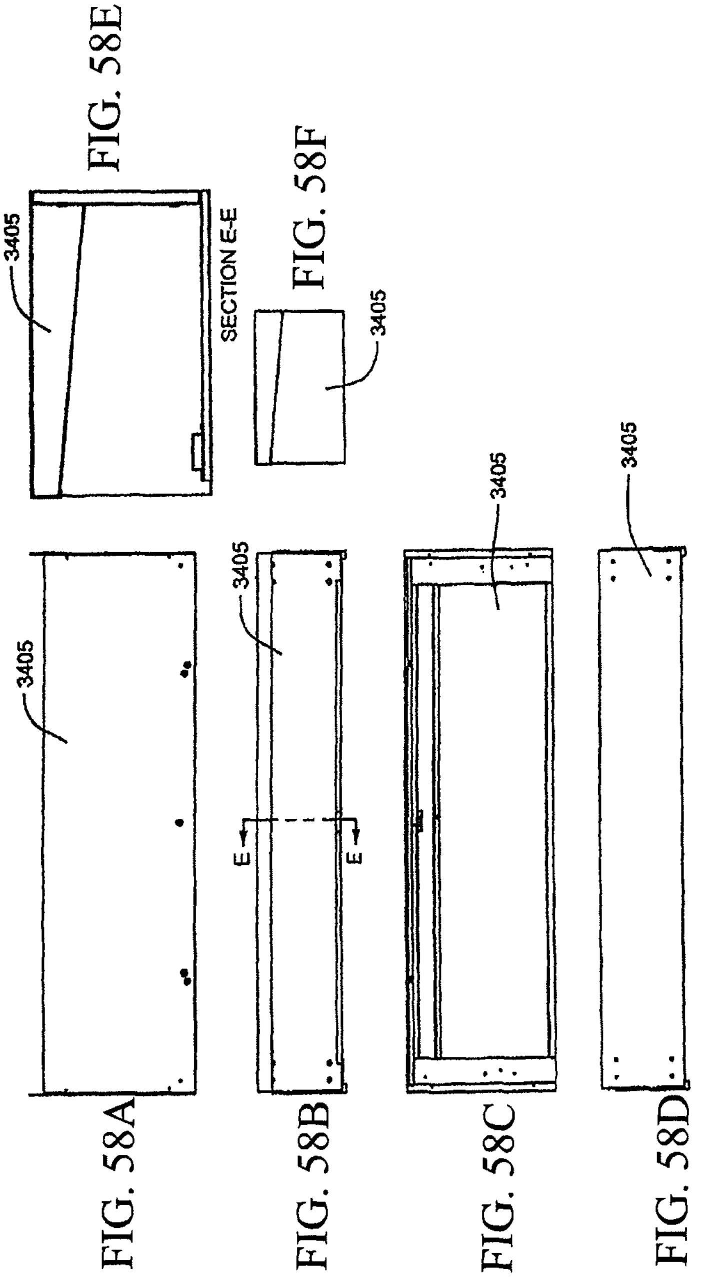
FIGS. 58A-58F illustrate various views of an embodiment of a housing of a box shelf in accordance with one or more aspects of the present invention.

FIGS. 52-54 illustrate details one embodiment of the locking feature 3525. FIG. 52 shows the hinge plate 5215 both in a partially exploded view and in an installed position. As depicted, the hinge plate 5215 is mounted to hinge base plate 5225 by a fastener 5230 that couples to a nut 5240. A biasing element 5235 directs the hinge plate 5215 toward a first or locked position. Thus, hinge plate 5215*a* is a locked position and hinge plate 5215*b* is an open position. As can be appreciated, however, numerous other methods of mounting the hinge plate 5215 to the hinge base plate 5235 are possible.

Figure 46:
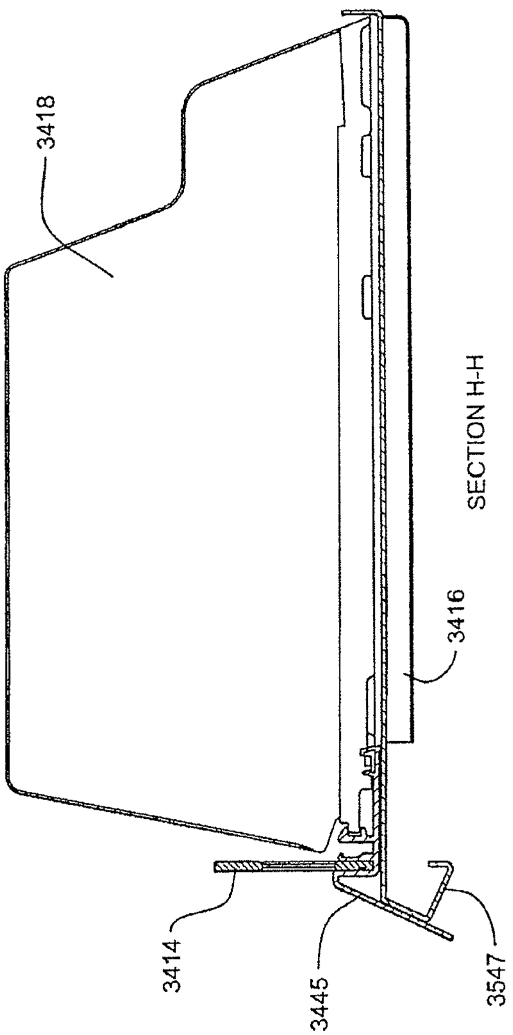
FIG. 46 illustrates a cross-section of a slideable shelf with a divider in accordance with one or more aspects of the present invention.
Figure 47:
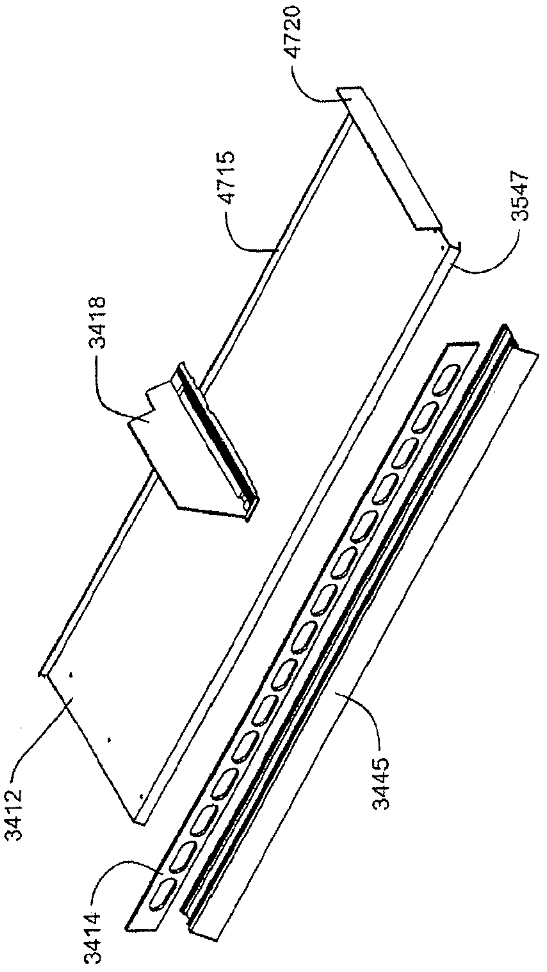
FIG. 47 illustrates a partially exploded view of a slideable shelf in accordance with one or more aspects of the present invention.
Figures 59A, 59B, 59C, 59D:
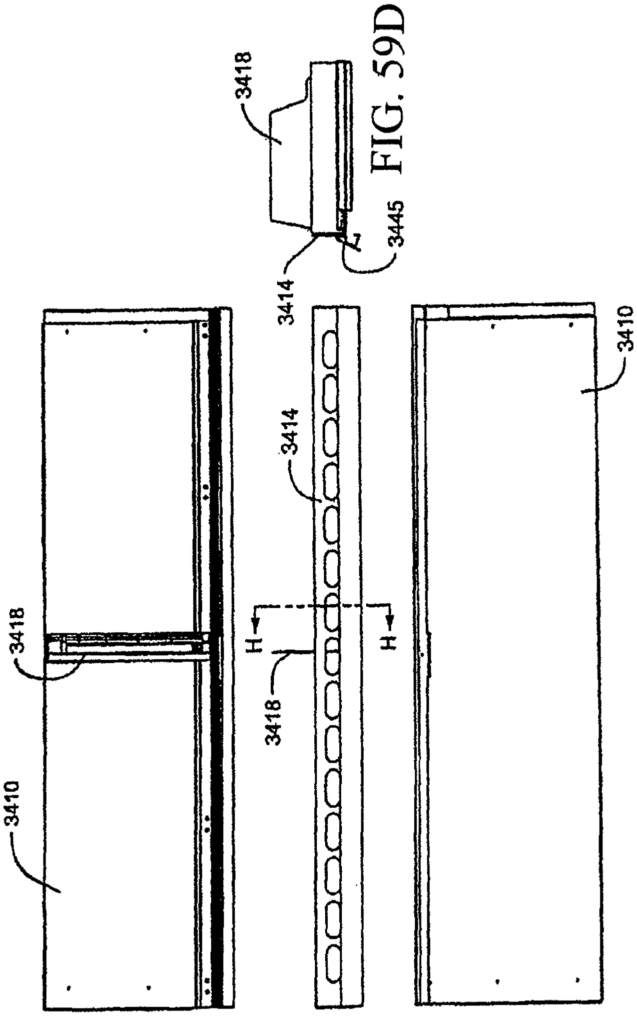
FIGS. 59A-59D illustrate various view of an embodiment of slideable shelf in accordance with one or more aspects of the present invention.

FIGS. 54-59 illustrate additional details regarding embodiments of the locking feature 3525, shelf support 3430 and other potential elements of the box shelf 3405. In addition, FIG. 59 depicts section H-H, from which FIG. 46 is taken. It should be noted that any dimensional references are merely exemplary and are not intended to reflect any limitations to the present invention unless otherwise noted.

FIGS. 60-73 illustrate another aspect of the invention, namely a low profile shelf system that improves the merchandising of product. The low profile shelf system improves product merchandising by creating more spacing between shelves to accommodate larger product. In some stores, there are large product sections wherein product management systems, such as those described above, are not the most ideal systems to use because there is not sufficient height (i.e., spacing) between shelves to add such a system. In these instances, the product is merchandised so tightly between shelves that adding a product management system, such as those described above, raises the product such that it may interfere with the shelf above. Occasionally, retailers are not willing to adjust the shelves to incorporate a product management system because such shelf adjustments typically must be done in fixed increments (e.g., one inch increments), and moving shelves by such increments can sometimes lead to the undesirable eliminating of a shelf, such as the top shelf.

Figure 60:
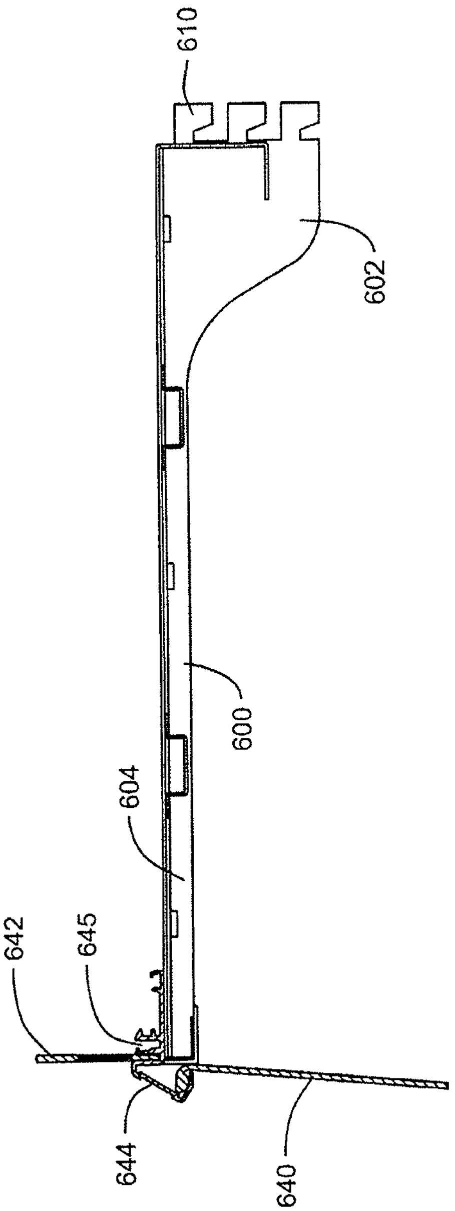
FIG. 60 is a side view of an exemplary low profile shelf support.

As depicted in FIGS. 60-73, the invention solves this problem by using low-profile shelf supports 600. Each low-profile shelf support 600 may define a back portion 602 and a front portion 604. The back portion 602 may include a fastening plate 606 attached thereto (FIG. 72), each fastening plate 606 having at least one hook formation 610 that can be inserted into a slotted upright (not shown). The fastening plate 606 may be fastened to the shelf support through the use of fasteners 623. Alternatively, the back portion 602 may form the at least one hook formation 610 (FIG. 60). As shown in FIG. 60, the back portion 602 of the shelf support 600 may have a thickness that is substantially greater than the thickness of the front portion, resulting in the front portion 604 having a significantly lower profile than the back portion of the shelf support 600. This reduced profile of the front portion results in greater clearance between product shelves to accommodate larger product and/or the installation of the product management systems described herein. In one embodiment, the thickness of the back portion 602 may be 75% greater than the thickness of the front portion 604. Other thicknesses of the front and back portions are possible to create the desired low profile shelf support configuration.

Figure 61:
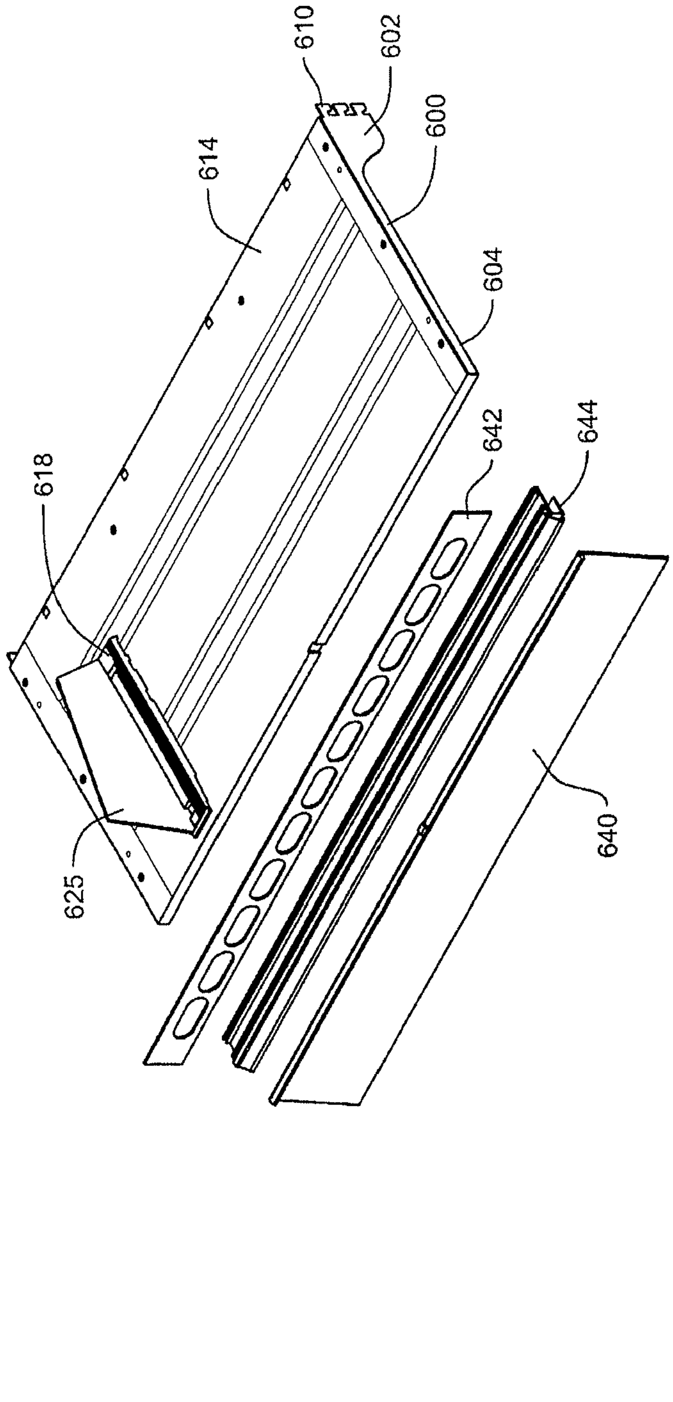
FIG. 61 is an exploded isometric view of a shelf system incorporating the low profile shelf support of FIG. 60.
Figure 62:
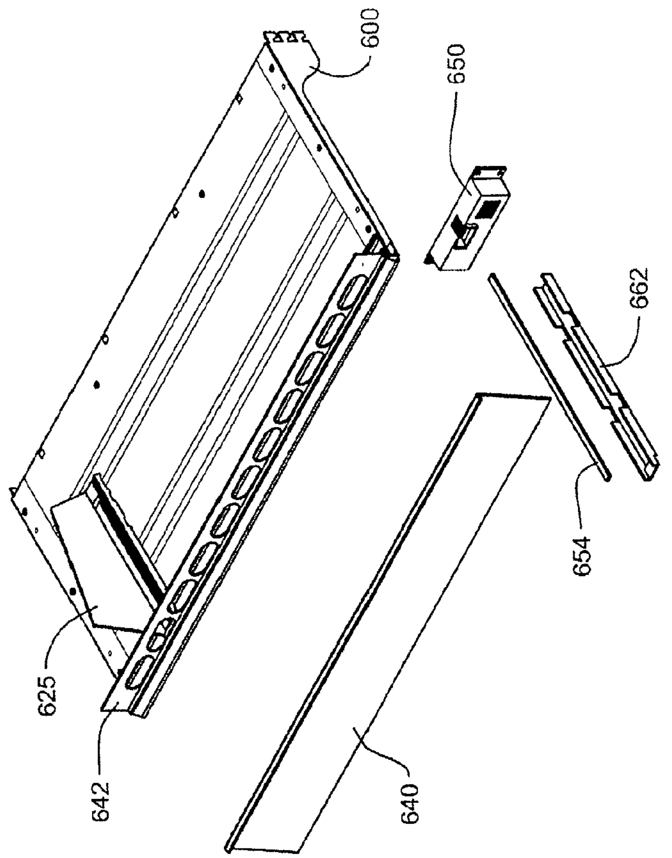
FIG. 62 is another exploded isometric view of a shelf system incorporating the low profile shelf support of FIG. 60.
Figure 73:
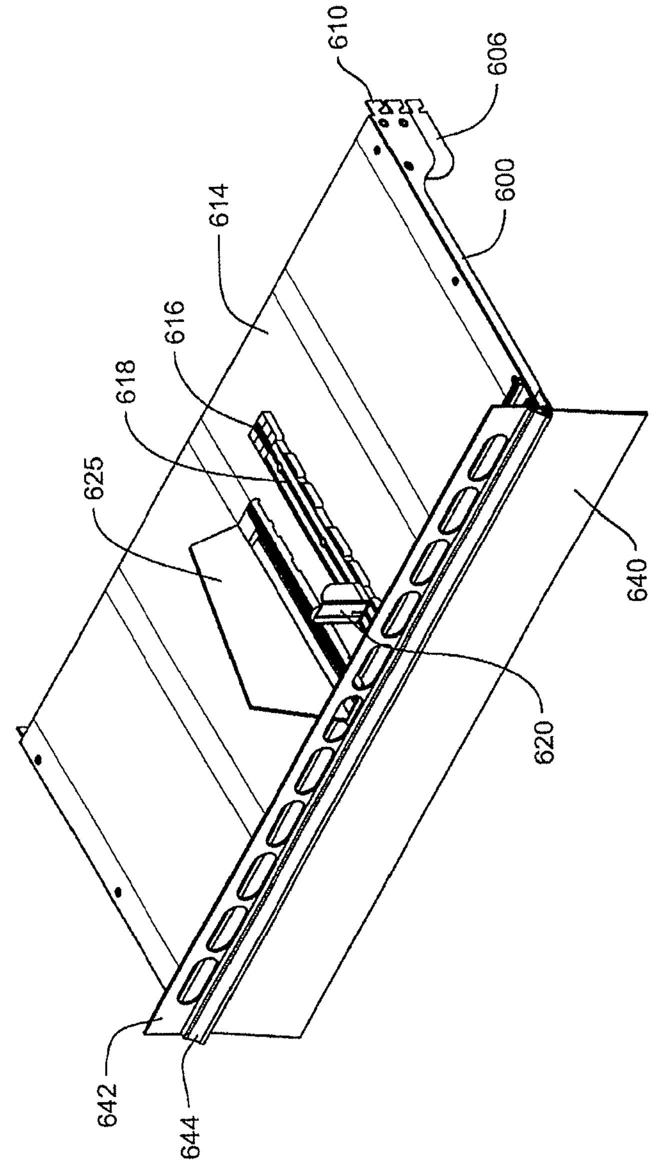
FIG. 73 is an isometric view of the shelf system of FIG. 72.
Figure 74:
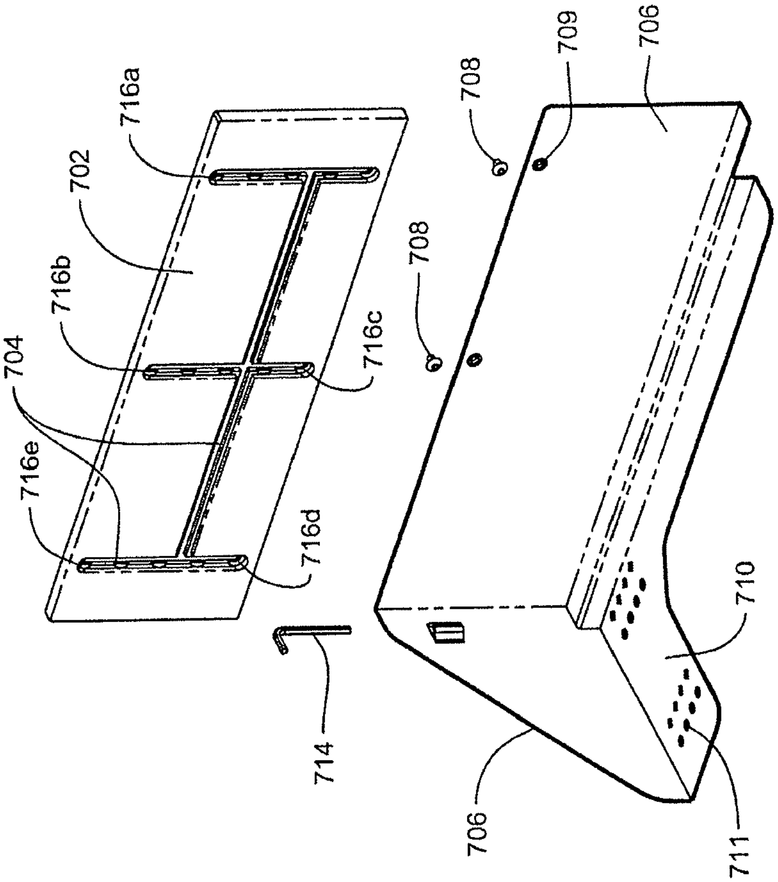
FIG. 74 is an isometric view of an adjustable wall that may be used to provide further security for product on a shelf or a portion of a shelf.

Referring to FIGS. 61 and 73, the shelf supports 600 may be positioned beneath and secured to a shelf 614. A pusher system 616 may be mounted to the shelf 614. The pusher system may include a pusher track 618 and a pusher 620. Any of the pusher systems described herein may be used with the low profile shelf supports 600. Additionally, a product divider 625 may be mounted to the shelf 614 or made part of the pusher system 616, as described herein.

Figure 63:
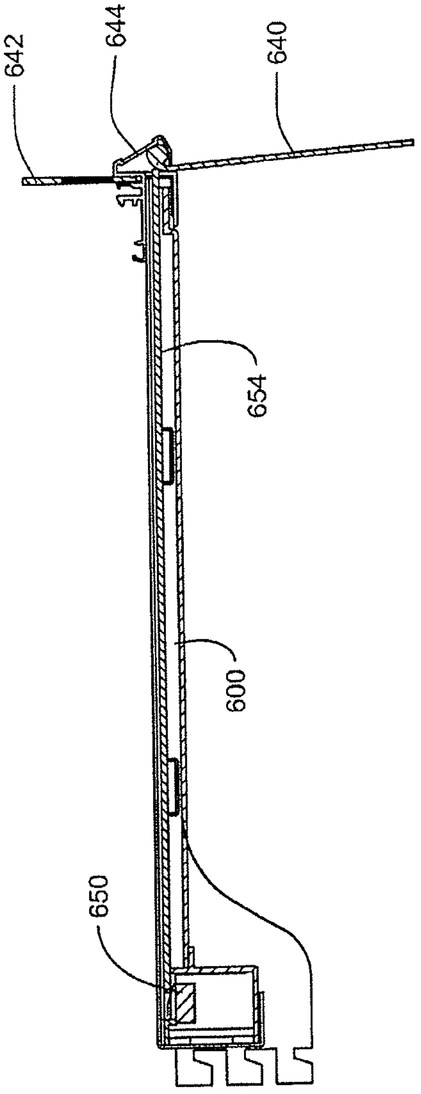
FIG. 63 is a side view of a shelf system incorporating the low profile shelf support of FIG. 60 and an alert device and moveable barrier.
Figure 64:
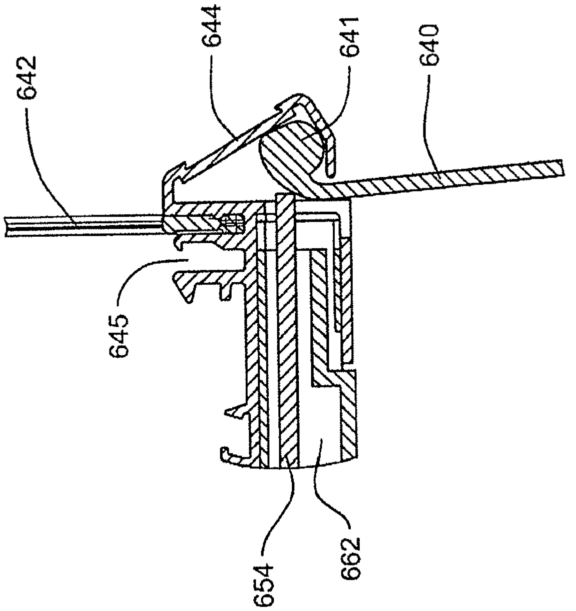
FIG. 64 is a partial enlarged view of the shelf system of FIG. 63 further illustrating the moveable barrier in contact with a linkage which is also in contact with the alert device.

Referring to FIGS. 60, 63 and 64, a pivotable barrier 640 and a front product retaining wall 642 may be mounted to a front rail 644, which may be mounted to the front of the shelf 614. The front rail 644 may include one or more channels 645 for receiving one or more retaining walls 642 or signage identifying the products being merchandised. The front rail 644 may also be configured to receive the pusher system 610 in either a slidable or non-slidable manner. The barrier 640 may be configured similar to the barriers described herein. Similarly, the retaining wall 642 may be configured similar to the retaining walls also described herein.

Figure 65:
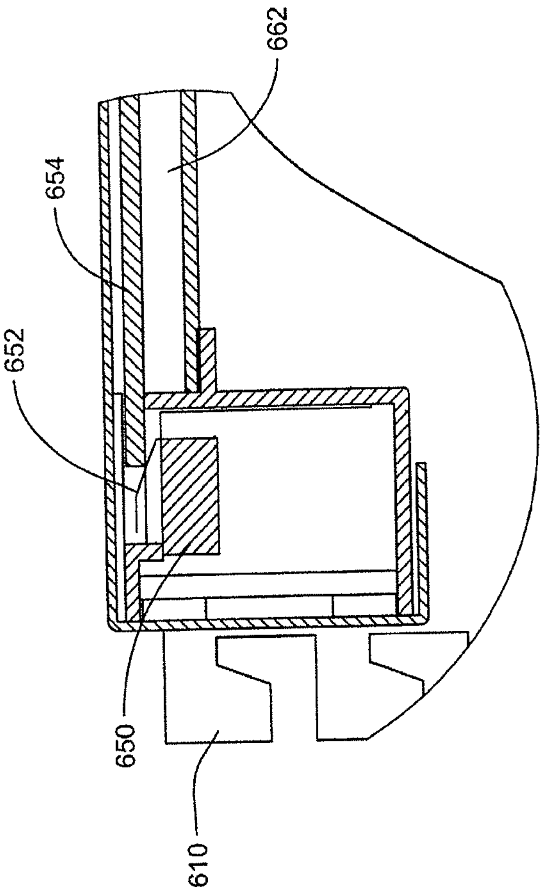
FIG. 65 is a partial enlarged view of the shelf system of FIG. 63 further illustrating the alert device in contact with a linkage which is also in contact with the moveable barrier.
Figure 66:
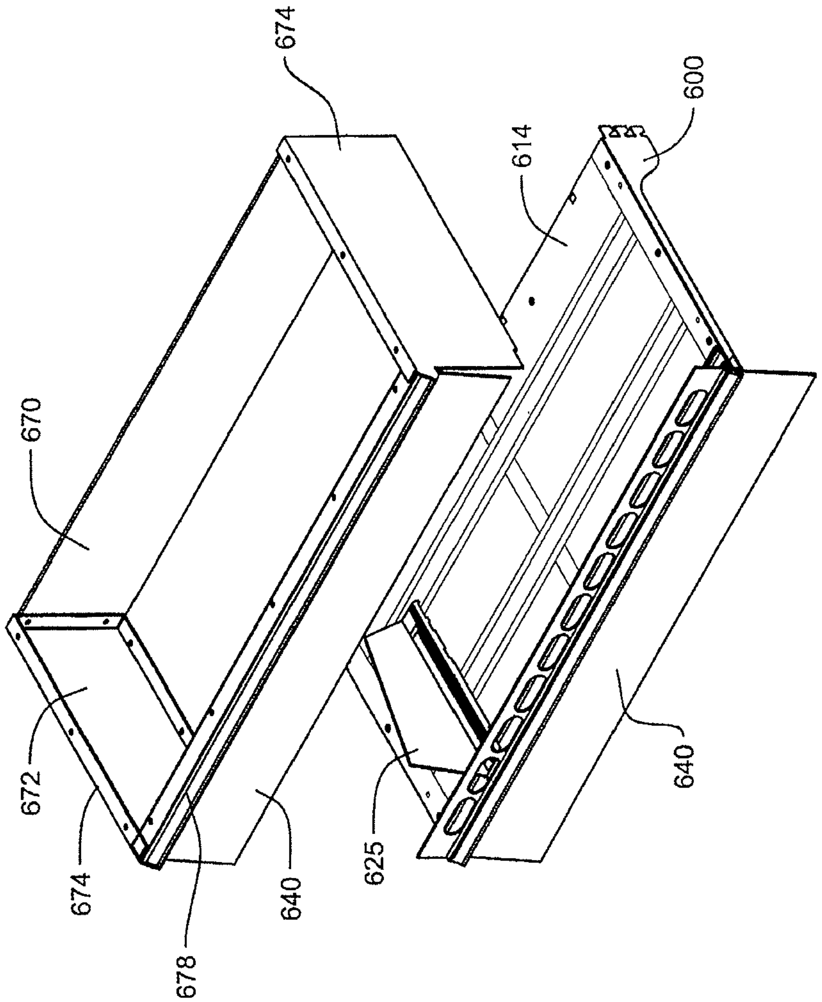
FIG. 66 is an isometric view of the shelf system of FIG. 61 with a box shelf mounted to the shelf.
Figure 67:
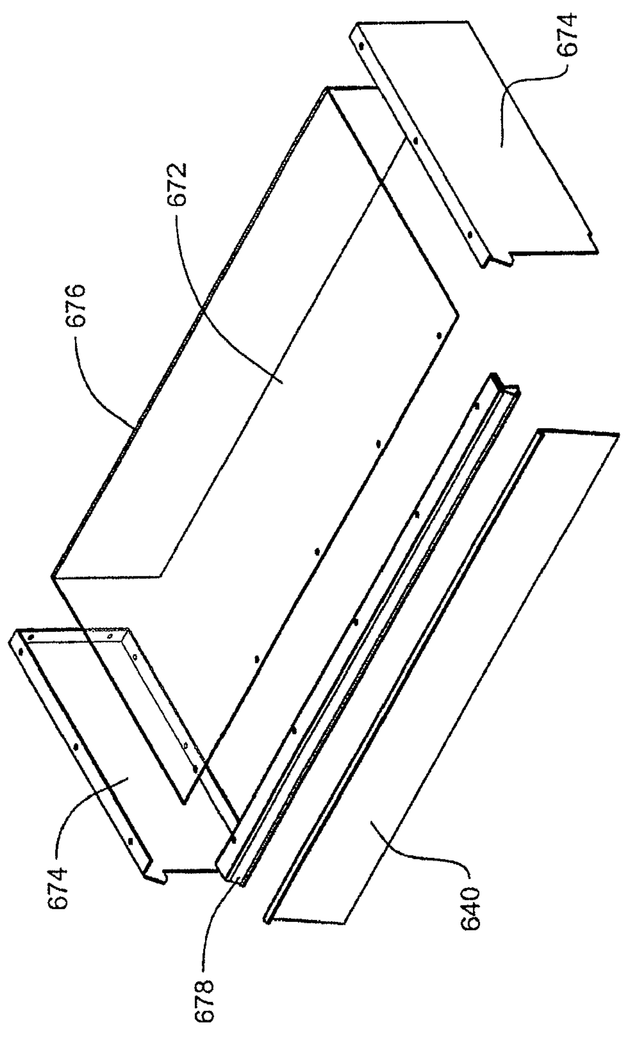
FIG. 67 is an isometric exploded view of the box shelf of FIG. 66.
Figure 68:
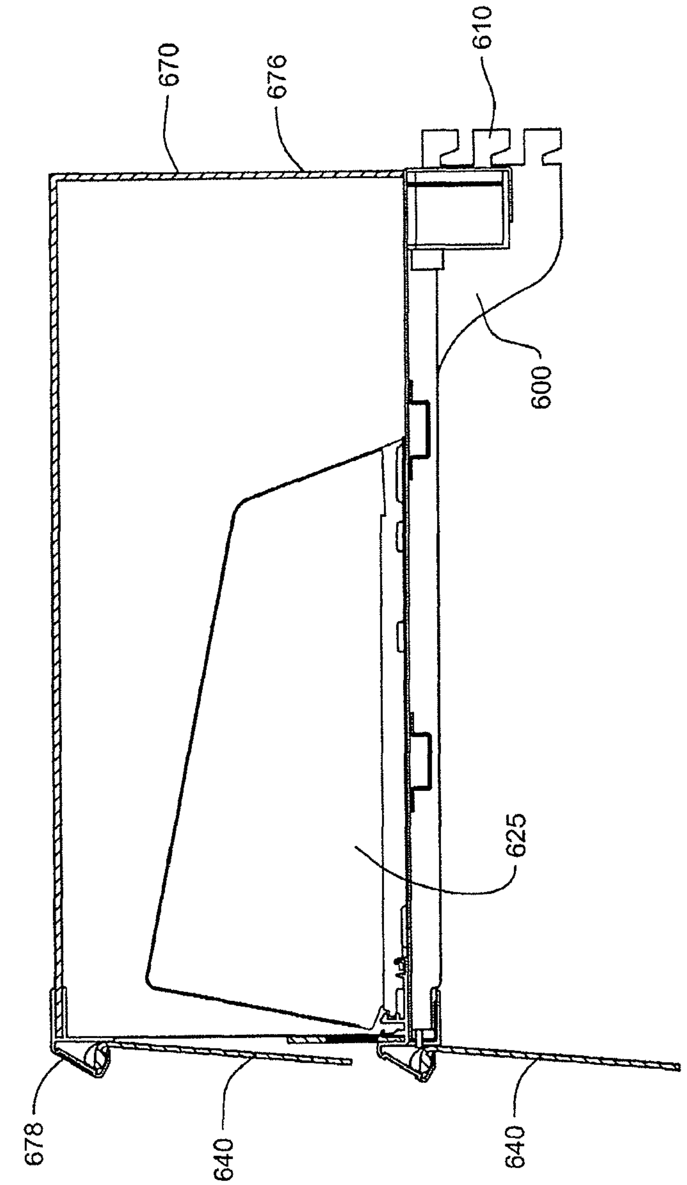
FIG. 68 is a side view of the shelf system of FIG. 66.

Referring to FIGS. 62-65, an alert device 650 may be mounted to the shelf 614 at or near the back portion 602. Similar to alert device 142, the alert device 650 may be used to detect when the pivotable barrier 640 is moved or opened and send an appropriate alert signal, as illustrated above. With this embodiment, the alert device 650 may include a switch 652 that is activated by a linkage 654 that operatively contacts the pivotable barrier 640 (FIG. 64). The linkage 654 may be a metal or plastic rod or flat stock of a suitable material. With this embodiment, the barrier 640 may include a cam-shaped end 641 mountable to the front rail 644, as shown in FIG. 64, the cam-shaped end 641 configured to contact and cause movement of the linkage 654 when the barrier 640 pivots. The linkage 654 in turn may contact the switch 652 of the alert device 650 (as shown in FIG. 65) to activate the alert device 650, which will send or emit the desired alert signal. A linkage cover 662 may be mounted over the linkage 654 to cover and protect the linkage 654.

Figure 69:
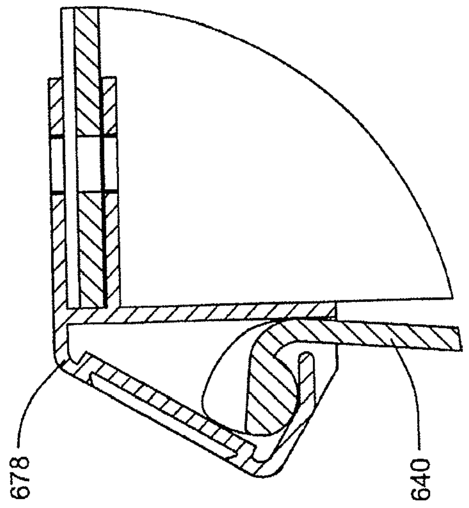
FIG. 69 is a partial enlarged view of the shelf system of FIG. 68.

Referring to FIGS. 66-69, a security box-shelf 670 may be secured to the low-profile shelf support 600 (or to the vertical uprights) and over the pusher system 610. The box-shelf 670 may be provided as a complete unit that provides theft-prevention benefits as discussed above and may be configured to be self-contained so as to eliminate the need for a support shelf. The box-shelf 670 may include a top 672 that may be made of clear material to permit products to be seen in the box-shelf 670. The box-shelf 670 may also include two sides 674 and a back wall 676 that may be joined together to form the box-shelf 670. A front security rail 678 may be mounted to the top 672 (as shown in FIG. 69). The security rail 678 may also be configured to receive a pivotable barrier 640. The barrier 640 may be similar to the barriers described above and may be opened to permit access to the products merchandised within the box-shelf 670. An alert device may also be operatively coupled to the barrier 640.

Figure 70:
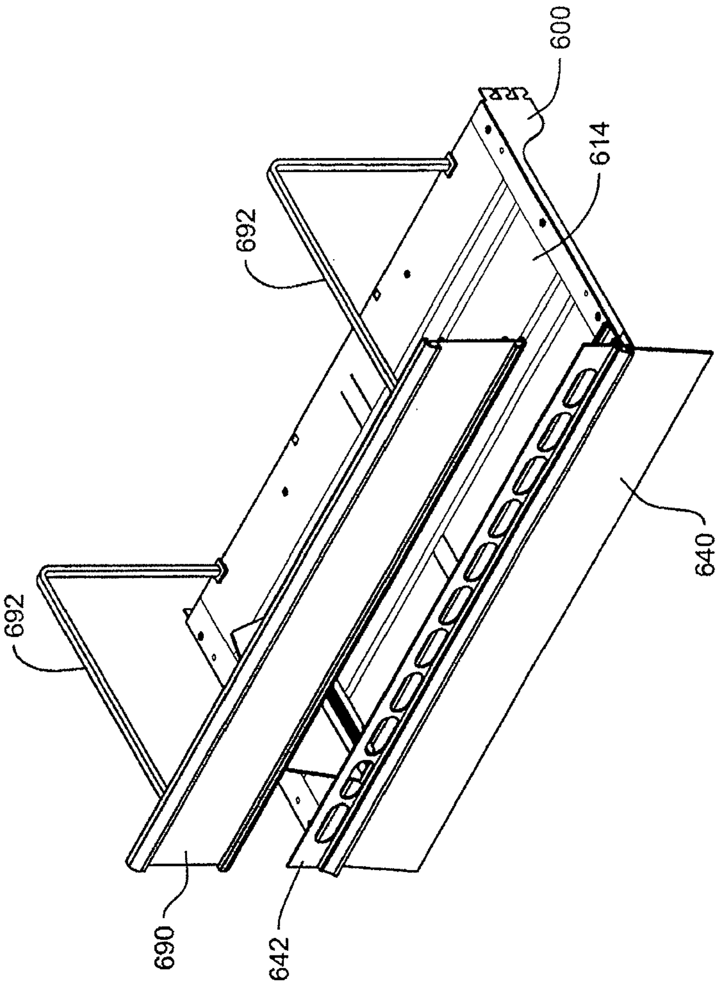
FIG. 70 is an isometric view of the shelf system of FIG. 61 with signage mounted to the shelf.
Figure 71:
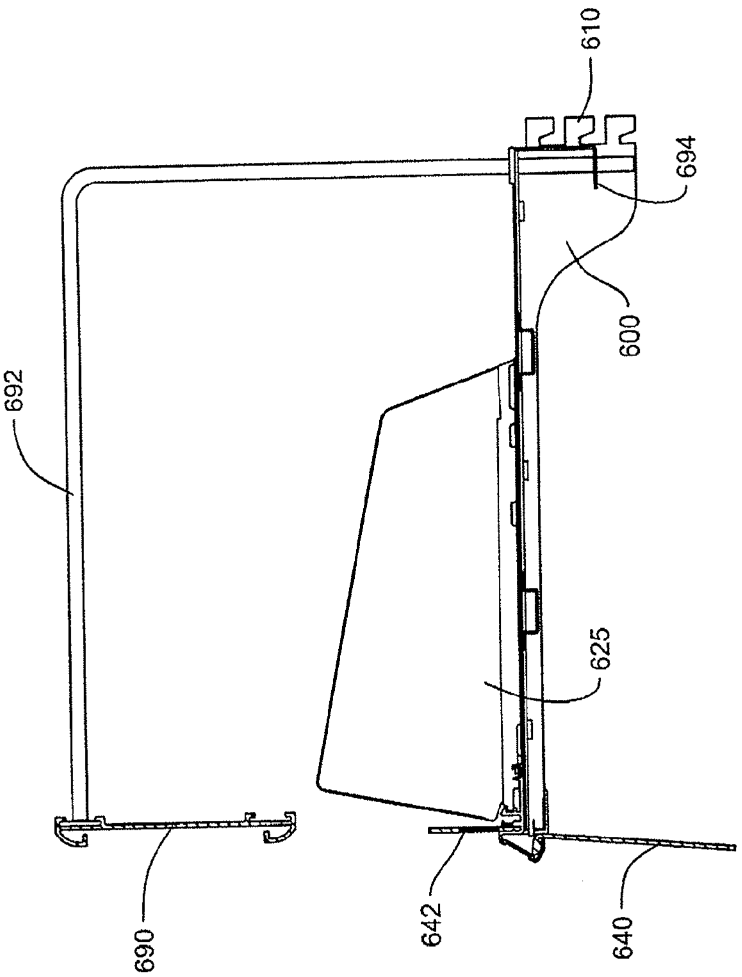
FIG. 71 is a side view of the shelf system of FIG. 70.

Referring to FIGS. 70-71, optional signage 690 may be mounted to the shelf 614 that is supported by the low profile shelf supports 600. One or more signage supports 692 may be used to support the signage 690. The supports may be mounted to one or more horizontal mounting brackets 694 for added stability of the signage 690.

Figure 72:
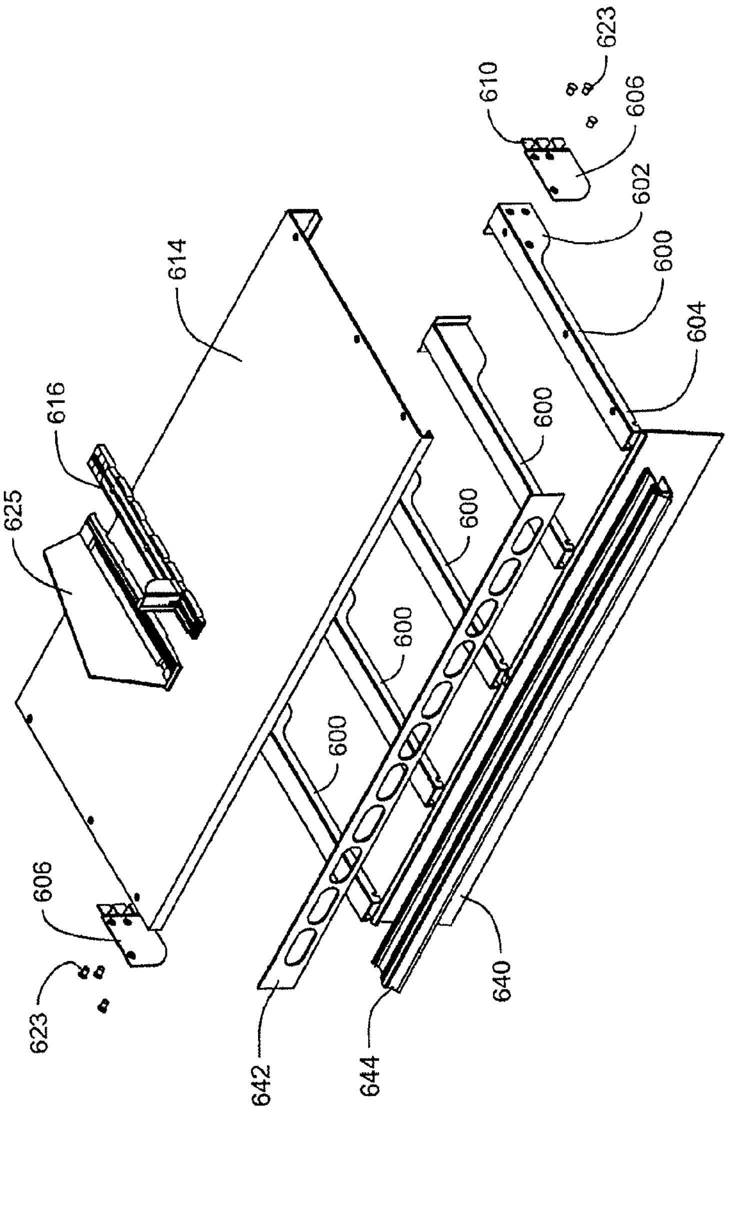
FIG. 72 is an isometric exploded view of the shelf system of FIG. 61 with multiple low profile shelf supports and with optional mounting brackets.

Referring to FIGS. 72-73, it should be understood that multiple low profile shelf supports 600 may be positioned underneath the shelf 614, depending on the size and configuration of the shelf. It should further be understood that multiple pusher systems 616 and dividers 625 may be positioned on the shelf 614 to merchandise multiple rows of product on the shelf.

FIGS. 79-91 illustrate another aspect of the invention, namely a merchandise system 810. Similar to the other embodiments, the merchandise system 810 improves product merchandising by limiting the number and the frequency with which product can be removed from, for example, a merchandising shelf by using various methods such as slowing the rate at which product can be pushed towards the front edge of a merchandising shelf.

Referring to FIGS. 79-84, in an exemplary embodiment, merchandise system 810 includes a base 812. The base 812 defines a generally flat planar surface that may be configured to engage with or mount onto any known shelf used in a store, as well as any other merchandise system 810, and in any known mounting configuration and orientation. The base 812 defines a front edge 826, a back edge 828, a first side edge 820, a second side edge 822, and one or more tracks 814. As is further illustrated, a housing 850 can be mounted to the base 812 in any known mounting configuration and orientation. The housing 850 defines a top wall 852, a first side wall 854, a second side wall 856, and a front retaining wall 876. First and second side walls 854 and 856, respectively, can be used such that when more than one merchandise system 810 is placed adjacent to another like merchandise system 810 on a shelf or stacked on top of another like merchandise system 810, product resting on the base 812 of each respective merchandise system 810 remains separated or divided. In an embodiment, one merchandise system 810 can be stacked on top of another merchandise system 810 without need of a separate shelf between the two merchandise systems.

In an exemplary embodiment, front retaining wall 876 is mounted at an angle, (for example, approximately a 45° angle) relative to the base 812 and extends from the second side edge 822 to first side edge 820 towards the front edge 826. Angles other than approximately 45° are possible, including angles of approximately 15°, 30°, 60° and 75°, to name a few. Front retaining wall 876 can define a channel 888 located proximate the base 812. Channel 888 further can define a detent 886. Front retaining wall 876 and first side wall 854 define an opening 878 through which, as will be explained below, product can be removed by a customer or employee. In an embodiment, front retaining wall 876 does not fully extend from the second side edge 822 to first side edge 820. A lever 880 can be operatively coupled to the merchandise system 810 for ejecting product through the opening 878. In an exemplary embodiment, lever 880 is slidably mounted within the channel 888. The lever 880 can include a lever biasing element 882 and a lever hook 884 adapted to move product. As illustrated, lever biasing element 882 can be a coil spring positioned between lever hook 884 and detent 886. The one or more tracks 814 extend along the base 812 from the back edge 828 to the front retaining wall 876. As shown, a track 814 can be used with a pusher 816. It should be understood that more or less than two tracks could be used with the invention, depending on the particular application. The base 812 further defines a rack aperture 988 for use with a rack 986 as will be discussed below.

Figure 88:
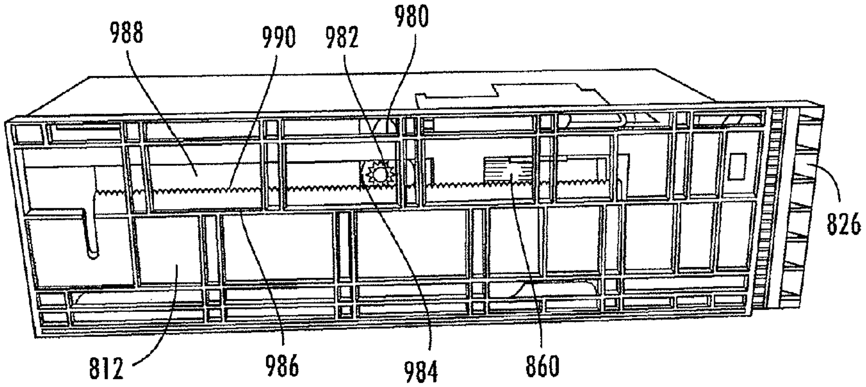
FIG. 88 is a bottom view of an exemplary merchandising system.
Figure 89:
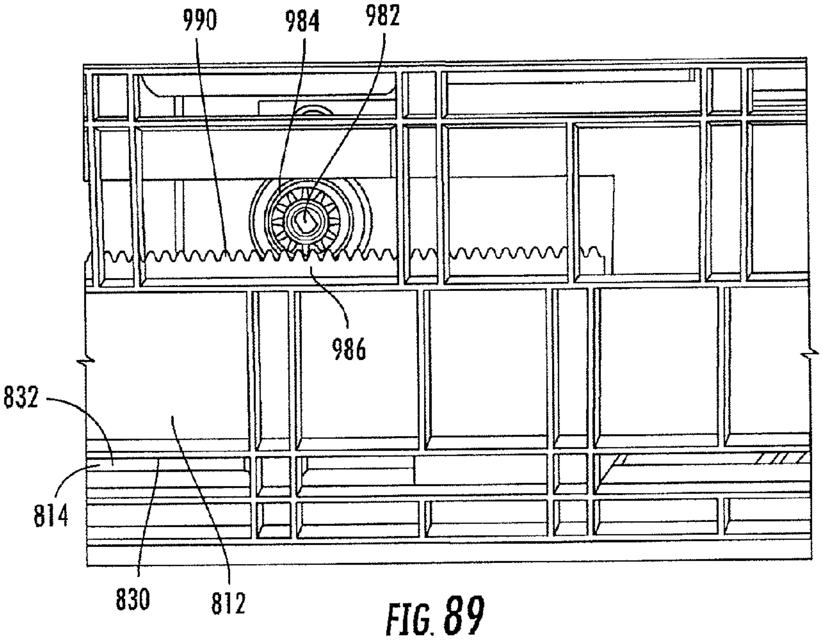
FIG. 89 is a partial bottom view of the merchandising system of FIG. 88.

Referring to FIGS. 88 and 89, in an exemplary embodiment, the one or more tracks 814 extend longitudinally along the length of the base 812 and define at least one rail 830 and an elongated aperture or channel 832 in the base 812. The aperture 832 and rail 830 are sized and shaped to receive and mount a mating element of the pusher 816. The pusher 816 is slidably mounted to the base 812 such that the pusher 816 does not lift out of the track 814. The present invention contemplates the use of other shapes of rails and apertures to mount the pusher 816 to the base 812. Other pusher mounting techniques are possible with the invention.

The pusher 816 also contains at least one pusher urging element 860 used to urge the pusher 816 toward the front of the shelf. The pusher urging element 860 may be any biasing element including, without limitation, a flat coil spring. The present invention may use one or more pusher urging elements 860 to urge the pusher 816 depending on the desired application. The pusher urging element 860 may be mounted to the pusher 816 and the base 812 using any known mounting technique. In the exemplary embodiment, one end of the pusher urging element 860 is secured to the base 812 near the front edge 826 of the base 812, and the opposing end of the pusher urging element 860 is positioned behind the pusher 816 to urge the pusher 816 toward the front of the shelf. Further, pusher 816 includes an angled pusher face 892. In an exemplary embodiment, angled pusher face 892 is positioned such that its angle relative to the base 812 corresponds to the angle of front retaining wall 876. It should be understood, however, that angled pusher face 892 can be positioned at other angles and can have various dimensions and shapes.

Figure 85:
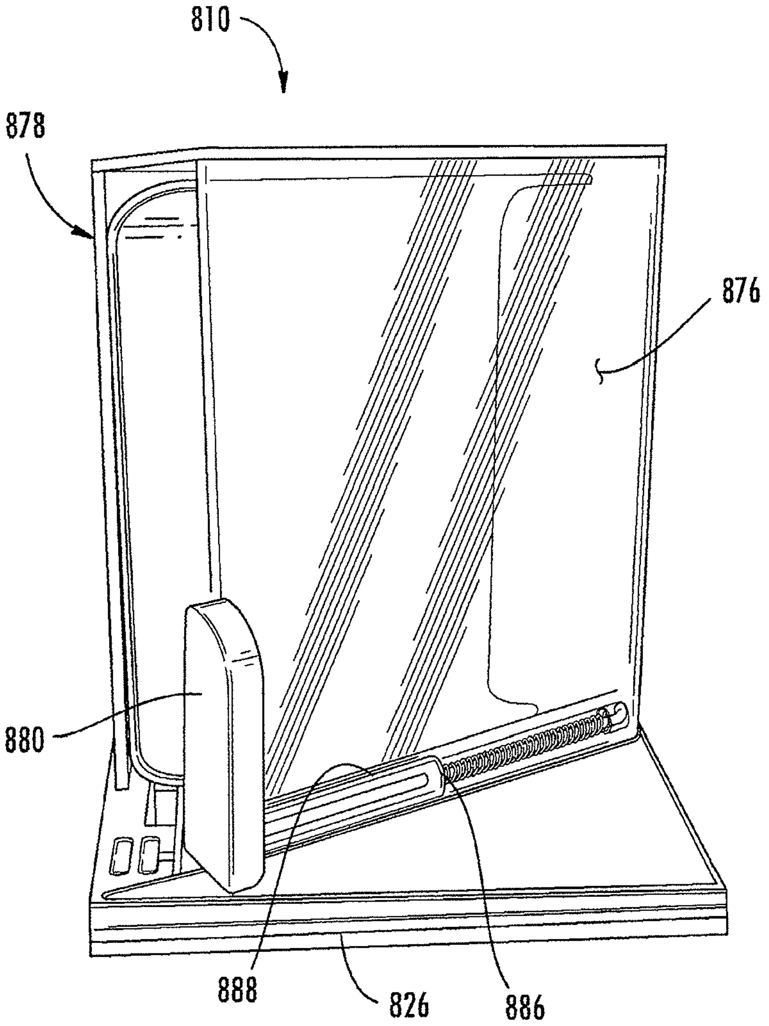
FIG. 85 is another front view of the merchandising system of FIG. 79.
Figure 86:
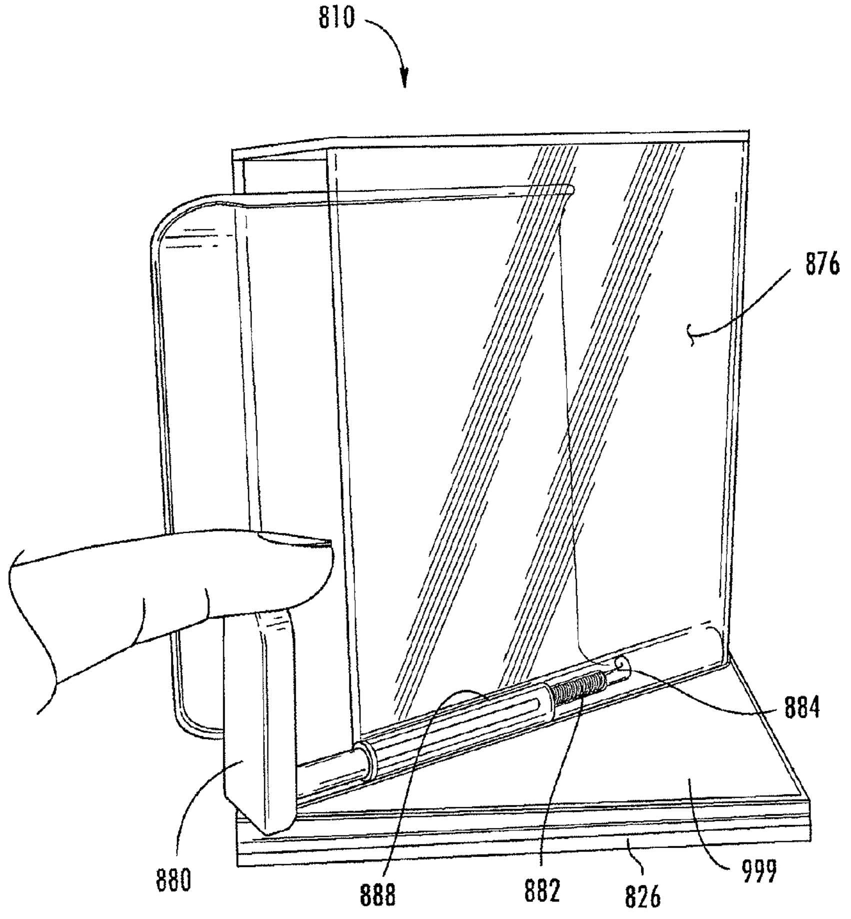
FIG. 86 is another front view of the merchandising system of FIG. 79 illustrating product being removed from the merchandising system.
Figure 87:
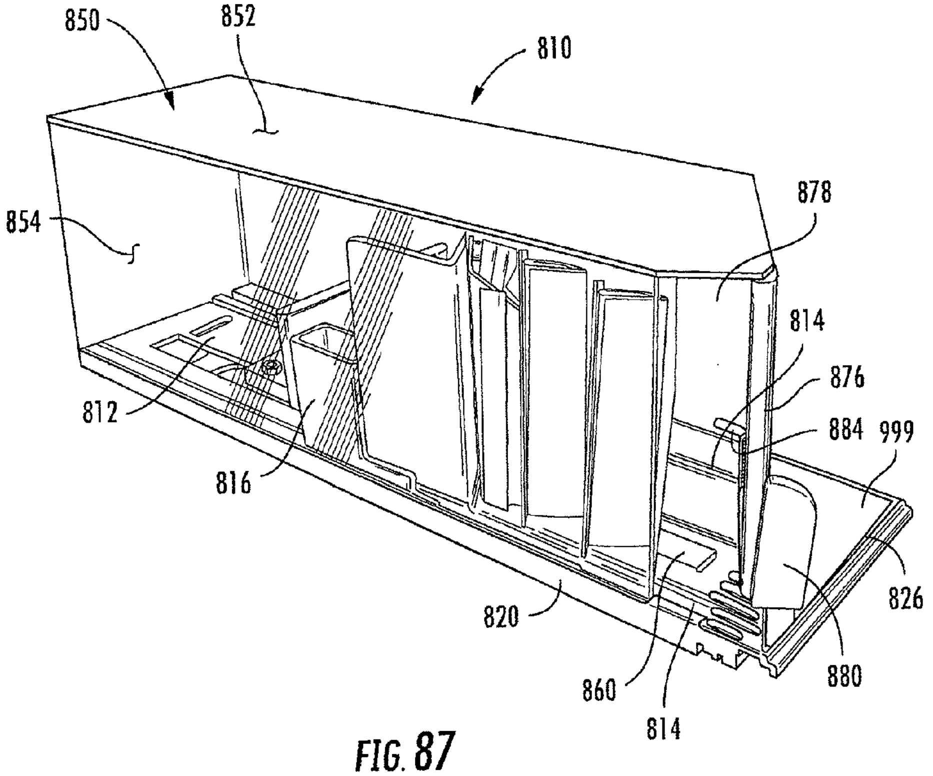
FIG. 87 is another isometric view of the merchandising system of FIG. 79 illustrating product being moved toward the front end of the merchandising system.

Referring to an embodiment of the invention in FIGS. 85 and 86, pusher 816 will urge the product toward the front retaining wall 876. When product is positioned between the front retaining wall 876 and pusher 816, only a single product can be accessed by customers or employees because the opening 878 is equal in dimension to less than the width of two products. In an embodiment, the opening 878 is no more than approximately 50% wider that the width of a single product. In another embodiment the opening 878 is roughly the width of a single product yet wide enough to allow a single product to pass through the opening 878. The positioning and dimensions of opening 878, in combination with the positive pressure the pusher 816 places on product against the front retaining wall 876, hampers a customer or employee's ability to remove products using solely digits (i.e., fingers) or digital force. To facilitate the removal of a single product, when product is positioned between the front retaining wall 876 and pusher 816, a force can be applied to lever 880 such that lever 880 can be slidably translated. As lever 880 is slidably translated, lever hook 884 engages the most forward positioned product. When the customer or employee slidably translates lever 880 to a fully extended position, the single product is partially ejected from the housing 850 and can be easily removed by the customer or employee. Further, when lever 880 is in a fully extended position, lever biasing element 882 is compressed between lever hook 884 and detent 886. Accordingly, when a customer or employee stops applying force to the lever 880, lever biasing element 882 biases lever 880 back into its original position.

In the embodiment described below, when customers or employees reach and pull out the product available to them, the pusher 816 is slowly urged toward the front retaining wall 876 by pusher urging element 860 and, after a pre-determined period of time, a single product once again is positively pressured between the pusher 816 and the front retaining wall 876 such that the product is adjacent opening 878. An attempt by a customer or employee to remove or urge the next product forward after a first product is removed is hampered because the product is positioned at an angle corresponding to angled pusher face 892 and thus, if a customer or employee attempts to tip the product forward, the product will be biased in a standing position by the second side wall 856. The speed at which the pusher moves can be controlled by various devices including, without limitation, a dampened gear assembly discussed below. By providing a merchandise system that urges product forward at a slow rate of speed, a customer or employee can be inhibited from removing more than one product at a time and is assisted in removing product only once every pre-determined amount of time.

In an embodiment of the invention, to provide the desired slow rate of speed for the pusher 816, an exemplary dampened gear assembly 980 may be mounted to the pusher 816. The dampened gear assembly 980 may include a gear 982 and a gear housing 984 that can be filled with any dampening fluid known in the art. A portion of gear 982 is housed within gear housing 984. A rack 986 can be mounted to rack aperture 988. The rack 986 defines a plurality of teeth 990. Gear 982 of gear assembly 980 is adapted to engage the plurality of teeth 990 of rack 986. In operation, when product is removed from the base 812, and pusher 816 is urged forward by pusher urging element 860, gear assembly 980 acts to slow the rate at which pusher 816 is urged forward. This can be accomplished because rotation of gear 982 is regulated by the dampening fluid located in gear housing 984 which acts to resist movement of the gear 982 within gear housing 984. Again, other dampening techniques may be used with the present invention to affect the desired slow rate of movement of the pusher toward the front of the shelf.

In an embodiment, front retaining wall 876 is made of a clear or transparent material that allows for the product to be viewed through front retaining wall 876. In an embodiment, front retaining wall 876 enables advertisements or marketing materials to be placed on front retaining wall 876. Base 812 also can include a display area 999 (see FIG. 79) for advertising or marketing material as well as product information such as product pricing information. Because display area 999 can include product information, merchandise system 810 can be, as was discussed above, stacked on top of another like merchandise system 810 without the use of shelves.

In an embodiment, a locking device (not shown) can be used to prevent the removal of product. Such locking device may include a rotatable barrier, a door, or a locking clip. The locking device, for instance, could prevent product from fitting through opening 878 such that when the merchandise system 810 is not in use, neither employees nor customers can access the product.

It should be understood that the merchandise system 810 can be altered such that first side wall 854 and second side wall 856 are reversed and thus, opening 878 is on the opposite side. As can be understood by one in the art, in this embodiment, the angled pusher face 892, front retaining wall 876, and the lever 880, among other things, are also reversed.

Figure 90:
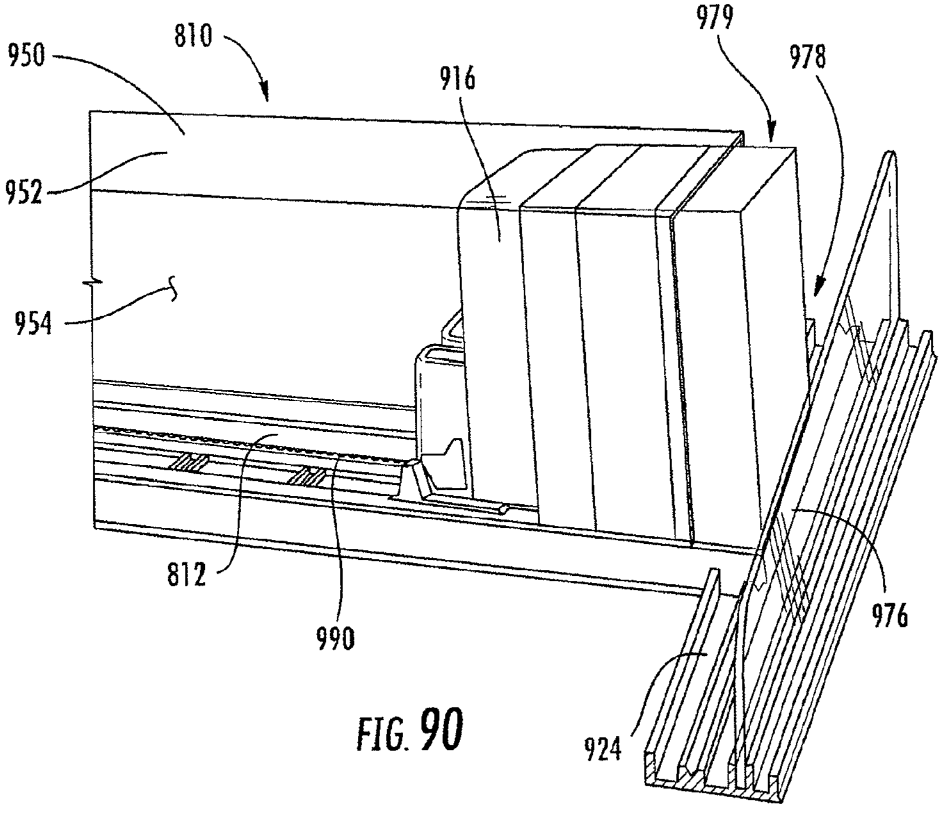
FIG. 90 is a side view of an exemplary merchandising system.
Figure 91:
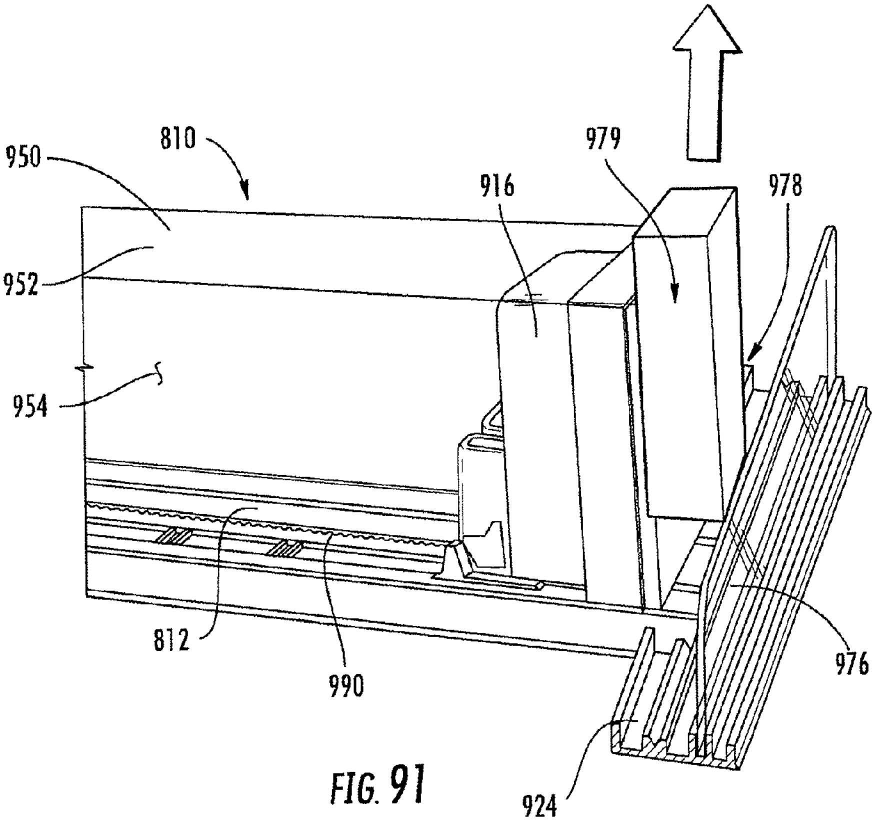
FIG. 91 is another side view of the merchandising system of FIG. 90 illustrating product being removed from the merchandising system.

Referring to FIGS. 90 and 91, in another embodiment, a housing 950 defines a top wall 952, a first side wall 954, and an opposing second side wall. A front edge of the base 812 is configured to mount to or on a rail 924 in any known manner.

As discussed above, the base 812 may include a rack and rack aperture wherein the rack defines a plurality of teeth 990 (as shown in FIGS. 90 and 91) such that a gear of a gear assembly can be adapted to engage the plurality of teeth 990. The rail 924 includes a front retaining wall 976 to retain product that is pushed toward the rail. Front retaining wall 976 and housing 950 define an opening 978 that is roughly equal to the width of a single product. The pusher 916 will urge the product toward the rail 924. When one merchandise system 810 is be placed adjacent to another like merchandise system 810 on a shelf, product can only be removed through the top portion 979 of the opening 978. Accordingly, when product is positioned between the front retaining wall 976 and pusher 916, only a single product can be accessed by customers or employees. It will be further understood that a device, such as a lever trigger (not shown), may be used to facilitate a customer or employee to partially or fully eject product through the top portion 979 of the opening 978.

Figure 92:
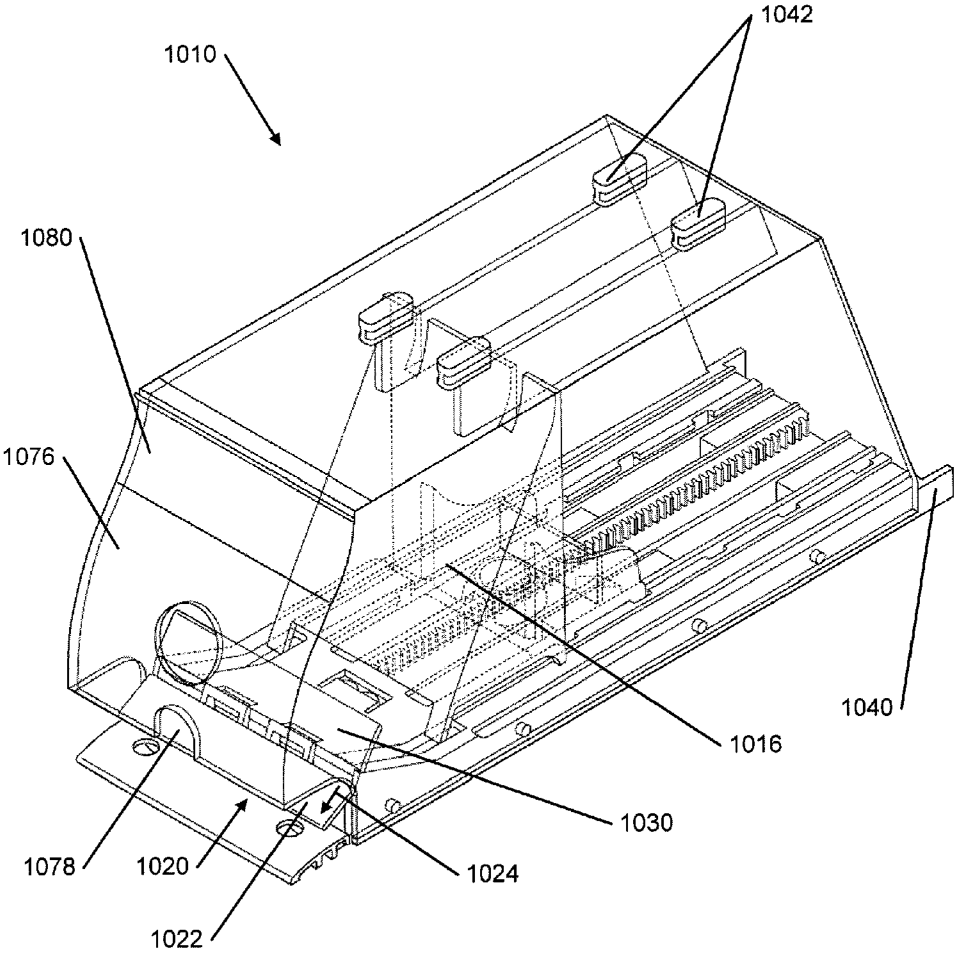
FIG. 92 is a perspective view of another exemplary merchandising system.
Figure 93:
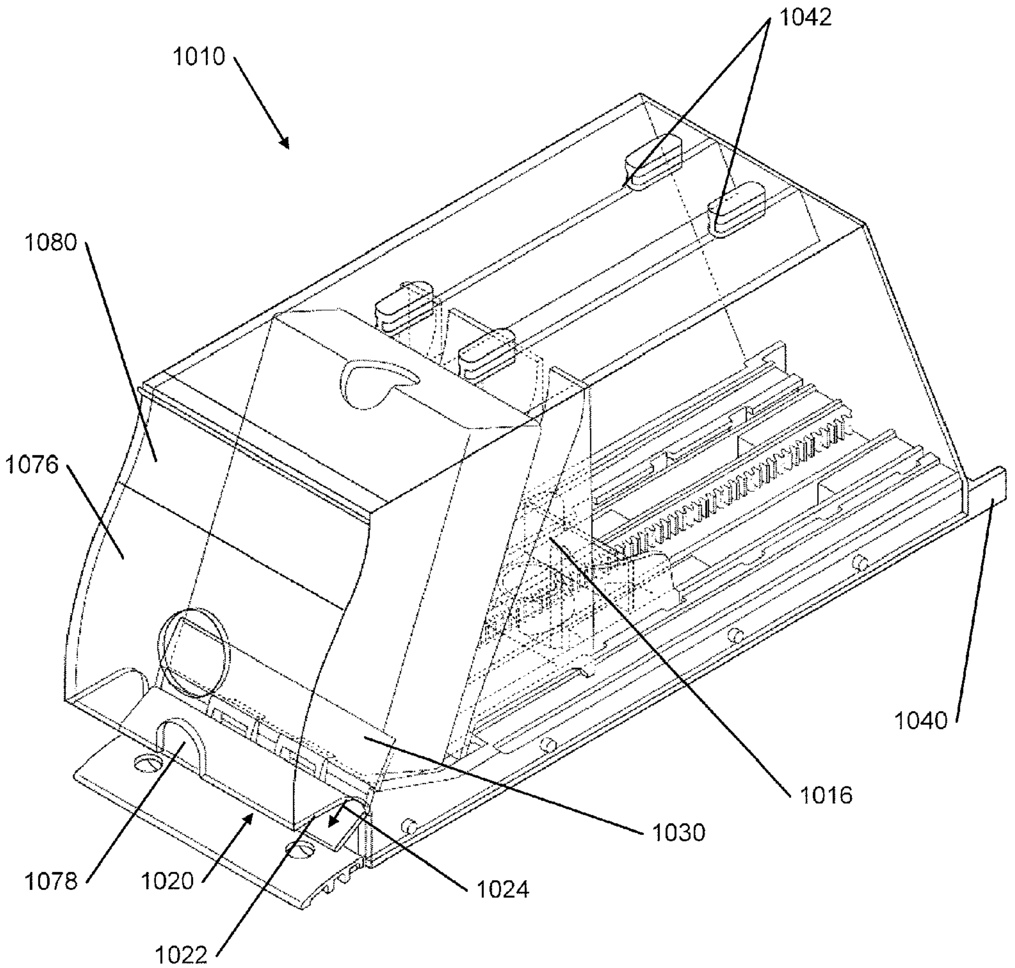
FIG. 93 is a perspective view of the merchandising system of FIG. 92 illustrating the system without product.

Referring to FIGS. 92-95, there is disclosed an alternative embodiment of a product securement system 1010 that includes the features described above, including the dampened pusher 1016 features. FIG. 92 illustrates a perspective view of the product securement system without product, while FIG. 93 illustrates a perspective of the product securement system with product. The product securement system 1010 includes a bottom opening 1020 in the front wall 1076 of the system 1010 for the removal of a single product at a time. The bottom opening 1020 may be located near the bottom edge of the front wall 1076 of the system 1010. The bottom opening 1020 may be sized for width and length to accommodate a single product. For example, the width of the bottom opening 1020 may be similar to the width of a single product and the length of the bottom opening 1020 may be similar to the length of a single product. In other aspects of the disclosure, the width of the bottom opening 1020 may be equivalent to 110% of the width of a single product and the length of the bottom opening 1020 may be equivalent to 110% of the length of a single product. The width and length of the bottom opening 1020 may be equivalent to 100%-200% of the width and length of the product.

Additionally, a lever 1022 may be included with the product securement system 1010 as illustrated in FIGS. 92-95. The lever 1022 may be located at the front of the system 1010 adjacent to the bottom opening 1020 and the front wall 1076. The lever 1022 may be operated to lift a product up and over a front retaining wall 1030 such that the product then slides through the bottom opening 1020. For example, when the lever 1022 is operated or lifted by a user, the lever lifts the product over the front retaining wall 1030 to slide through the bottom opening 1020. The lever 1022 may be configured to provide a sloping surface 1024 that permits the product to more easily slide through the bottom opening 1022 in the front wall 1076 of the system. Further, the lever 1022 may be inline with the front retaining wall 1030 such that the product can more easily slide down the front retaining wall 1030 to the sloping surface 1024 of the lever 1022 and through to the bottom opening 1020. Additionally, the front wall 1076 of the system 1010 may include a finger hole 1078 to help grab product after it has passed through the bottom opening 1022 in the front wall 1076. The front wall 1076 may be curved and also define a location 1080 for displaying product information or advertisement.

Figure 94A:
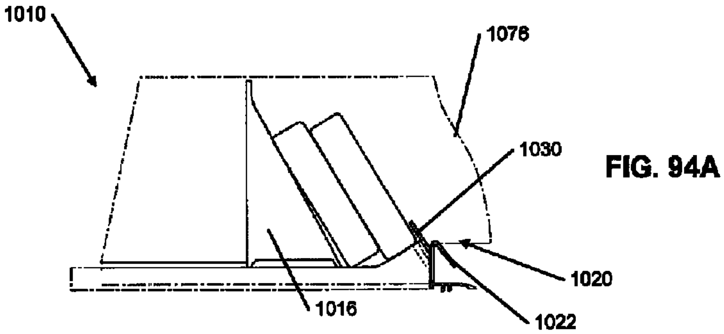
FIGS. 94A through 94C are side views of the merchandising system of FIG. 92 illustrating the operation of the merchandising system.
Figure 94B:
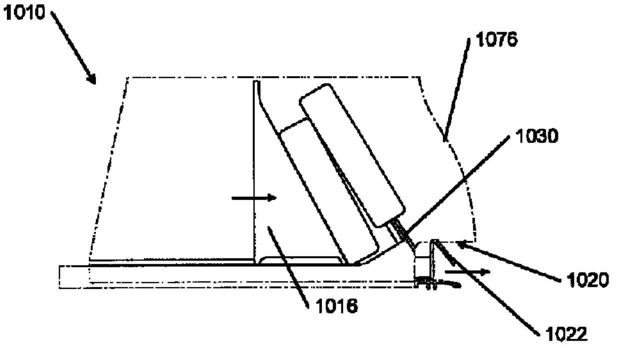
Figure 94C:
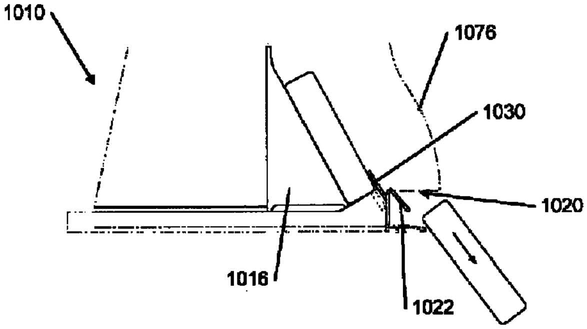

FIGS. 94A through 94C illustrate the operation of the system 1010 as described above with the bottom opening 1020 and lever 1076. FIG. 94A illustrates the product securement system 1010 prior to operation. As illustrated in FIG. 94A, the pusher 1016 may push and apply pressure against the product towards the front retaining wall 1030 in the product securement system 1010. The lever 1022, at this point, is not operated and has not moved. As illustrated in FIG. 94B, the lever 1022 is lifted. When the lever 1022 is lifted, the lever 1022 is configured to lift the product up to a high enough level such that the product clears the front retaining wall 1030. Because of the pressure from the pusher 1016, once the product is lifted to a height over the front retaining wall 1030, the product will move forward towards the front wall 1076 and bottom opening 1020 of the system 1010. As illustrated in FIG. 94C, the product slides out from the bottom opening 1020. The lever may be configured to provide a sloping surface that permits and assists the product to more easily slide through the bottom opening 1020 in the front wall 1076 of the system 1010. Additionally, as illustrated in FIGS. 92 and 93, the front wall may include a finger hole 1078 to help grab the product after it has passed through the bottom opening 1020 in the front wall 1076. Lastly, when the first product slides out of the bottom opening 1020 of the system 1010, the second product is pushed forward by the pusher 1016 against the front retaining wall 1030 of the product securement system 1010, and ready to be discharged through the bottom opening 1020 in the same way that the first product was.

Figure 95:
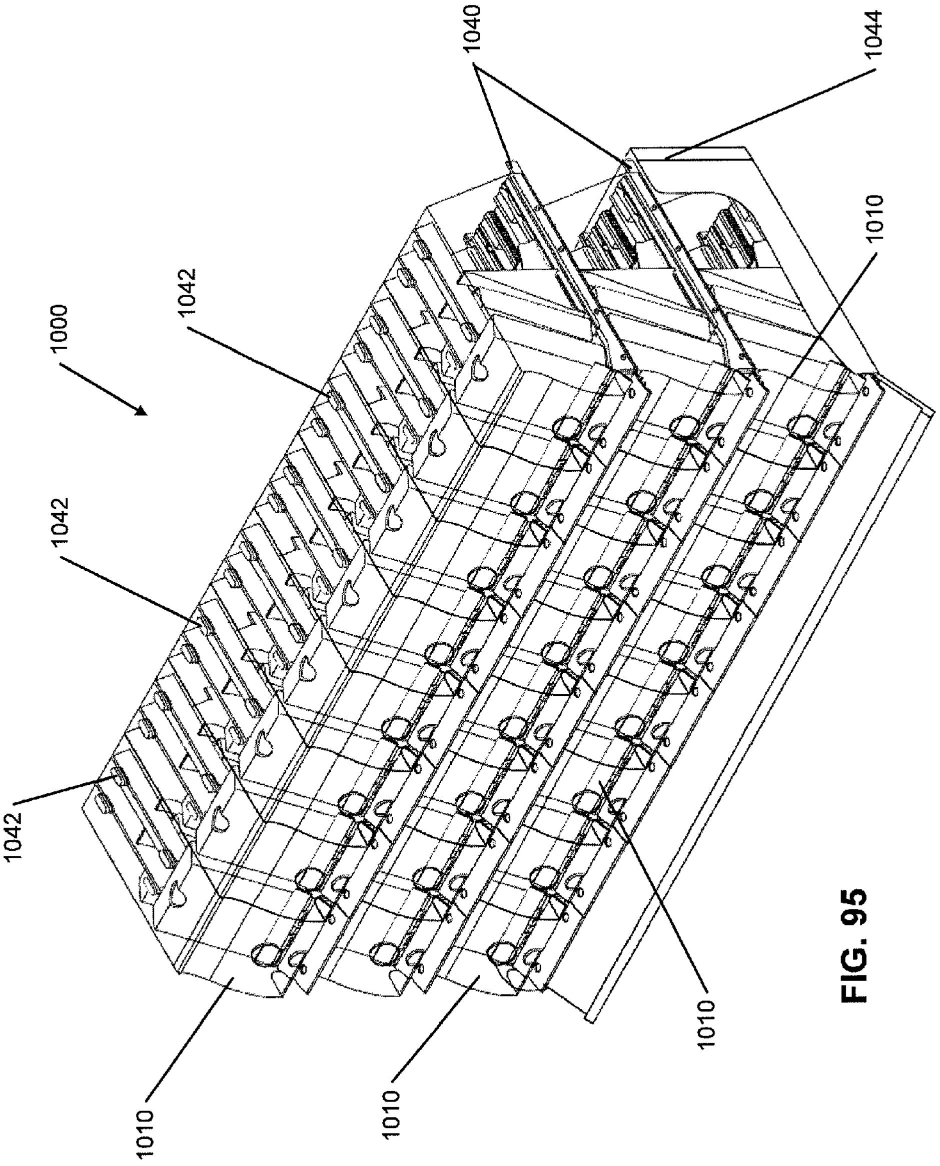
FIG. 95 is a perspective view of multiple exemplary merchandising systems as illustrated in FIG. 92, connected together to form a shelf and management display system.

The system depicted in FIGS. 92-95 may be stackable and may be connected to vertical upright supports 1044. As illustrated in FIG. 95, multiple systems 1010 may be connected together to form a shelf and management display system 1000. As illustrated in FIG. 95, numerous individual systems may be positioned next to each other and on top of each other to create an array of systems 1000. As illustrated in FIGS. 92, 93, and 95, the system 1010 may include tabs 1040 that may be configured to lock into the vertical upright supports 1044. Any locking tab system known and used in the art may be utilized for this system. Additionally, the system 1010 may include one or more snap blocks 1042 on the top of the system. These snap blocks 1042 may be configured to engage corresponding openings or indents in the bottom of a second system when stacking the systems. The snap blocks 1042 will help assist and ensure there is little to no movement of the systems when stacking them on top of each other. Additionally, the system depicted in FIGS. 92-95 may be used to dispense products having small packaging such as packaging that contains razor blades.

Variations and modifications of the foregoing are within the scope of the present invention. It should be understood that the invention disclosed and defined herein extends to the individual features and all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A merchandising system, comprising:

a base configured to support product;

a housing configured to engage with the base, comprising a top wall, a front wall, a first side wall, and a second side wall, wherein the front wall includes a finger hole and an opening located at the bottom of the front wall;

a spring-urged pusher movably mounted on the base; and a lever configured to lift product upward over a front retaining wall such that the product slides through the opening, wherein the lever is configured to be actuated by a finger through the finger hole in the front wall, such that when the lever is actuated by the finger, the lever lifts the product over the front retaining wall.

2. The system of claim 1, wherein the lever is configured to provide a sloping surface that permits the product to slide through the opening.

3. The system of claim 2, wherein the sloping surface of the lever is inline with a slope of the front retaining wall.

4. The system of claim 1, wherein the retaining wall is positioned adjacent the front wall and extending toward the top wall.

5. The system of claim 1, wherein the retaining wall has a height for limiting access to at least a first row of product and a second row of product placed within the housing.

6. The system of claim 1, wherein the lever is actuated by lifting the lever, which lifts the product up to a high enough level such that the product clears the front retaining wall.

7. The system of claim 1, wherein the opening is sized in length and width to correspond to the size of the product.

8. The system of claim 1, wherein the front wall is curved.

9. The system of claim 8, wherein the curved front wall defines a location for displaying product information.

10. The system of claim 1, wherein the base further comprises a track.

11. The system of claim 10, wherein the pusher is adapted to engage the track.

12. The system of claim 1, wherein the front wall is made of a clear or transparent material that allows for the product to be viewed through the front wall.

13. A product management and securement system, comprising:

a base configured to support product;

a housing configured to engage with the base, comprising a top wall, a front wall, a first side wall, and a second side wall, wherein the front wall includes a finger wall and an opening;

at least one retaining wall positioned adjacent the front wall and extending toward the top wall, the at least one retaining wall having a height for limiting access to at least a first row of product and a second row of product placed within the housing;

a spring-urged pusher movably mounted on the base; and a lever configured to lift product upward over the at least one retaining wall wherein the product slides through the opening, wherein the lever is configured to be actuated by a finger through the finger hole in the front wall, such that when the lever is actuated by the finger, the lever lifts the product over the front retaining wall.

14. The system of claim 13, wherein the lever is configured to provide a sloping surface that permits the product to slide through the opening when the product is lifted upward over the at least one retaining wall.

15. The system of claim 14, wherein the sloping surface of the lever is inline with a slope of the front retaining wall.

16. The system of claim 13, wherein the lever is actuated by lifting the lever, which lifts the product up to a high enough level such that the product clears the front retaining wall.

17. The system of claim 13, wherein the front wall is curved and defines a location for displaying product information.

18. The system of claim 13, wherein the base further comprises a track.

19. The system of claim 18, wherein the pusher is adapted to engage the track.

20. The system of claim 13, wherein the front wall is made of a clear or transparent material that allows for the product to be viewed through the front wall.

* * * * *